(12) United States Patent
Suzuki et al.

(10) Patent No.: US 8,963,479 B2
(45) Date of Patent: Feb. 24, 2015

(54) POWER CONVERSION DEVICE FOR A ROTARY ELECTRIC MACHINE

(75) Inventors: Takashi Suzuki, Obu (JP); Kazutoshi Shiomi, Kariya (JP); Atsuyuki Hiruma, Kariya (JP); Shingo Hayakawa, Toyota (JP)

(73) Assignee: Denso Corporation, Kariya (JP)

( * ) Notice: Subject to any disclaimer, the term of this patent is extended or adjusted under 35 U.S.C. 154(b) by 29 days.

(21) Appl. No.: 13/311,592

(22) Filed: Dec. 6, 2011

(65) Prior Publication Data

US 2012/0139461 A1 Jun. 7, 2012

(30) Foreign Application Priority Data

Dec. 7, 2010 (JP) ................................. 2010-272598

(51) Int. Cl.
*H02P 27/04* (2006.01)
*H02P 27/08* (2006.01)
*H02M 1/38* (2007.01)

(52) U.S. Cl.
CPC ....... *H02P 27/085* (2013.01); *H02M 2001/385* (2013.01)
USPC .............................. 318/801; 318/599; 363/41

(58) Field of Classification Search
USPC .............. 318/801, 599, 811, 727; 363/41, 98, 363/132
See application file for complete search history.

(56) References Cited

U.S. PATENT DOCUMENTS

| | | | | |
|---|---|---|---|---|
| 4,847,743 | A * | 7/1989 | Kamiyama ...................... | 363/41 |
| 5,933,344 | A | 8/1999 | Mitsuishi et al. | |
| 7,102,322 | B2 * | 9/2006 | Suzuki .......................... | 318/801 |
| 2003/0137857 | A1 | 7/2003 | Yamanaka et al. | |
| 2007/0103950 | A1 * | 5/2007 | Arisawa et al. ............... | 363/132 |
| 2009/0234538 | A1 * | 9/2009 | Ta et al. .......................... | 701/41 |
| 2010/0060211 | A1 * | 3/2010 | Hashimoto et al. ...... | 318/400.02 |

FOREIGN PATENT DOCUMENTS

| | | |
|---|---|---|
| JP | 63-290170 | 11/1988 |
| JP | 05-153781 | 6/1993 |
| JP | 2-2577738 | 2/1997 |
| JP | 10-210756 | 8/1998 |
| JP | 2002-199788 | 7/2002 |
| JP | 2008-104327 | 5/2008 |
| WO | WO 01/65675 | 9/2001 |

OTHER PUBLICATIONS

Office Action issued Nov. 2, 2012 in corresponding Japanese Application No. 2010-272598 with English translation.

(Continued)

*Primary Examiner* — Rina Duda
*Assistant Examiner* — Bickey Dhakal
(74) *Attorney, Agent, or Firm* — Harness, Dickey & Pierce, PLC

(57) ABSTRACT

A power conversion device includes an inverter unit and a control unit. The inverter unit includes high SWs and low SWs for each phase of coils of a motor. The control unit, in a case that the on-time of the high SWs and the low SWs is shorter than a predetermined time determined based on a dead time, changes an output voltage average value such that the on-time of the high SWs or the on-time of the low SWs becomes longer than the predetermined time. The voltage use rate can be improved without disposing a special circuit, and distortion of inter-line voltages or distortion of currents can be suppressed.

20 Claims, 34 Drawing Sheets

(56) References Cited

OTHER PUBLICATIONS

"Semiconductor Power Conversion Circuit", OHM Ltd., 1987, Institute of Electrical Engineers of Japan, 7 pages with partial translation.

Office action dated Nov. 29, 2013 in corresponding Chinese Application No. 201110404593.4.

Office Action issued Jun. 19, 2014 in corresponding CN Application No. 201110404593.4 (with English translation).

* cited by examiner

POWER CONVERSION DEVICE FOR A ROTARY ELECTRIC MACHINE

CROSS REFERENCE TO RELATED APPLICATION

This application is based on Japanese patent application No. 2010-272598 filed on Dec. 7, 2010.

FIELD OF THE INVENTION

The present invention relates to a power conversion device for a rotary electric machine.

BACKGROUND

Conventional power conversion devices control a current relating to driving of a rotary electric machine through pulse width modulation (hereinafter, referred to as PWM) as disclosed in Japanese patent No. 3687861 (U.S. Pat. No. 5,933,344) and Japanese patent No. 2577738 (U.S. Pat. No. 4,847,743). In a case where the rotary electric machine is a three-phase motor, to improve the voltage use rate in PWM control, two-phase modulation is performed, in which a voltage of one phase is fixed and only the other two-phases are modulated as disclosed in "Semiconductor Power Conversion Circuit", OHM Ltd., 1987, Institute of Electrical Engineers of Japan.

As methods of controlling PWM, a triangular wave comparing method and an instantaneous voltage vector selecting method are known. For example, in the triangular wave comparing method, when any one phase of a command signal (hereinafter, referred to as a duty command value) relating to a voltage applied to each phase of a coil of a rotary electric machine is constantly 100% or 0%, the above-described two-phase modulation is performed, whereby the highest inter-line voltage can be output. In addition, the closer to 0% or 100% the duty is, the higher the inter-line voltage that is applied.

In addition, in the conventional power conversion device, to prevent formation of a short circuit due to simultaneous turning on of a high electric potential-side switching device and a low electric potential-side switching device of each phase, a dead time is provided so that the high electric potential-side switching device and the low electric potential-side switching device are turned off. In a case where the dead time is provided, a duty command value close to 0% or 100% cannot be output depending on the microcomputer, and an applicable inter-line voltage is limited. Thus, in Japanese patent No. 3687861 (U.S. Pat. No. 5,933,344), duty that is close to 0% or 100% can be output by changing the configuration of a counter circuit arranged inside the microcomputer. However, according to Japanese patent No. 3687861 (U.S. Pat. No. 5,933,344), a special circuit is necessary, and accordingly, the configuration is complicated.

In addition, in a case where the dead time is provided, the inter-line voltage is distorted due to the influence of the dead time, whereby a current is distorted. Accordingly, a torque ripple is generated, or vibration or noise is generated. Thus, according to Japanese patent No. 2577738 (U.S. Pat. No. 4,847,743), three-phase modulation is performed at the time of a low voltage, and two-phase modulation is performed at the time of a high voltage, whereby the distortion of the voltage due to the influence of the dead time is decreased. However, in Japanese patent No. 2577738 (U.S. Pat. No. 4,847,743), the influence of the dead time cannot be avoided at the time of a high voltage.

SUMMARY

It is an object of the present invention to provide a power conversion device that improves a voltage use rate and decreases distortion of inter-line voltages.

A power conversion is provided to control power supplied to coils corresponding to each phase of a rotary electric machine through pulse width modulation. The power conversion device has an inverter unit and a control unit. The inverter unit includes high electric potential-side switching devices arranged on a high electric potential-side and low electric potential-side switching devices arranged on a low electric potential side in correspondence with each phase of the coils of the rotary electric machine. The control unit, in a case where there is a phase at which an on-time of the high electric potential-side switching devices or an on-time of the low electric potential-side switching devices is shorter than a predetermined time, which is determined based on a dead time set to prevent the high electric potential-side switching device and the low electric potential-side switching device corresponding to each phase of the coils from turning on simultaneously, changes an output voltage average value that is an average value of voltages applied to each phase of the coils by controlling switching between ON and OFF of the high electric potential-side switching devices and the low electric potential-side switching devices of all the phases such that the on-time becomes equal to or longer than the predetermined time.

Preferably, the control unit includes a duty converting section, a modulation section and a shifting section. The duty converting section calculates duty conversion values having different phases for each phase based on voltage command values applied to the coils of each phase. The modulation section calculates modulated duty command values acquired by modulating duties that are based on the duty conversion values of each phase calculated by the duty converting section. The shifting section calculates shifted duty command values acquired by shifting the modulated duty command values of each phase based on a shifting value that is set such that the on-time is equal to or longer than the predetermined time, in a case where there is a phase at which the on-time of the high electric potential-side switching devices or the low electric potential-side switching devices is shorter than the predetermined time when the high electric potential-side switching devices and the low electric potential-side switching devices are turned on or off based on the modulated duty command values modulated by the modulation section. The control unit thus controls the switching between ON and OFF of the high electric potential-side switching devices and the low electric potential-side switching devices based on the duty command values calculated based on the shifted duty command values.

The dead time may be set to any value, which effectively prevents the high potential-side switching device and the low potential-side switching device from turning on at the same time. It may be set to a period in which off-signals for turning off the switching devices are being output, a period in which the switching devices are being turned off.

BRIEF DESCRIPTION OF THE DRAWINGS

The above and other objects, features and advantages of a power conversion device will become more apparent from the following detailed description made with reference to the accompanying drawings. In the drawings:

FIGS. 12A and 126 are diagrams illustrating a duty command and ON/OFF of a switching device according to the third embodiment;

FIGS. 16A and 166 are diagrams illustrating a duty command and ON/OFF of a switching device according to the third embodiment;

DETAILED DESCRIPTION

Figure 1:
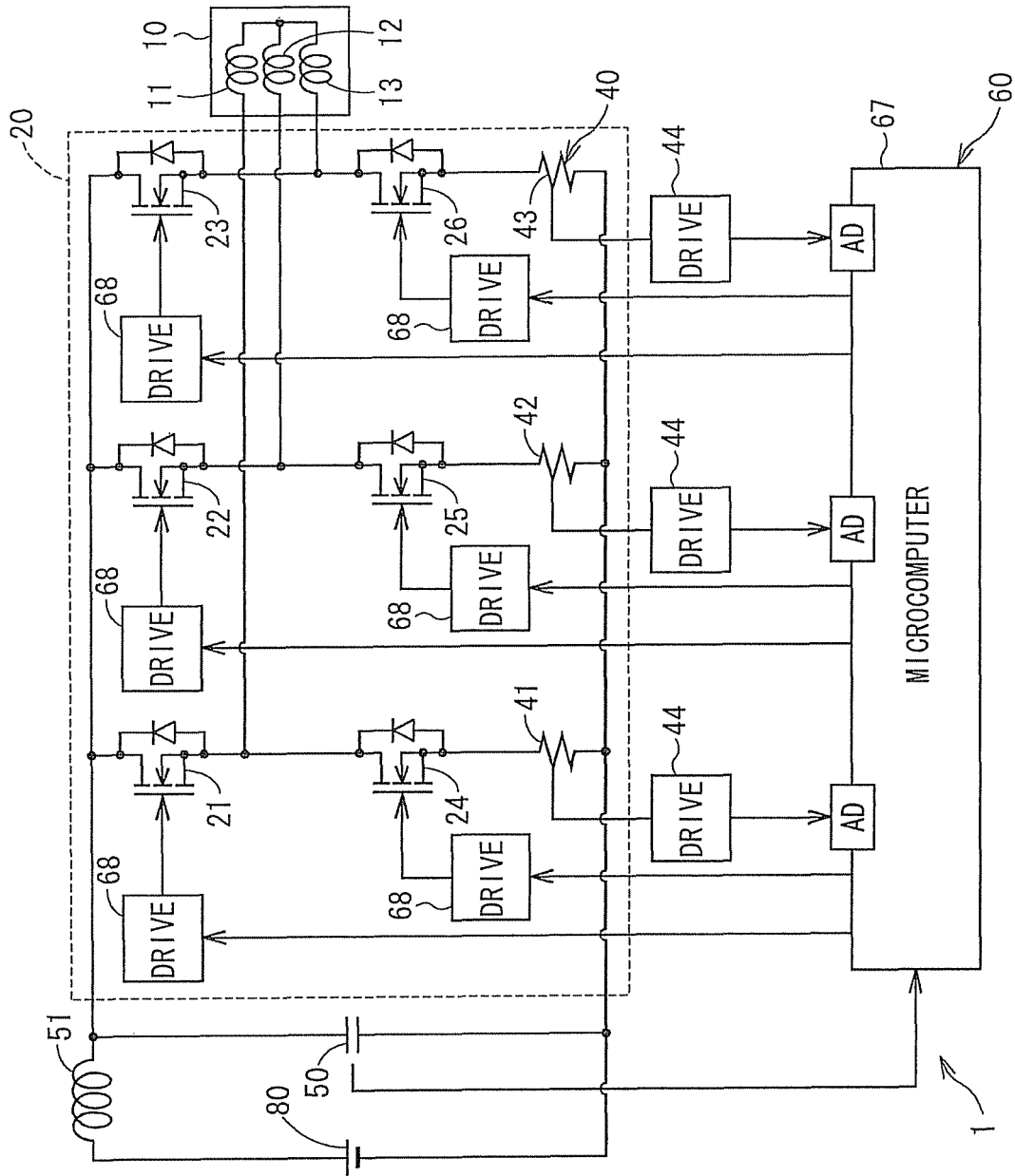
FIG. 1 is a circuit diagram illustrating a power conversion device according to a first embodiment.

A power conversion device will be described in detail with reference to various embodiments illustrated in the accompanying drawings. In the following embodiments, the same reference numerals designate the same or similar parts.

First Embodiment

A power conversion device 1 according to a first embodiment will be described with reference to FIGS. 1 to 6C.

The power conversion device 1 is formed as illustrated in FIG. 1, so that the power conversion device 1 controls the driving of a motor 10 as a rotary electric machine through pulse width modulation (PWM). The motor 10, for example, is an electric motor mounted in a vehicle and is applied to an electric fan, an oil pump, a water pump, an electric power steering device for assisting a steering operation of the vehicle, and the like. In addition, it is apparent that the motor 10 may be used for other than an in-vehicle device.

The motor 10 is a three-phase brushless motor and includes a rotor and a stator, although not shown in the figure. The rotor is a disc-shaped member, and permanent magnets are attached to the surface thereof to have magnetic poles. The stator houses the rotor therein to relatively rotate. The stator includes protrusions that protrude in the inward diameter direction for every predetermined angular interval. About these protrusions, a U-phase coil 11, a V-phase coil 12, and a W-phase coil 13 are wound. The U-phase coil 11, the V-phase coil 12, and the W-phase coil 13 correspond to coils.

The power conversion device 1 includes an inverter unit 20, a current detecting unit 40, a capacitor 50, a choke coil 51, a control unit 60, a battery 80, and the like.

The inverter unit 20 is a three-phase inverter. In the inverter unit 20, to perform switching between conduction to the U-phase coil 11, the V-phase coil 12 and the W-phase coil 13, six switching devices 21 to 26 are connected in a bridge form. Here, the switching devices 21 to 26 are MOSFETs (metal-oxide-semiconductor field-effect transistors). However, other types of transistor may be used. The switching devices 21 to 26 will be referred to as SWs 21 to 26.

Three SWs 21 to 23 have respective drains connected to the positive electrode side of the battery 80. In addition, the SWs 21 to 23 have respective sources connected to the drains of the SWs 24 to 26. The sources of the SW 24 to 26 are connected to the negative-polarity side of the battery 80 through the U-phase current detecting section 41, the V-phase current detecting section 42, and the W-phase current detecting section 43.

The connection point of the SW 21 and the SW 24 disposed as a pair is connected to one end of the U-phase coil 11. In addition, the connection point of the SW 22 and the SW 25 disposed as a pair is connected to one end of the V-phase coil 12. The connection point of the SW 223 and the SW 25 disposed as a pair is connected to one end of the W-phase coil 13.

Each of the SWs 21 to 23 that are switching devices arranged on the high electric potential side is referred to as a high SW, and each of the SWs 24 to 26 that are switching devices arranged on the lower electric potential side is referred to as a low SW. In addition, when necessary, a phase symbol U, V or W is attached to each SW, for example, a U-phase high SW 21.

The current detecting unit 40 is formed by a U-phase current detecting section 41, a V-phase current detecting section 42 and a W-phase current detecting section 43. In this embodiment, the U-phase current detecting section 41, the V-phase current detecting section 42 and the W-phase current detecting section 43 are formed by shunt resistors. The U-phase current detecting section 41, the V-phase current detecting section 42 and the W-phase current detecting section 43 may be referred to as current detecting sections 41 to 43 as well. The U-phase current detecting section 41 is disposed between the U-phase low SW 24 and the ground and detects a current flowing through the U-phase coil 11. In addition, the V-phase current detecting section 42 is disposed between the V-phase low SW 25 and the ground and detects a current flowing through the V-phase coil 12. The W-phase current detecting section 43 is disposed between the W-phase low SW 26 and the ground and detects a current flowing through the W-phase coil 13. The phase currents detected as voltages are applied to the control unit 60 through amplifier circuits 44 and subjected to analog-digital (AD) conversion. The resulting digital values (AD values) are stored in a register in the control unit 60. Here, the acquisition of the AD values, which is performed by the register, is performed simultaneously for the current detecting sections 41 to 43. In addition, in a case where a position sensor, which is not shown in the figure, detecting the rotation angle of the motor 10 is disposed, it is preferable to simultaneously acquire the rotation angle θ of a motor that is detected by the position sensor.

The capacitor 50 and the choke coil 51 are arranged between the battery 80 and the inverter unit 20 and form a power filter. Accordingly, noises that are transmitted from other devices sharing the battery 80 are reduced. In addition, noises that are transmitted from the inverter unit 20 side to the other devices sharing the battery 80 are reduced. By accumulating electric charge, the capacitor 50 supports the supply of power to the SWs 21 to 26 and suppresses noise components such as a surge current. The voltage V50 developed across the capacitor 50 is acquired by the control unit 60.

The control unit 60 controls the overall operation of the power conversion device 1 and is formed by a microcomputer 67, a register not shown in the figure, a driving circuit 68 and the like.

The control unit 60 reads in the AD values that are detected by the current detecting sections 41 to 43 and are stored in the register and calculates a U-phase current Iu conducted through the U-phase coil 11, a V-phase current Iv conducted through the V-phase coil 12 and a W-phase current Iw conducted through the W-phase coil 13 based on the AD values. Based on the calculated three-phase currents Iu, Iv and Iw, after current feedback calculation is performed, voltage command values Vu*, Vv* and Vw* are calculated. In this embodiment, since PWM control is performed by using an instantaneous voltage vector selecting method, a command vector Vc corresponding to eight switching states is calculated based on the voltage command values Vu*, Vv* and Vw*.

Figure 2:
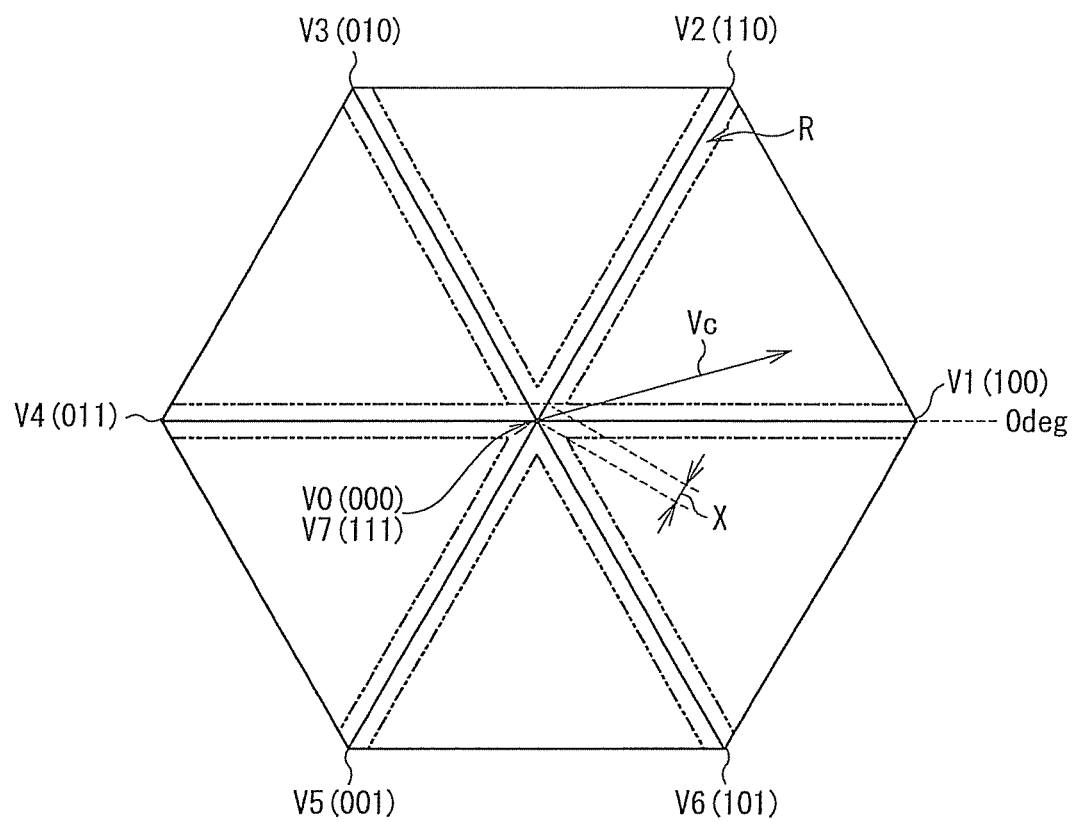
FIG. 2 is a vector diagram illustrating a voltage vector according to the first embodiment.

A spatial voltage vector diagram illustrated in FIG. 2 is represented in a complex plane having a regular hexagon shape that is formed by six regular triangles. Each one of the vertexes V1 to V6 represents an effective voltage vector, in which at least one of the high SWs 21 to 23 and at least one of the low SWs 24 to 26 are turned on. In addition, inside each set of parentheses following the effective voltage vectors V1 to V6 in FIG. 2, the switching states of the U-phase high SW 21, the V-phase high SW 22 and the W-phase high SW 23 are represented in this order. Each switching state is denoted by "1" in a case where the SW is turned on and is denoted by "0" in a case where a corresponding SW is turned off. For example, V1(100) is a state in which the U-phase high SW 21 is turned on, the V-phase high SW 22 and the W-phase high SW 23 are turned off. In this instance, V1(100), the U-phase low SW 24 is turned off and both of the V-phase low SW 25 and the W-phase low SW 26 are turned on. Thus, in each phase, when one of the high SW and the low SW is turned on, the other is turned off. In addition, the center point in the complex plane represents two zero-voltage vectors of V7 (111) and V0 (000).

For example, in a case where the command vector Vc calculated by the control unit 60 is between effective voltage vectors V1 and V2, this command vector Vc is output by using at least one side of the effective voltage vector V1 and the effective voltage vector V2 that are positioned on both sides of the command vector Vc and the zero-voltages vectors V0 and V7. In this embodiment, the effective voltage vector V1 corresponds to an electric angle of 0 degree and an electric angle is increased in a clockwise direction up to 360 degrees. In addition, the length of the command vector Vc corresponds to a voltage that is output, and by rotating the command vector Vc in the clockwise direction, a three-phase AC voltage is output.

In this embodiment, the effective voltage vectors V1 to V6 correspond to basic vectors. The zero vector V7, in which all the high SWs 21 to 23 are turned on, corresponds to a first zero-voltage vector. A zero-voltage vector V0, in which all the low SWs 24 to 26 are turned on, corresponds to a second zero-voltage vector. In addition, the effective voltage vectors V1, V3 and V5, in which one high SW is turned on and two low SWs are turned on, are referred to as odd vectors. Effective voltage vectors V2, V4 and V6, in which two high SWs are turned on and one low SW is turned on, are referred to as even vectors.

In addition, in this embodiment, a threshold value x is set based on the dead time. When the command vector Vc passes through a point, at which the length of one effective voltage vector is the threshold value X, and is located in a radial area (an area, which is surrounded by a dashed-two dotted line, denoted by R in FIG. 2) that is formed by a straight line parallel to an effective voltage vector that is adjacent to the above-described effective voltage vector, the distortion of the inter-line voltage is decreased by switching the modulation mode from the two-phase modulation to the three-phase modulation. The process of switching between the two-phase modulation and the three-phase modulation will be described later. In addition, in a case where the command voltage Vc is shorter than the threshold value X, such a command vector Vc cannot be output in case of certain microcomputers.

Figure 3A:
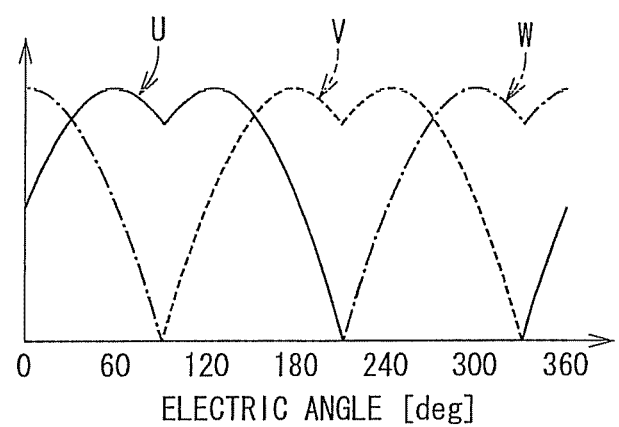
FIGS. 3A and 3B are schematic diagrams illustrating low-side two-phase modulation in a case where no dead time is provided, with FIG. 3A illustrating a modulated wave of a low-side two-phase modulation and FIG. 3B illustrating an inter-line voltage.

In this embodiment, to improve the voltage use efficiency, the two-phase modulation is performed. In this embodiment, as illustrated in FIG. 3A, the two-phase modulation in which any one of the low SWs 24 to 26 is turned on is performed. In addition, a case where the control is performed as above is approximately the same as a case where modulation is performed such that the duty command value of the lowest phase is a predetermined low limit value (in this case, a duty of 2%) in the triangular wave comparing method. The modulation method described above is referred to as a low-side two-phase modulation. Accordingly, the output voltage average value that is an average value of the voltages applied to the coils 11 to 13 changes. Since the PWM control is performed by using the instantaneous voltage vector selecting method, in the low-side two-phase modulation, the zero-voltage vector V0 (000), in which all the low SWs 24 to 26 are turned on, is used as the zero-voltage vector.

Figure 3B:
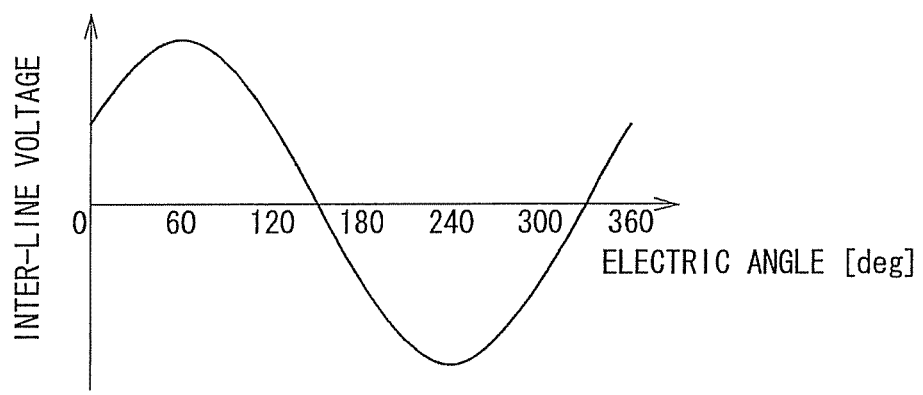
Figure 4A:
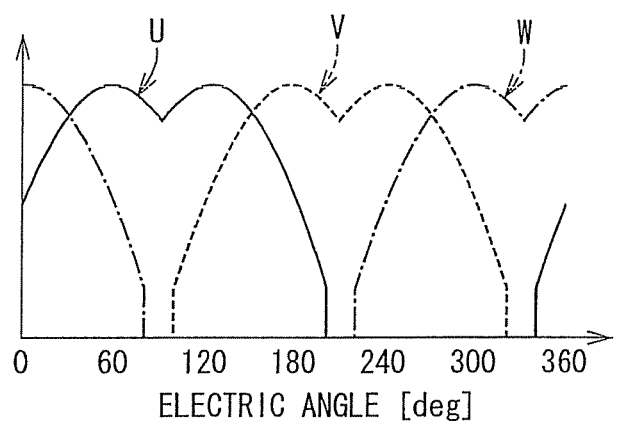
FIGS. 4A and 4B are schematic diagrams illustrating low-side two-phase modulation in a case where there is a dead time, with FIG. 4A illustrating a modulated wave of the low-side two-phase modulation and FIG. 4B illustrating an inter-line voltage.
Figure 4B:
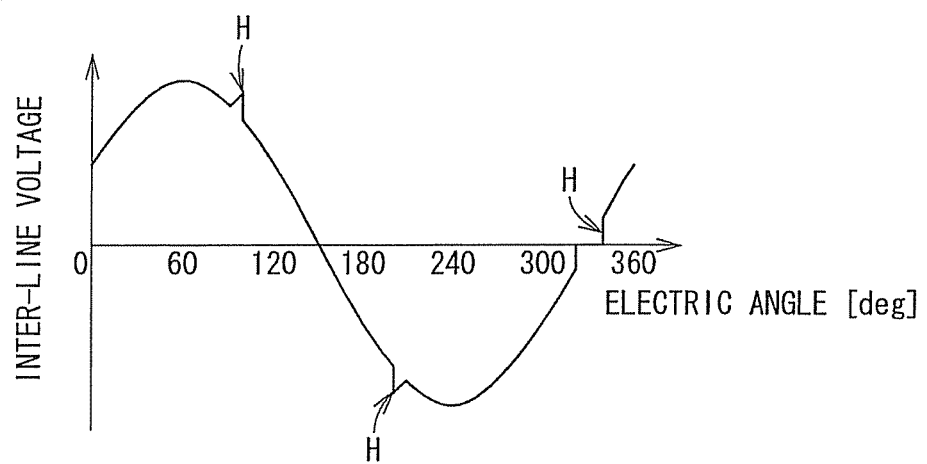
Figure 5:
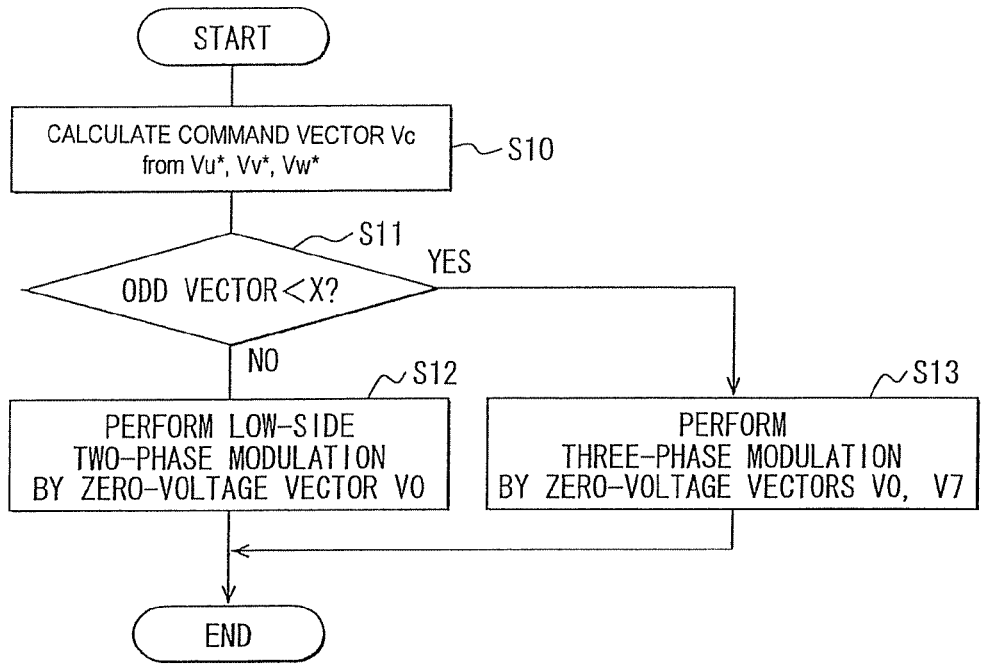
FIG. 5 is a flowchart illustrating a modulation process according to the first embodiment.

In the example illustrated in FIG. 3A, a dead time, in which all the high SWs 21 to 23 and the low SWs 24 to 26 corresponding to the phases are turned off, is not provided. In a case where the control process is performed as in FIG. 3A, the inter-line voltage is a sinusoidal wave as shown in FIG. 3B. However, actually, to prevent formation of a short circuit due to simultaneous turning on of the high SWs 21 to 23 and the low SWs 24 to 26 forming each phase, it is necessary to provide the dead time, in which the high SWs 21 to 23 and the low SWs 24 to 26 corresponding to the phases are simultaneously turned off. In a case where the low-side two-phase modulation is performed by providing the dead time, a modulated wave as illustrated in FIG. 4A is formed, and a distortion as denoted by H arises in the inter-line voltage as illustrated in FIG. 4B. When the distortion arises in the inter-line voltage, the currents conducted through the coils 11 to 13 have distortions. Accordingly, a torque ripple is generated, or a vibration or a noise is generated.

To prevent generation of the distortion in the inter-line voltage even in a case where the dead time is set, the PWM is controlled by using the low-side two-phase modulation and the three-phase modulation. This modulation process is performed by the control unit 60 as described below with reference to a flowchart illustrated in FIG. 5.

In the first step 10 ("step" will abbreviated as S below), a command vector Vc is calculated based on the voltage command values Vu*, Vv* and Vw*.

In S11, when the command vector Vc is decomposed into effective voltage vectors positioned on both sides of the command vector Vc, it is checked whether the effective voltage vectors are less than a threshold value X (FIG. 2) that is set based on the dead time. It is checked whether the odd vector is less than the threshold value X.

In a case that the odd vector is less than the threshold value X (S11: Yes), the process proceeds to S13. On the other hand, in a case that the odd vector is not less than the threshold value X (S11: No), the process proceeds to S12.

In S12, two-phase modulation is performed by using one zero-voltage vector out of the zero-voltage vectors. The low-side two-phase modulation is performed by using the zero-voltage vector V0.

In S13 to which the process proceeds in a case where the odd vector is determined to be less than the threshold value X (S11: Yes), three-phase modulation is performed by replacing the two-phase modulation such that the on-time of the SWs 21 to 26 is equal to or longer than a predetermined time that is determined based on the dead time, by using the zero-voltage vectors V0 and V7.

Figure 6A:
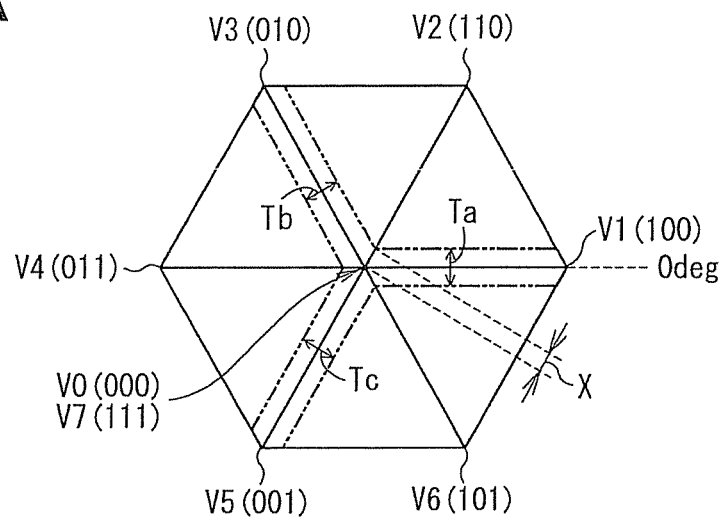
FIGS. 6A to 6C are diagrams illustrating the low-side two-phase modulation according to the first embodiment, with FIG. 6A illustrating a vector, FIG. 6B illustrating a waveform before three-phase modulation and FIG. 6C illustrating a waveform after the three-phase modulation.

The case where the odd vector is less than the threshold value X set based on the dead time when the command vector Vc is decomposed into effective voltage vectors positioned on both sides of the command vector Vc is a case where the command vector Vc is in periods Ta, Tb and Tc shown in FIG. 6A. On the other hand, the case where the odd vector is not less than the threshold value X is a case where the command vector is in a period other than the periods Ta, Tb and Tc.

Figure 6B:
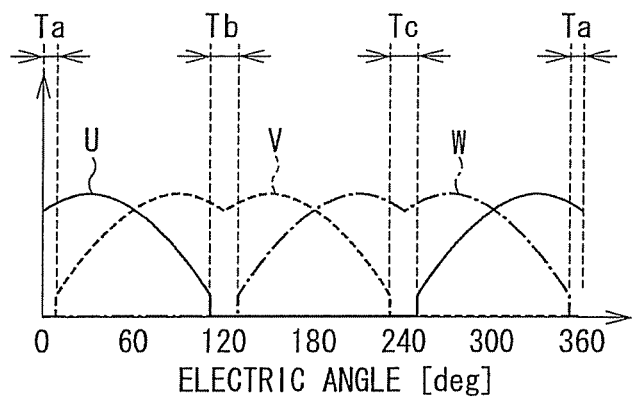

After the dead time is set, in a case where the low-side two-phase modulation is continued in the periods Ta, Tb and Tc, theoretically, there is a phase in which the on-time of the high SWs 21 to 23 or the on-time of the low SWs 24 to 26 is less than a predetermined time that is based on the dead time. In such a case in which the on-time cannot be output, the modulated wave becomes as illustrated in FIG. 6B, and the inter-line voltage becomes as illustrated in FIG. 4B, in which a distortion arises.

Figure 6C:
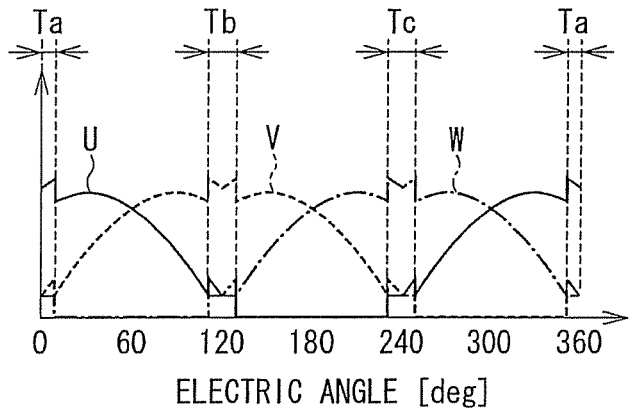

In a case where the three-phase modulation is performed instead of the low-side two-phase modulation such that the on-time of the high SWs 21 to 23 or the on-time of the low SWs 24 to 26 is not less than a predetermined time that is based on the dead time in periods Ta, Tb and Tc, a modulated waveform becomes as illustrated in FIG. 6C. In addition, the inter-line voltage, as illustrated in FIG. 3B, is a sinusoidal wave having no distortion. As above, by performing three-phase modulation by replacing the low-side two-phase modulation in the periods Ta, Tb and Tc, even in a case where a dead time is set, a distortion does not occur in the inter-line voltage, and there is no distortion in currents conducted through the coils 11 to 13. Accordingly, generation of torque ripple, vibration or noise can be suppressed. In addition, in the periods Ta, Tb and Tc in which the modulation mode is switched from the low-side two phase modulation to the three-phase modulation, an output voltage average value that is an average value of voltages applied to the phases of the coils 11 to 13 changes.

As described above, the power conversion device 1 controls the power supplied to the coils 11 to 13 corresponding to each phase of the motor 10 through the PWM modulation. The power conversion device 1 includes the inverter unit 20 and the control unit 60. The inverter unit 20 includes the high SWs 21 to 23 arranged on the higher electric potential side and the low SWs 24 to 26 arranged on the lower electric potential side, which correspond to the phases of the coils 11 to 13 of the motor 10. In a case where there is a phase in which the on-time of the high SWs 21 to 23 and the low SWs 24 to 26 is less than a predetermined time determined based on the dead time (S11=Yes in FIG. 5), the control unit 60 performs control through three-phase modulation, in which switching between ON and OFF of the high SWs 21 to 23 and the low SWs 24 to 26 of all the phases is controlled such that the on-time of the high SWs 21 to 23 or the on-time of the low SWs 24 to 26 is equal to or longer than a predetermined time and changes the output voltage average value that is the average value of voltages applied to the phases of the coils 11 to 13 (S13). Accordingly, by combining the two-phase modulation and the three-phase modulation without providing a special circuit, the voltage use rate can be improved. In addition, the distortion of the inter-line voltage or the distortion of the current due to the influence of the dead time and a vibration or a noise accompanied therewith can be suppressed.

In this embodiment, the PWM control is performed based on the instantaneous voltage vector selecting method that is based on the command vector Vc. The control unit 60 controls the switching between ON and OFF of the high SWs 21 to 23 and the low SWs 24 to 26 through two-phase modulation in which a control process is performed by using the zero-voltage vector V7 in which all the high SWs 21 to 23 are turned on or the zero-voltage vector V0 in which all the low SWs 24 to 26 are turned on as zero-voltage vectors. The switching between ON and OFF of the high SWs 21 to 23 and the low SWs 24 to 26 is controlled through the low-side two-phase modulation in which a control process is performed by using the zero-voltage vector V0 in which all the low SWs 24 to 26 are turned on (S12).

In addition, when the command vector Vc is decomposed into effective voltage vectors V1 to V6, in a case where effective voltage vectors V1 to V6 are less than a threshold value X that is set based on the dead time (S11=Yes), the modulation mode is switched to the three-phase modulation in which a control process is performed by using the zero-voltage vectors V0 and V7 such that the on-time in which the SWs 21 to 26 are turned on is equal to or longer than a predetermined time (S13). Accordingly, by switching the modulation to the three-phase modulation in a case where the effective voltage vectors V1 to V6 acquired by decomposing the command vector Vc are less than the threshold value X, even in the instantaneous voltage vector selecting method, the switching between ON and OFF of the high SWs 21 to 23 and the low SWs 24 to 26 can be appropriately controlled, whereby the voltage use rate can be improved. In addition, the distortion of the inter-line voltage or the distortion of the current due to the influence of the dead time or a vibration or a noise accompanied therewith can be suppressed.

Particularly in this embodiment, in a case where the odd vector acquired by decomposing the command vector Vc is less than the threshold value X (S11: No), the switching between ON and OFF of the high SWs 21 to 23 and the low SWs 24 to 26 is controlled through the low-side two-phase modulation in which only the zero-voltage vector V0 is used as the zero-voltage vector (S12). On the other hand, in a case where an odd vector acquired by composing the command vector Vc is less than the threshold value X (S11: Yes), the modulation mode is switched to the three-phase modulation in which zero-voltage vectors V0 and V7 are used (S13). That is, even in a case where the even vector acquired by decomposing the command vector Vc is less than the threshold value X, the modulation mode is not switched to the three-phase modulation, but the low-side two-phase modulation is continued. Accordingly, an area for which the three-phase modulation is performed decreases, and accordingly, the switching loss can be reduced even when a low voltage is applied. Furthermore, by performing the low-side two-phase modulation, the loss and the heat generation of the high SWs 21 to 23 can be reduced.

In addition, the control unit 60 operates as a two-phase modulation section and a three-phase modulation section. In addition, S12 shown in FIG. 5 corresponds to a process as a function of the two-phase modulation section, and S13 corresponds to a process as a function of the three-phase modulation section.

Second Embodiment

In the first embodiment, to improve the voltage use rate, the low-side two-phase modulation, in which any one of the low SWs 24 to 26 is turned on, is performed. However, according to a second embodiment, the power conversion device 1 is configured to perform two-phase modulation such that any one of the high SWs 21 to 23 is turned on. This control performed as above is approximately the same as the control, in which modulation is performed such that the duty command value of the highest duty phase attains a predetermined high limit value (in this case, a duty of 102%) in the triangular wave comparing method. This modulation method is referred to as high-side two-phase modulation.

Accordingly, similarly to the first embodiment, the output voltage average value that is an average value of the voltages applied to the coils 11 to 13 is changed. In this embodiment, since the PWM control is performed by using the instantaneous voltage vector method, in the high-side two-phase modulation, the zero-voltage vector V7 (111), in which all the high SWs 21 to 26 are turned on, is used as the zero-voltage vector.

To prevent generation of the distortion of the inter-line voltage even in a case where the dead time is set, the PWM control is performed by using the high-side two-phase modulation and the three-phase modulation. Thus, the modulation process of the control unit 60 is performed as described with reference to the flowchart in FIG. 7.

In S20, a command vector Vc is calculated based on the voltage command values Vu*, Vv* and Vw*. In S21, when the command vector Vc is decomposed into effective voltage vectors positioned on both sides of the command vector Vc, it is checked whether the effective voltage vectors are less than the threshold value X (FIG. 2) that is set based on the dead time. It is checked whether the even vector is less than the threshold value X. In a case that the even vector is less than the threshold value X (S21: Yes), the process proceeds to S23. On the other hand, in a case that the even vector is not less than the threshold value X (S21: No), the process proceeds to S22.

In S22, two-phase modulation is performed by using one zero-voltage vector out of the zero-voltage vectors. The high-side two-phase modulation is performed by using the zero-voltage vector V7.

In S23, to which the process proceeds in a case where the even vector is determined to be less than the threshold value X (S21: Yes), three-phase modulation is performed by replacing the two-phase modulation such that the on-time of the SWs 21 to 26 is equal to or longer than a predetermined time that is determined based on the dead time, by using the zero-voltage vectors V0 and V7.

Figure 8A:
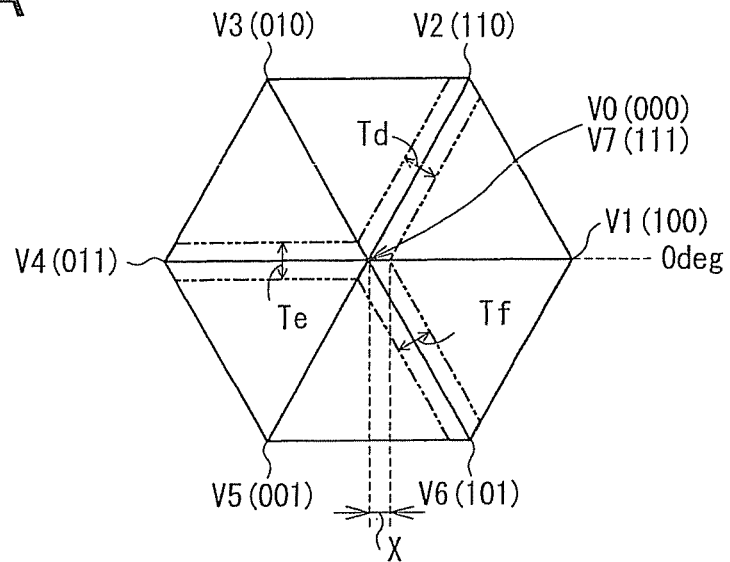
FIGS. 8A to 8C are diagrams illustrating high-side two-phase modulation according to the second embodiment, with FIG. 8A illustrating a vector, FIG. 8B illustrating a waveform before three-phase modulation and FIG. 8C illustrating a waveform after the three-phase modulation.

The case where the even vector is less than the threshold value X set based on the dead time when the command vector Vc is decomposed into effective voltage vectors positioned on both sides of the command vector Vc is a case where the command vector is in periods Td, Te and Tf shown in FIG. 8A. On the other hand, the case where the even vector is not less than the threshold value X is a case where the command vector is in a period other than periods Td, Te and Tf shown in FIG. 8A.

Figure 8B:
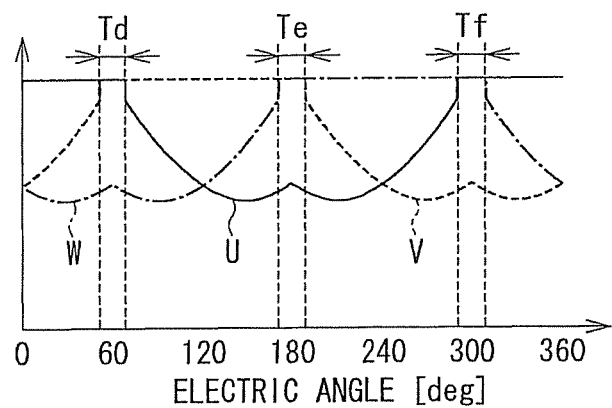

After the dead time is set, in a case where the high-side two-phase modulation is continued in periods Td, Te and Tf, theoretically, there is a phase in which the on-time of the high SWs 21 to 23 or the on-time of the low SWs 24 to 26 is less than the predetermined time that is based on the dead time. In such a case in which the on-time cannot be output, the modulated wave becomes as illustrated in FIG. 8B, and the inter-line voltage becomes as illustrated in FIG. 4B, in which a distortion arises.

Figure 8C:
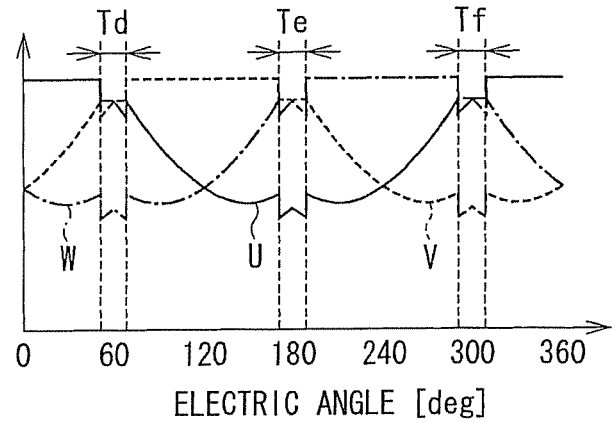

In a case where the three-phase modulation is performed by replacing the high-side two-phase modulation such that the on-time of the high SWs 21 to 23 or the on-time of the low SWs 24 to 26 is not less than the predetermined time that is based on the dead time in periods Td, Te and Tf, the modulated waveform becomes as illustrated in FIG. 8C. In addition, the inter-line voltage is the sinusoidal wave having no distortion as illustrated in FIG. 3B. By thus performing the three-phase modulation by replacing the high-side two-phase modulation in the periods Td, Te and Tf, even in a case where the dead time is set, distortion does not occur in the inter-line voltage, and there is no distortion in currents conducted through the coils 11 to 13. Accordingly, the generation of torque ripple, vibration or noise can be suppressed. In addition, in the periods Td, Te and Tf, in which the modulation mode is switched from the high-side two-phase modulation to the three-phase modulation, an output voltage average value that is an average value of voltages applied to the phases of the coils 11 to 13 is changed.

Accordingly, the same advantages as those of the first embodiment are provided.

Figure 7:
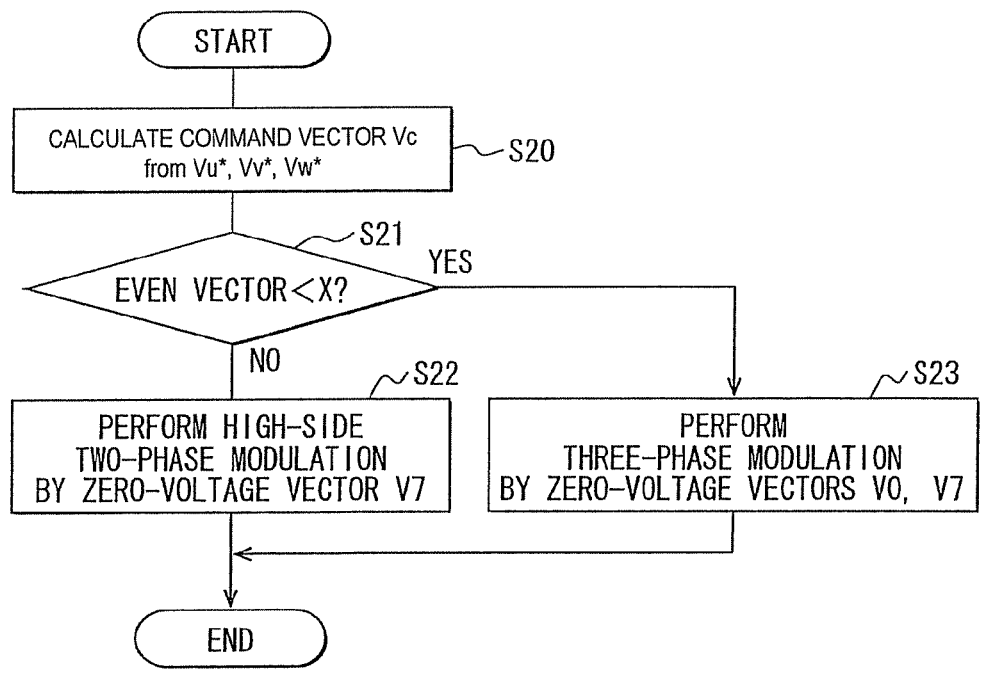
FIG. 7 is a flowchart illustrating a modulation process according to a second embodiment.

Particularly in this embodiment, in a case where the even vectors acquired by decomposing the command vector Vc are not less than the threshold value X (S21 illustrated in FIG. 7: No), the switching between ON and OFF of the high SWs 21 to 23 and the low SWs 24 to 26 is controlled through the high-side two-phase modulation using only the zero-voltage vector V7 as the zero-voltage vector (S22). On the other hand, in a case where the even vectors acquired by decomposing the command vector Vc are less than the threshold value X S21: Yes), the modulation mode is changed to the three phase modulation using the zero-voltage vectors V0 and V7 (S23). In this embodiment, even in a case where the odd vectors acquired by decomposing the command vector Vc are less than the threshold value X, the high-side two-phase modulation is continued without performing the three-phase modulation. Accordingly, an area for which the three-phase modulation is performed decreases, and accordingly, the switching loss can be reduced even when a low voltage is applied. Furthermore, by performing the high-side two-phase modulation, the loss and the heat generation of the low SWs 24 to 26 can be reduced.

In addition, the control unit 60 forms a two-phase modulation section and a three-phase modulation section. In addition, 522 shown in FIG. 7 corresponds to a process as a function of the two-phase modulation section, and S23 corresponds to a process as a function of the three-phase modulation section.

In the first and the second embodiments, the PWM control is performed by using an instantaneous voltage vector method. However, the PWM control using the triangular wave comparing method may be used as described below.

Third Embodiment

According to a third embodiment, the power conversion device 1 is configured to operate as illustrated in FIGS. 9A to 23C.

Figure 9A:
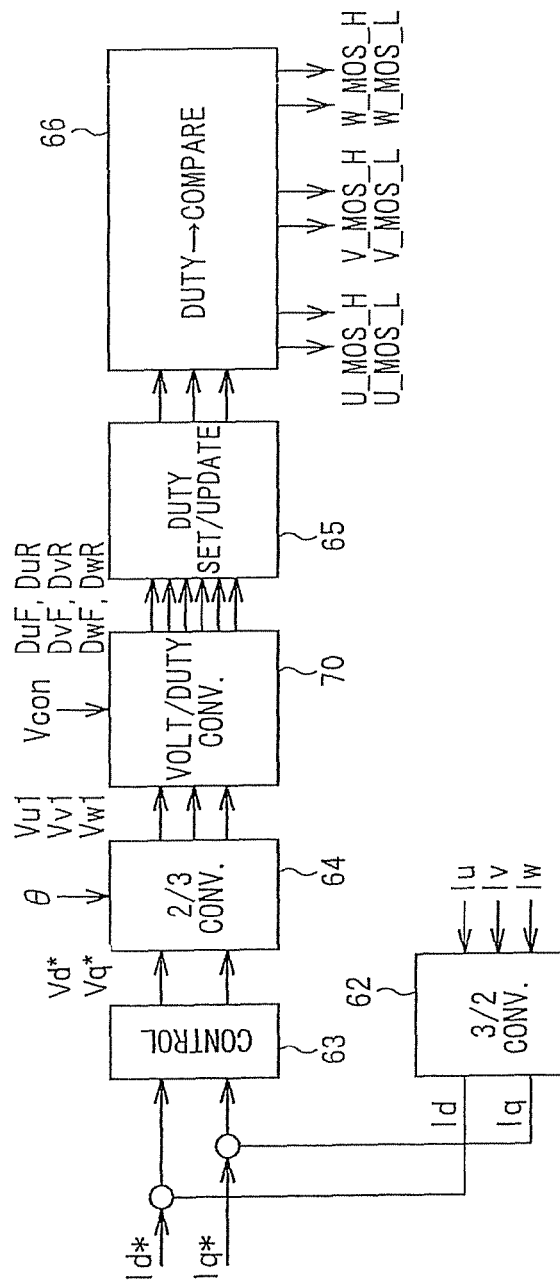
FIGS. 9A and 9B are block diagrams illustrating a duty converting process of a control unit according to a third embodiment, with FIG. 9A illustrating the entire duty converting process and FIG. 9B illustrating the duty converting process in detail.

As illustrated in FIG. 9A, the control unit 60 includes a three-phase/two-phase conversion section 62, a controller 63, a two-phase/three-phase conversion section 64, a duty converting section 70, a duty updating section 65, a triangular wave comparing section 66, and the like.

Here, the control process of the control unit 60 will be described with reference to FIGS. 9A and 9B.

The three-phase/two-phase conversion section 62 reads in the AD values that are detected by the current detecting sections 41 to 43 and are stored in the register and calculates the U-phase current Iu, the V-phase current Iv and the W-phase current Iw based on the read-in AD values. Based on the calculated three-phase currents Iu, Iv and Iw, a d-axis current detection value Id and a q-axis current detection value Iq are calculated.

The controller 63 performs current feedback calculation based on the d-axis current command value Id*, the q-axis current command value Iq*, the d-axis current detection value Id and the q-axis current detection value Iq, and calculates a d-axis voltage command value Vd* and a q-axis voltage command value Vq*. Specifically, the controller 63 calculates a current deviation ΔId between the d-axis current command value Id* and the d-axis current detection value Id and a current deviation ΔIq between the q-axis current command value Iq* and the q-axis current detection value Iq. Further, to allow the current detection values Id and Iq to follow the current command values Id* and Iq*, the voltage command values Vd* and Vq* are calculated such that the current deviations ΔId and ΔIq converge to zero.

The two-phase/three-phase conversion section 64 calculates three-phase voltage command values Vu1, Vv1 and Vw1 based on the voltage command values Vd* and Vq* calculated by the controller 63.

The duty converting section 70 calculates duty command values based on the three-phase voltage command values Vu1, Vv1 and Vw1 calculated by the two-phase/three-phase conversion section 64.

Figure 9B:
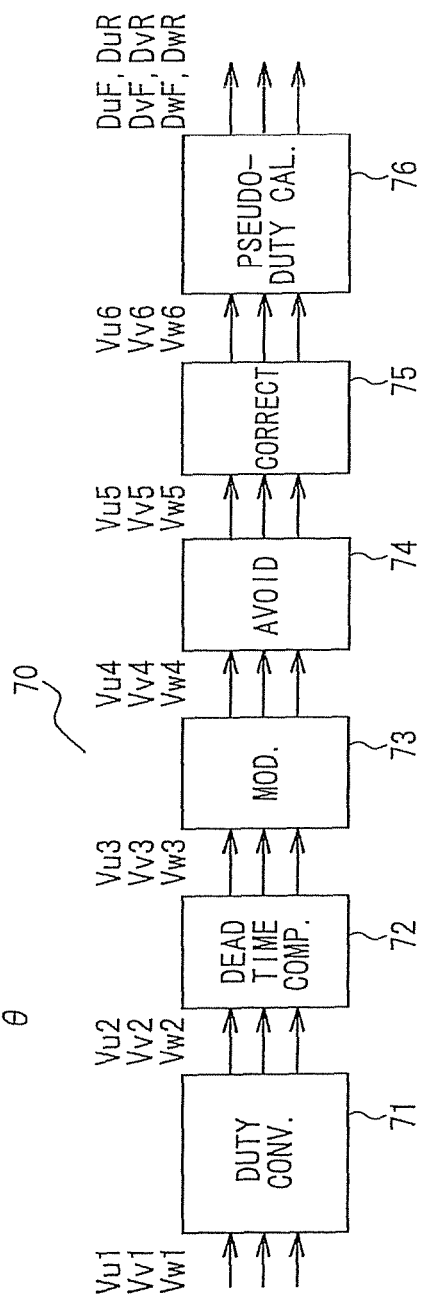

The duty converting section 70 is illustrated in detail in FIG. 9B. First, a duty converting section 71 converts the three-phase voltage command values Vu1, Vv1 and Vw1 into duty conversion values Vu2, Vv2 and Vw2, respectively.

A dead time compensating section 72 changes the duty conversion values Vu2, Vv2 and Vw2 based on the dead time compensation amount that is a value that is based on the dead time to eliminate the amount of change in the voltages applied to the coils 11 to 13 by the influence of the dead time and calculates the compensated duty command values Vu3, Vv3 and Vw3.

To improve the voltage use rate, a modulation section 73 modulates the compensated duty command values Vu3, Vv3 and Vw3 to calculate the modulated duty command values Vu4, Vv4 and Vw4. A value, which is acquired by subtracting a predetermined low limit value from a duty of the smallest duty phase, is subtracted from duties of all the phases such that the duty of the smallest duty phase becomes the predetermined low limit value. That is, the modulation section 73 performs the low-side two-phase modulation.

In addition, an avoidance section 74 performs a shifting process to avoid a duty, by which a distortion arises in the inter-line voltage due to the dead time to calculate shifted duty command values Vu5, Vv5 and Vw5. A correction section 75 performs a correction process for correcting the dead time compensated by the dead time compensating section 72 to calculate corrected duty command values Vu6, Vv6 and Vw6. In addition, a pseudo-duty calculating section 76 calculates duty command values DuF and DuR, duty command values DvF and DvR, and duty command values DwF and DwR based on the corrected duty command values Vu6, Vv6 and Vv6. The process of the duty converting section 70 will be described later in detail.

Figure 10:
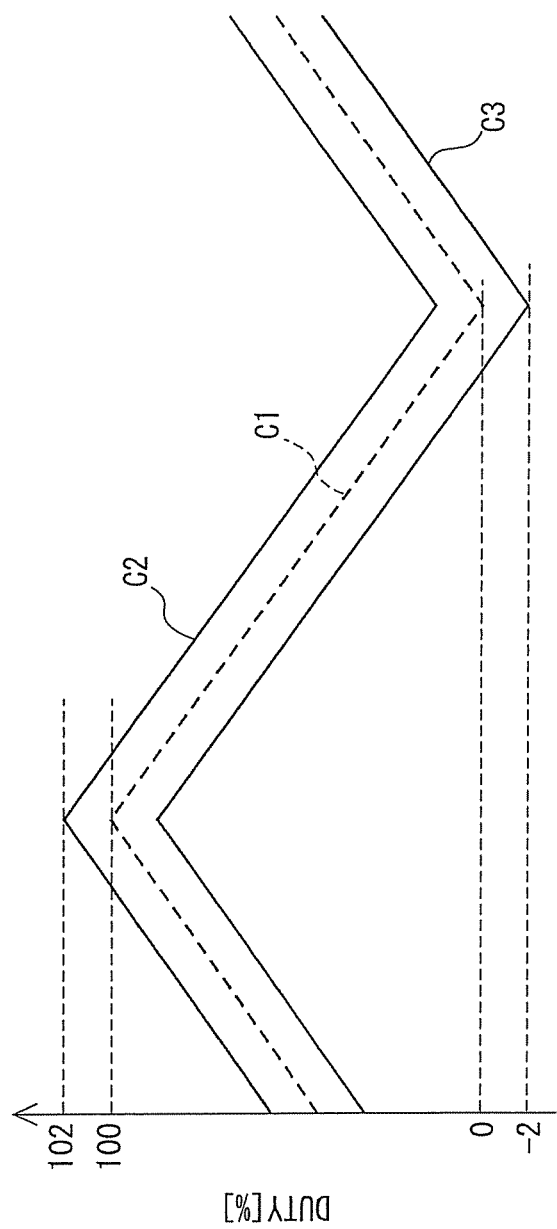
FIG. 10 is a diagram illustrating a high limit value and a low limit value of a duty according to the third embodiment.

Here, a method of setting a dead time by using the triangular wave comparing method is illustrated in FIG. 10. In the triangular wave comparing method, by comparing the duty command value calculated by the control unit 60 and a triangular wave command value, the ON/OFF of the SWs 21 to 26 is controlled. In the description below, a duty command value that is compared with the triangular command value by the triangular wave comparing section 66 will be abbreviated as a duty where appropriate. When the duty exceeds the triangular wave command value, the high SWs 21 to 23 are turned on. On the other hand, when the triangular wave command value exceeds the duty, the low SWs 24 to 26 are turned on. To arrange a dead time, a triangular wave command value C2 that is acquired by shifting a triangular wave command value C1 having the amplitude of a duty of 0% to 100% to the higher side and a triangular wave command value C3 that is acquired by shifting the triangular wave command value C1 to the low-side are generated.

Then, by controlling the switching between ON/OFF of the high SWs 21 to 23 based on the triangular wave command value C2 shifted to the higher side and by controlling the switching between ON/OFF of the low SWs 24 to 26 based on the triangular wave command value C3 shifted to the low-side, a dead time is set. The triangular command value C2 is shifted to the higher side by 2%, and the triangular wave command value C3 is shifted to the low-side by 2%. Accordingly, for convenience of the description, the range of the duty is −2% to 102%. In addition, the duty corresponding to the dead time on the side of the high SWs 21 to 23 is 2%, the duty corresponding to the dead time on the side of the low SWs 24 to 26 is 2%, and a total duty corresponding to the dead time is 4%. Hereinafter, where appropriate, the duty corresponding to the dead time is simply referred to as a dead time. In addition, in a case where the duty is between two triangular wave command values C2 and C3 (in this embodiment, −2% to 2% and 98% to 102%), in some microcomputers, there is a case where the duty cannot be output.

In addition, although the dead time is set to 4%, as one example, the dead time may be appropriately set by taking an effective pulse width and other factors into account. Furthermore, similarly, values set based on a dead time such as a dead time compensating value to be described later may be appropriately set. In addition, by considering a first start time or an end time until the SWs 21 to 26 are turned on or off, a time in which the high SWs 21 to 23 and the low SW 24 to 26 are turned off may be set as the dead time.

Furthermore, in a case where the dead time is arranged by using two triangular wave command values C2 and C3, within a predetermined range from −2% that is the low limit value of the duty and within a predetermined range from 102% that is the high limit value of the duty, the dead time at the time of output changes based on the duty.

Here, the relationship between the duty near −2%, which is the low limit value of the duty, and 102%, which is the high limit value of the duty, and the dead time will be described with reference to FIGS. 11A to 16B.

Figure 11A:
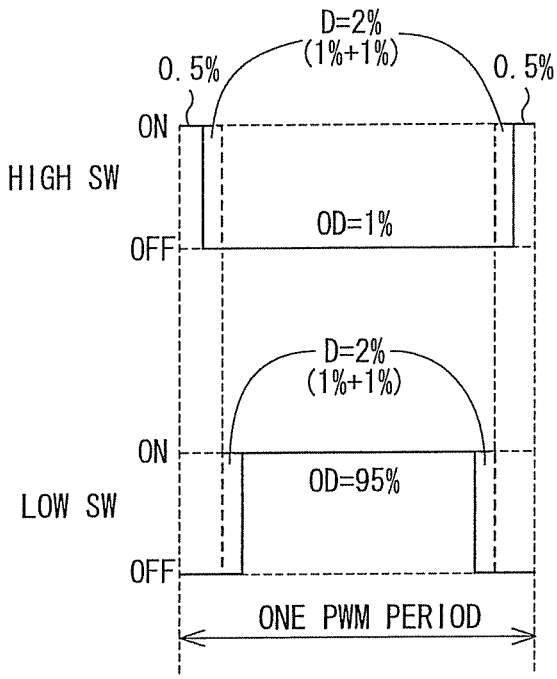
FIGS. 11A and 11B are diagrams illustrating a duty command and ON/OFF of a switching device according to the third embodiment.

As illustrated in FIG. 11A, when the duty is 3%, the ratio (hereinafter, referred to as a high SW on-duty and denoted by OD in the figure) of turning-on of the high SWs 21 to 23 in one PWM period (one PWM cycle) is 1% that is acquired by decreasing the duty of 3% by the dead time (denoted by D in the figure) of the high SW side of 2%. In addition, the ratio (hereinafter, referred to as a low SW on-duty and denoted by OD in the figure) of turning-on of the low SWs 24 to 26 in one PWM period is 95%, which is acquired by decreasing (100%−3%) by the dead time (denoted by D in the figure) of the low SW side of 2%. At this time, in the one PWM period, since the high SW on-duty is 1%, and the low SW on-duty is 95%, the dead time in which all the high SWs and the low SWs are turned off is 4% as is set.

Figure 11B:
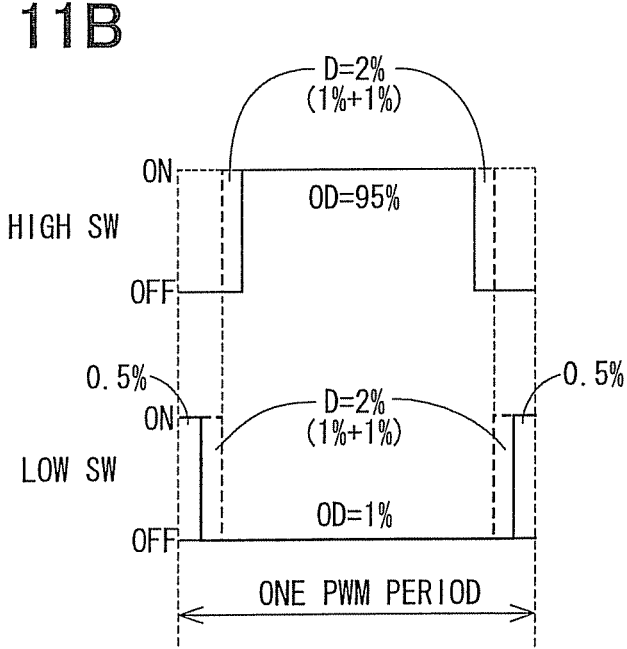

As illustrated in FIG. 11B, when the duty is 97%, the high SW on-duty is 95% acquired by decreasing 97% by the dead time of the high SW side of 2%. In addition, the low SW on-duty is 1% acquired by decreasing (100%−97%) by the dead time of the low SW side of 2%. At this time, in one PWM period, since the high SW on-duty is 95% and the low SW on-duty is 1%, the dead time in which all the high and low SWs are turned off is 4% as is set.

Figure 12A:
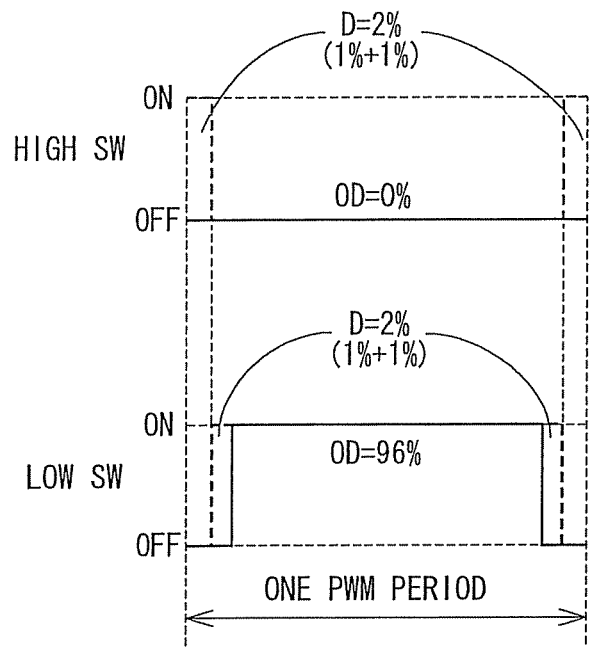

As illustrated in FIG. 12A, when the duty is 2%, the high SW on-duty is 0% that is acquired by decreasing 2% by the high SW-side dead time of 2%. That is, when the duty is 2%, the high SW is not turned on. In addition, the low SW on-duty is 96% that is acquired by decreasing (100%-2%) by the low SW-side dead time of 2%. At this time, in one PWM period, since the high SW on-duty is 0% and the low SW on-duty is 96%, the dead time in which all the high SWs and low SWs are turned off is 4% as is set.

Figure 12B:
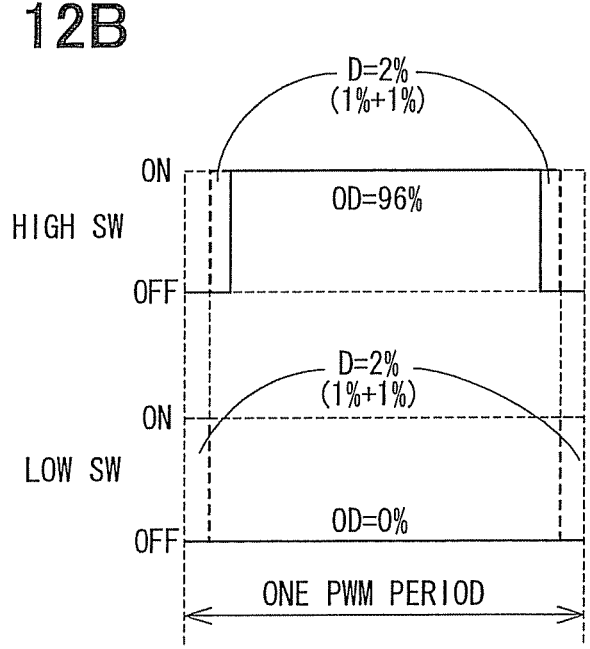

As illustrated in FIG. 12B, when the duty is 98%, the high SW on-duty is 96% that is acquired by decreasing 98% by the high SW-side dead time of 2%. In addition, the low SW on-duty is 0% that is acquired by decreasing (100%−98) by the low SW-side dead time of 2%. That is, when the duty is 98%, the low SWs are not turned on. At this time, in one PWM period, since the high SW on-duty is 96% and the low SW on-duty is 0%, the dead time in which all the high SWs and low SWs are turned off is 4% as is set.

Figure 13A:
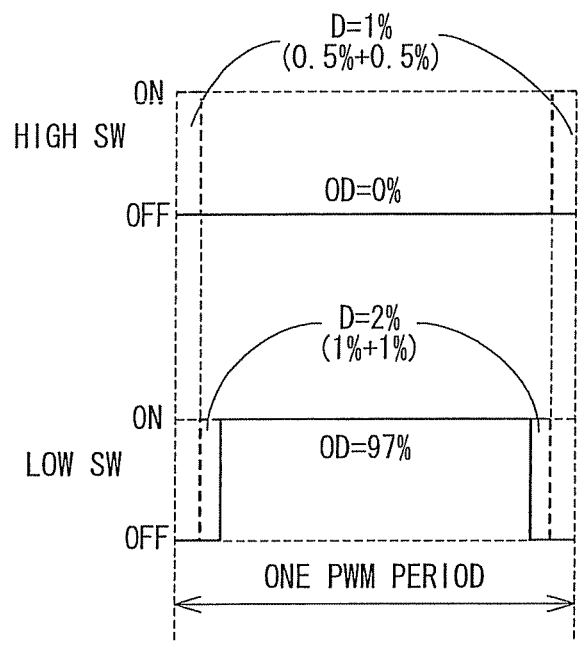
FIGS. 13A and 13B are diagrams illustrating a duty command and ON/OFF of a switching device according to the third embodiment.

Here, a time when the duty is 1% will be described with reference to FIG. 13A. In the examples up to now, the high SW on-duty is calculated by decreasing the duty by the high SW-side dead time of 2%. However, since the high SW on-duty cannot be smaller than 0%, the high SW-side dead time is set to 1%, and the high SW on-duty at a time when the duty is 1% is 0% that is acquired by decreasing 1% by decreasing the high SW-side dead time of 1%, whereby the high SWs are not turned on. In addition, the low SW on-duty is 97% that is acquired by decreasing (100%-1%) by the low SW-side dead time of 2%. That is, when the duty is 1%, the dead time in which all the high SWs and low SWs are turned off is 3%, which is a value different from 4% that has been set.

Figure 13B:
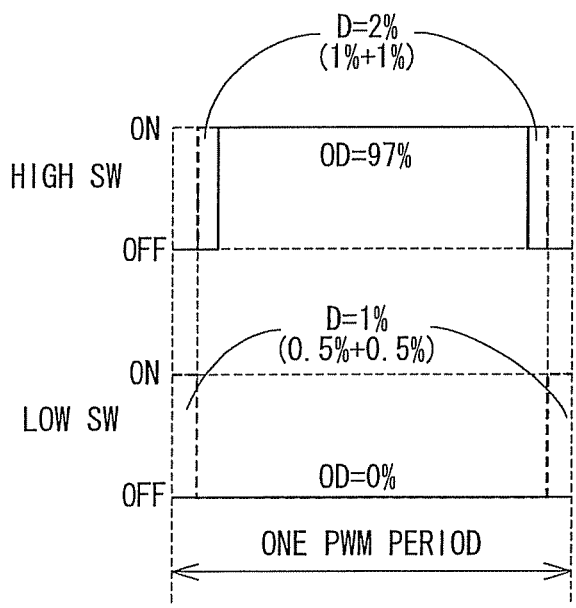

As illustrated in FIG. 13B, when the duty is 99%, the high SW on-duty is 97% that is acquired by decreasing 99% by the high SW-side dead time of 2%. In addition, since the low SW on-duty cannot be smaller than 0%, the low SW-side dead time is set to 1%, and the low SW on-duty at a time when the duty is 99% is 0% that is acquired by decreasing (100%-99%) by the low SW-side dead time of 1%, whereby the low SWs are not turned on. That is, when the duty is 99%, the dead time in which all the high SWs and low SWs are turned off is 3%, which is a value different from 4% that has been set.

Figure 14A:
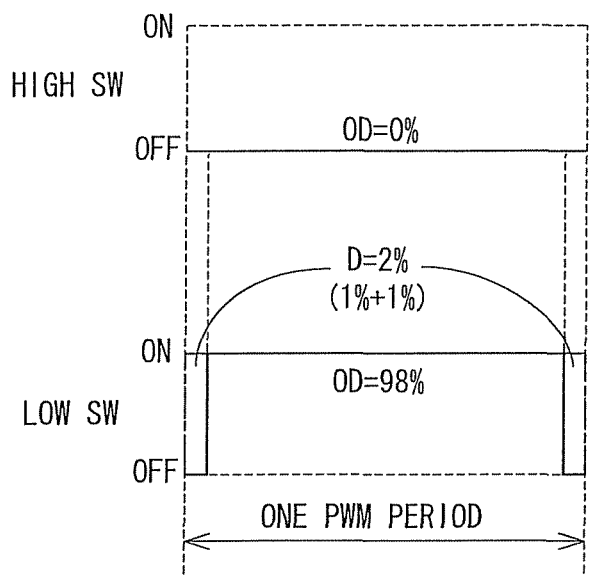
FIGS. 14A and 14B are diagrams illustrating a duty command and ON/OFF of a switching device according to the third embodiment.

As illustrated in FIG. 14A, when the duty is 0%, the high SW on-duty cannot be smaller than 0%, and accordingly, the high SW on-duty is 0% and the high SW-side dead time is 0%, whereby the high SWs are not turned on. In addition, the low SW on-duty is 98% that is acquired by decreasing (100%-0%) by the low SW-side dead time of 2%. That is, when the duty is 0%, the dead time in which all the high SWs and low SWs are turned off is 2%, which is a value different from 4% that has been set.

Figure 14B:
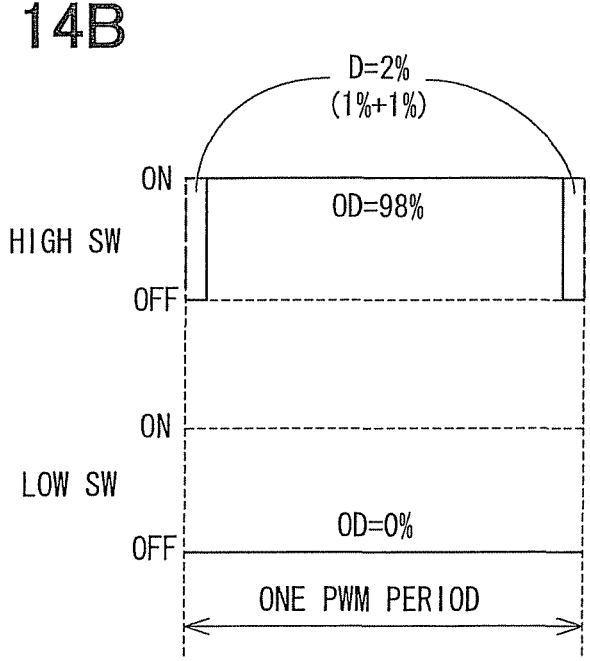

As illustrated in FIG. 14B, when the duty is 100%, the high SW on-duty is 98% that is acquired by decreasing 100% by the high SW-side dead time of 2%. In addition, since the low SW on-duty cannot be smaller than 0%, the low SW on-duty is 0% and the low SW-side dead time is 0%, whereby the low SWs are not turned on. That is, when the duty is 100%, the dead time in which all the high SWs and low SWs are turned off is 2%, which is a value different from 4% that has been set.

Figure 15A:
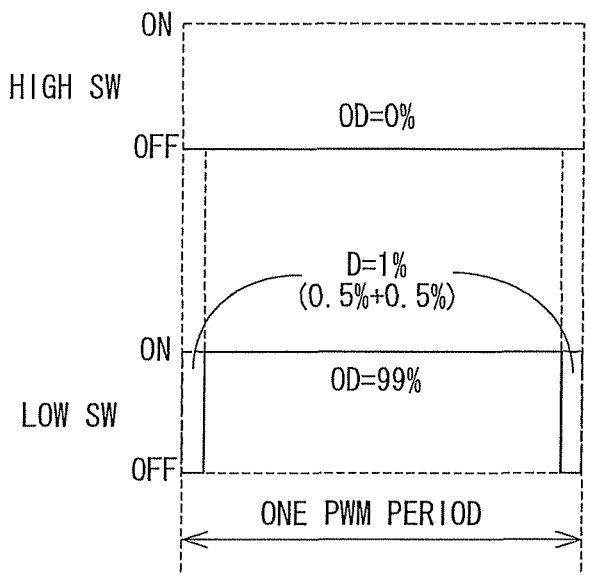
FIGS. 15A and 15B are diagrams illustrating a duty command and ON/OFF of a switching device according to the third embodiment.

As illustrated in FIG. 15A, when the duty is −1%, in this embodiment, for convenience of the description, the high SW on-duty is regarded as −1%. However, since the high SW on-duty cannot be smaller than 0%, the high SW on-duty is 0% and the high SW-side dead time is 0%, whereby the high SWs are not turned on. In addition, the low SW on-duty is 99% that is acquired by decreasing {100%−(−1%)} by the low SW-side dead time of 2%. That is, when the duty is −1%, the dead time in which all the high SWs and low SWs are turned off is 1%, which is a value different from 4% that has been set.

Figure 15B:
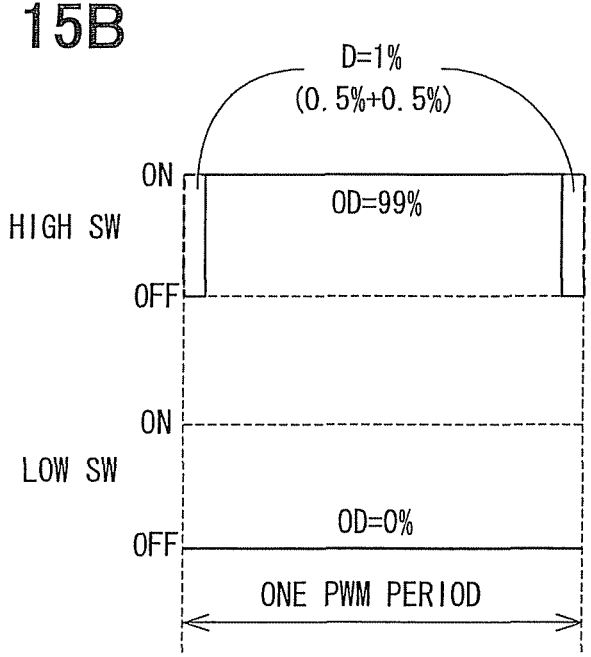

As illustrated in FIG. 15B, when the duty is 101%, the high SW on-duty is 99% that is acquired by decreasing 101% by the high SW-side dead time of 2%. In addition, since the low SW on-duty cannot be smaller than 0%, the low SW on-duty is 0% and the low SW-side dead time is 0%, whereby the low SWs are not turned on. That is, when the duty is 101%, the dead time in which all the high SWs and low SWs are turned off is 1%, which is a value different from 4% that has been set.

Figure 16A:
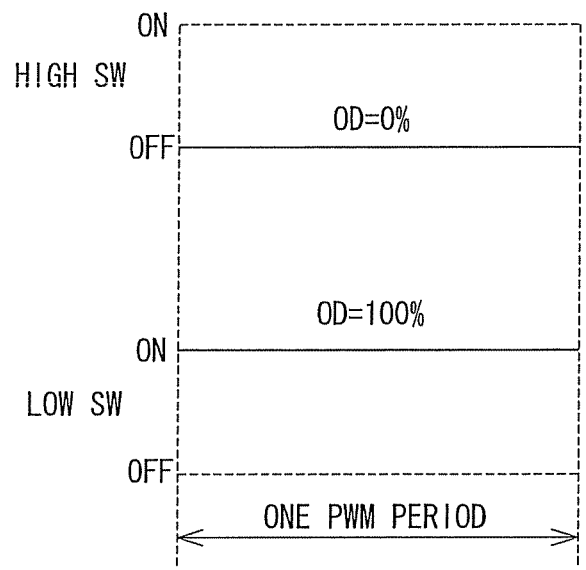

As illustrated in FIG. 16A, when the duty is −2%, in this embodiment, for convenience of the description, the high SW on-duty is regarded as −2%. However, since the high SW on-duty cannot be smaller than 0%, the high SW on-duty is 0% and the high SW-side dead time is 0%, whereby the high SWs are not turned on. In addition, the low SW on-duty is 100% that is acquired by decreasing {100%−(−2%)} by the low SW-side dead time of 2%, whereby the low SWs are constantly turned on without being turned off. That is, when the duty is −2%, the dead time in which all the high SWs and low SWs are turned off is 0%, which is a value different from 4° k that has been set.

Figure 16B:
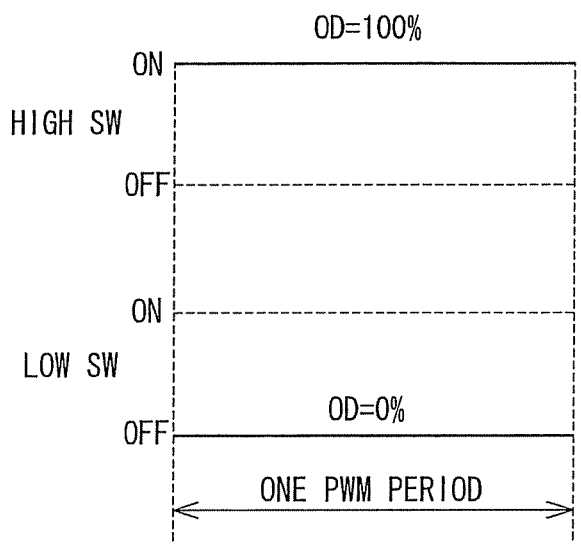

As illustrated in FIG. 16B, when the duty is 102%, the high SW on-duty is 100% that is acquired by decreasing 102% by the high SW-side dead time of 2%, whereby the high SWs are constantly turned on without being turned off. That is, when the duty is 102%, the dead time in which all the high SWs and low SWs are turned off is 0%, which is a value different from 4% that has been set.

As described above, in the duty range of 2% to 98%, the dead time is 4% as has been set. However, in a duty of −2% to 2% that is within a predetermined range from the low limit of the duty and a duty of 98% to 102% that is within a predetermined range from the high limit of the duty, the dead time is smaller than the set dead time, and the length of the dead time changes in accordance with the duty. Accordingly, in a case where the same dead-time compensation corresponding to 4% is performed by the dead time compensating section 72, the compensation is made to be greater than the amount of compensation to be made originally, whereby distortion of the inter-line voltage arises in the duty range of −2% to 2% and 98% to 102%. Thus, in this embodiment, the amount of compensation that has been made to be greater than the amount of compensation to be made originally is corrected by the correction section 75. The correction process of the correction section 75 will be described later.

Figure 17A:
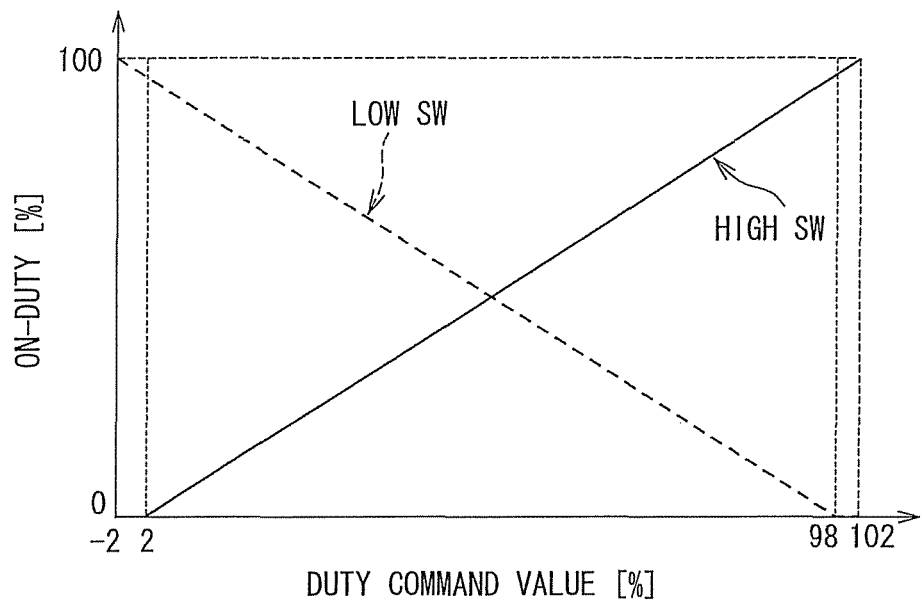
FIG. 17A is a diagram illustrating a relationship between values of the duty command and on-duty and FIG. 17B is a diagram illustrating a relationship between a value of the duty command and an applied voltage.
Figure 17B:
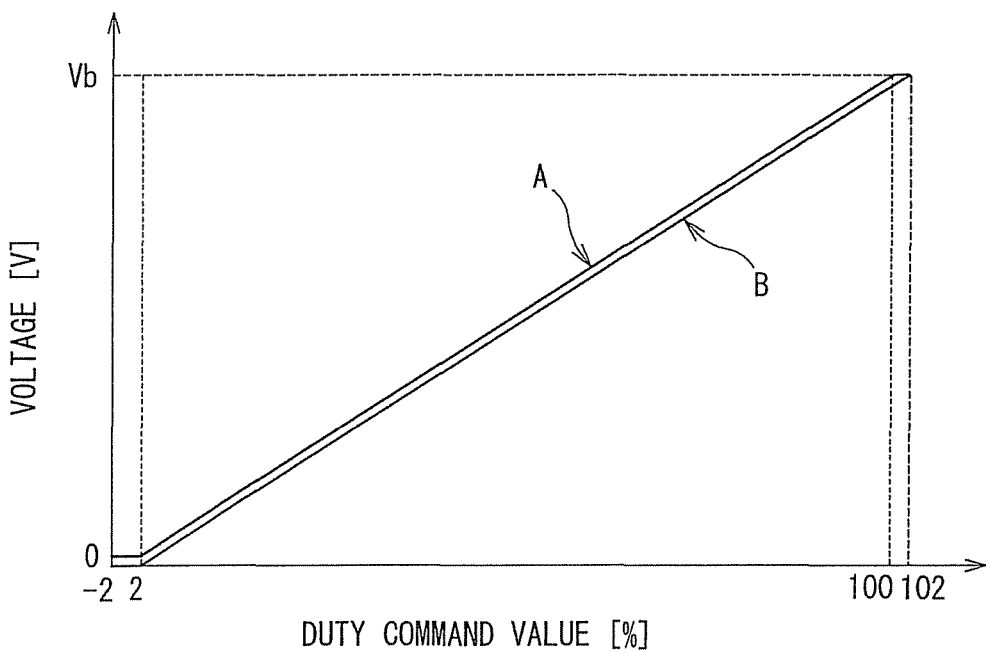

Here, the relationship among the duty, the high SW on-duty, and the low SW on-duty is illustrated in FIG. 17A, and the relationship between the duty and the applied voltage is illustrated in FIG. 17B.

In this embodiment, the dead time is provided by using two triangular wave command values C2 and C3, and accordingly, as denoted by solid lines in FIG. 17A, 0% to 100% in the high SW on-duty corresponds to a duty command of 2% to 102%. In addition, as denoted by broken lines, 0% to 100% in the low SW on-duty corresponds to a duty command of 98% to −2%.

As illustrated in FIG. 17B, in a case where the phase current is negative, as denoted by A, a terminal voltage is a predetermined value for a duty command of 2% or less, and is a battery voltage Vb for a duty command of 100% or more. In addition, in a case where the phase current is positive, as denoted by B, the terminal voltage is 0 V for a duty command of 2% or less, and is the battery voltage Vb for a duty command of 102%.

Based on the calculated duty, a signal used for switching between ON/OFF of each one of the SWs 21 to 26 is output from the driving circuit 68. There is a time difference until the SWs 21 to 26 are actually turned on or off after the signal used for switching between ON/OFF is output from the driving circuit 68. In a case where the gate voltage is a predetermined voltage Vth or higher, the SWs 21 to 26 are assumed to be turned on. On the other hand, in a case where the gate voltage is lower than the predetermined voltage Vth, the SWs 21 to 26 are assumed to be turned off.

Figure 18A:
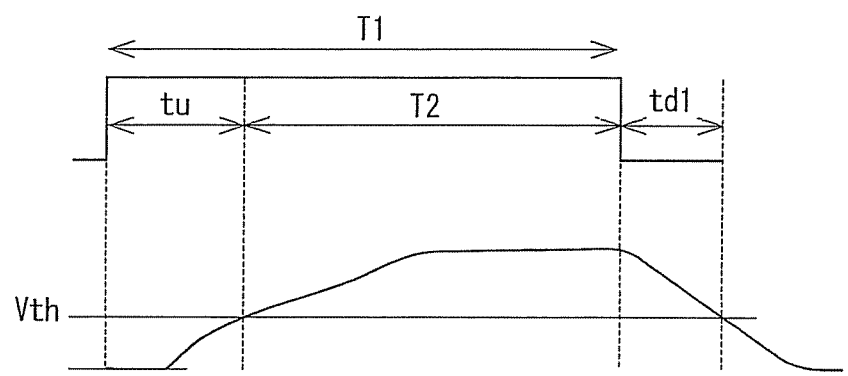
FIGS. 18A and 18B are diagrams illustrating an effective pulse width according to the third embodiment.

As illustrated in FIG. 18A, until the gate voltage reaches the predetermined voltage Vth after the signal used for turning the SWs 21 to 26 is output, a first start time tu is necessary. In addition, until the gate voltage becomes less than the predetermined voltage Vth after the signal used for turning the SWs 21 to 26 off is output, a first start time td1 is necessary. Accordingly, when a command pulse width until an off-signal is output after an on-signal is output is T1, the effective pulse width T2 is T−tu+td1. That is, in a case where the first start time tu and the end time td1 are different from each other, for example, as illustrated in FIG. 18A, in a case where tu>td1, the effective pulse width T2 is shorter than the command pulse width T by a difference between the first start time tu and the end time td1.

Figure 18B:
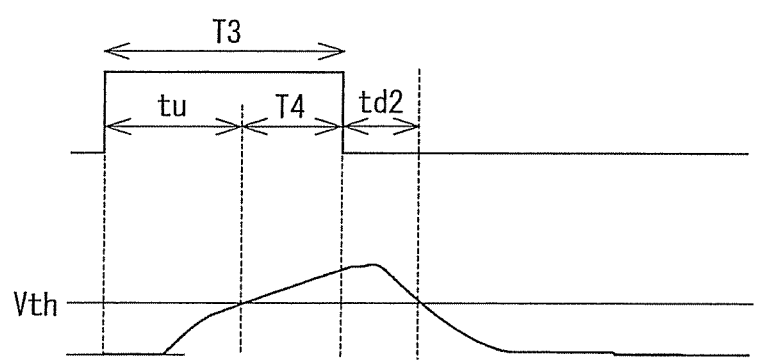

As illustrated in FIG. 18B, in a case where the command pulse width T3 is small, the gate voltage does not sufficiently increase, and accordingly, an end time td2 is shorter than the end time td1 of a case where the command pulse width T1 is sufficiently large as illustrated in FIG. 18A. Accordingly, the effective pulse width T4 is relatively smaller than the command pulse width T3 compared with the example illustrated in FIG. 18A.

Here, in a case where all the command pulse widths of three phases are sufficiently larger than the first start time tu and the end time td1, as illustrated in FIG. 18A, the effective pulse widths are decreased generally equally. Accordingly, a large distortion does not arise. On the other hand, in a case where a phase having the sufficiently large command pulse T1 as illustrated in FIG. 18A and a phase having the small command pulse width T3 as illustrated in FIG. 18B are present together, the balance among three phases collapses, and accordingly, distortion of the inter-line voltage arises.

Here, a case where the command pulse width is small is a case where the duty is within a predetermined range from the low limit value of the duty or within a predetermined range from the high limit value of the duty.

In the above description, the low limit value of the duty is −2% and the high limit value of the duty is 102%. In this embodiment, the current detecting unit 40 is formed by current detecting sections 41 to 43 disposed between the low SWs 24 to 26 and the ground. To detect phase currents by using the current detecting sections 41 to 43 that are formed by shunt resistors, it is necessary to acquire a period in which all the low SWs 24 to 26 are turned on. In addition, to detect currents by using the current detecting sections 41 to 43, a time in which rigging converges (for example, 4.5 μs) and a hold time in which the switching between ON and OFF of the SWs 21 to 26 is not performed are necessary. Thus, in this embodiment, the high limit value of the duty is set as 93%. This high limit value corresponds to a predetermined high limit value and may be appropriately set in accordance with a time in which rigging converges, a dead time, and the like.

In this embodiment, a duty that is within a predetermined range from −2% as the low limit or a duty within a predetermined range from 93% as the high limit is set as an output avoidance duty. To avoid the output avoidance duty, a duty converting process is performed. Here, the duty conversion process will be described with reference to flowcharts illustrated in FIGS. 19 and 20. The duty converting process is performed at predetermined intervals while the motor 10 is driven.

First, in S101, duty conversion values Vu2, Vv2 and Vw2 are calculated based on the three-phase voltage command values Vu1, Vv1 and Vw1. When the voltage of the battery 80 is denoted by Vb, the duty conversion values Vu2, Vv2 and Vw2 are calculated by using the following Equations (1) to (3).

$$Vu2=Vu1/Vb\times100 \quad \text{Equation (1)}$$

$$Vv2=Vv1/Vb\times100 \quad \text{Equation (2)}$$

$$Vw2=Vw1/Vb\times100$$

In S102, it is checked whether the U-phase current Iu is less than zero based on the AD value that is detected by the U-phase current detecting section 41. In a case where the U-phase current Iu is less than zero (S102: Yes), that is, in a case where the U-phase current Iu is negative, the process proceeds to S103. On the other hand, in a case where the U-phase current Iu is equal to or higher than zero (S102: No), that is, in a case where the U-phase current Iu is positive, the process proceeds to S104. In addition, in a case where the U-phase current Iu is negative, a current starts to flow from the coil 11. On the other hand, in a case where the U-phase current Iu is positive, a current flows into the coil 11. The same applies to the other phase currents.

In S103, to which the process proceeds in a case where the U-phase current Iu is negative (S102: Yes), an applied voltage increases when the phase current is negative. Accordingly, to compensate for this, the dead time is compensated to calculate a compensated duty command value Vu3. The compensated duty command value Vu3 is calculated by using the following Equation (4).

$$Vu3=Vu2-DT \quad \text{Equation (4)}$$

In S104, to which the process proceeds in a case where the U-phase current Iu is positive (S102: No), an applied voltage decreases when the phase current is positive. Accordingly, to compensate for this, the dead time is compensated to calculate a compensated duty command value Vu3. The compensated duty command value Vu3 is calculated by using the following Equation (5).

$$Vu3=Vu2+DT \quad \text{Equation (5)}$$

In S105, it is checked whether the V-phase current Iv is less than zero based on the AD value that is detected by the V-phase current detecting section 42. In a case where the V-phase current Iv is less than zero (S105: Yes), that is, in a case where the V-phase current Iv is negative, the process proceeds to S106. On the other hand, in a case where the V-phase current Iv is equal to or higher than zero (S105: No), the process proceeds to S107.

In S106, to which the process proceeds in a case where the V-phase current Iv is negative (S105: Yes), an applied voltage increases when the phase current is negative. Accordingly, to compensate for this, the dead time is compensated to calculate a compensated duty command value Vv3. The compensated duty command value Vv3 is calculated by using the following Equation (6).

$$Vv3=Vv2-DT \quad \text{Equation (6)}$$

In S107, to which the process proceeds in a case where the V-phase current Iv is positive (S105: No), an applied voltage decreases when the phase current is positive. Accordingly, to compensate for this, the dead time is compensated to calculate a compensated duty command value Vv3. The compensated duty command value Vv3 is calculated by using the following Equation (7).

$$Vv3=Vv2+DT \quad \text{Equation (7)}$$

In S108, it is checked whether the W-phase current Iw is less than zero based on the AD value that is detected by the W-phase current detecting section 43. In a case where the W-phase current Iw is less than zero (S108: Yes), That is, in a case where the W-phase current Iw is negative, the process proceeds to S109. On the other hand, in a case where the W-phase current Iw is equal to or higher than zero (S108: No), that is, in a case where the W-phase current Iw is positive, the process proceeds to S110.

In S109, to which the process proceeds in a case where the W-phase current Iw is negative (S108: Yes), an applied voltage increases when the phase current is negative. Accordingly, to compensate for this, the dead time is compensated to calculate a compensated duty command value Vw3. The compensated duty command value Vw3 is calculated by using the following Equation (8).

$$Vw3=Vw2-DT \quad \text{Equation (8)}$$

In S110, to which the process proceeds in a case where the W-phase current Iw is positive (S108: No), an applied voltage decreases when the phase current is positive. Accordingly, to compensate for this, the dead time is compensated to calculate a compensated duty command value Vw3. The compensated duty command value Vw3 is calculated by using the following Equation (9).

$$Vw3=Vw2+DT \quad \text{Equation (9)}$$

Here, DT is a duty corresponding to a dead time and is 4% as described above in this embodiment, and thus DT=4. In addition, DT that is added in S103, S104, S106, S107, S109, or S110 corresponds to a dead time compensating amount that is based on a dead time.

In S111, it is checked whether Vu3<Vv3 and Vu3<Vw3. In a case that Vu3<Vv3 and Vu3<Vw3 (S111: Yes), the process proceeds to S113. On the other hand, in a case that the relationships of Vu3>Vv3 and Vu3>Vw3 are not satisfied (S111: No), the process proceeds to S112.

In Step S112, it is checked whether Vv3≤Vu3 and Vv3≤Vw3. In a case that Vv3≤Vu3 and Vv3≤Vw3 (S112: Yes), the process proceeds to S114. On the other hand, in a case that the relationships of Vv3≤Vu3 and Vv3≤Vw3 are not satisfied (S112: No), the process proceeds to S115.

In S113, the smallest compensated duty command value (denoted as "Vmin3" in FIG. 19) of three phases is specified as Vu3.

In S114, the smallest compensated duty command value of three phases is specified as Vv3.

In S115, the smallest compensated duty command value of three phases is specified as Vw3.

In S116, a modulated duty command value is calculated such that the smallest compensated duty command value is −2% based on the compensated duty command values. The modulated duty command values Vu4, Vv4 and Vw4 of the phases are calculated by using the following Equations (10) to (12).

$$Vu4 = Vu3 - Vmin3 - 2 \quad \text{Equation (10)}$$

$$Vv4 = Vv3 - Vmin3 - 2 \quad \text{Equation (11)}$$

$$Vw4 = Vw3 - Vmin3 - 2 \quad \text{Equation (12)}$$

Figure 20:
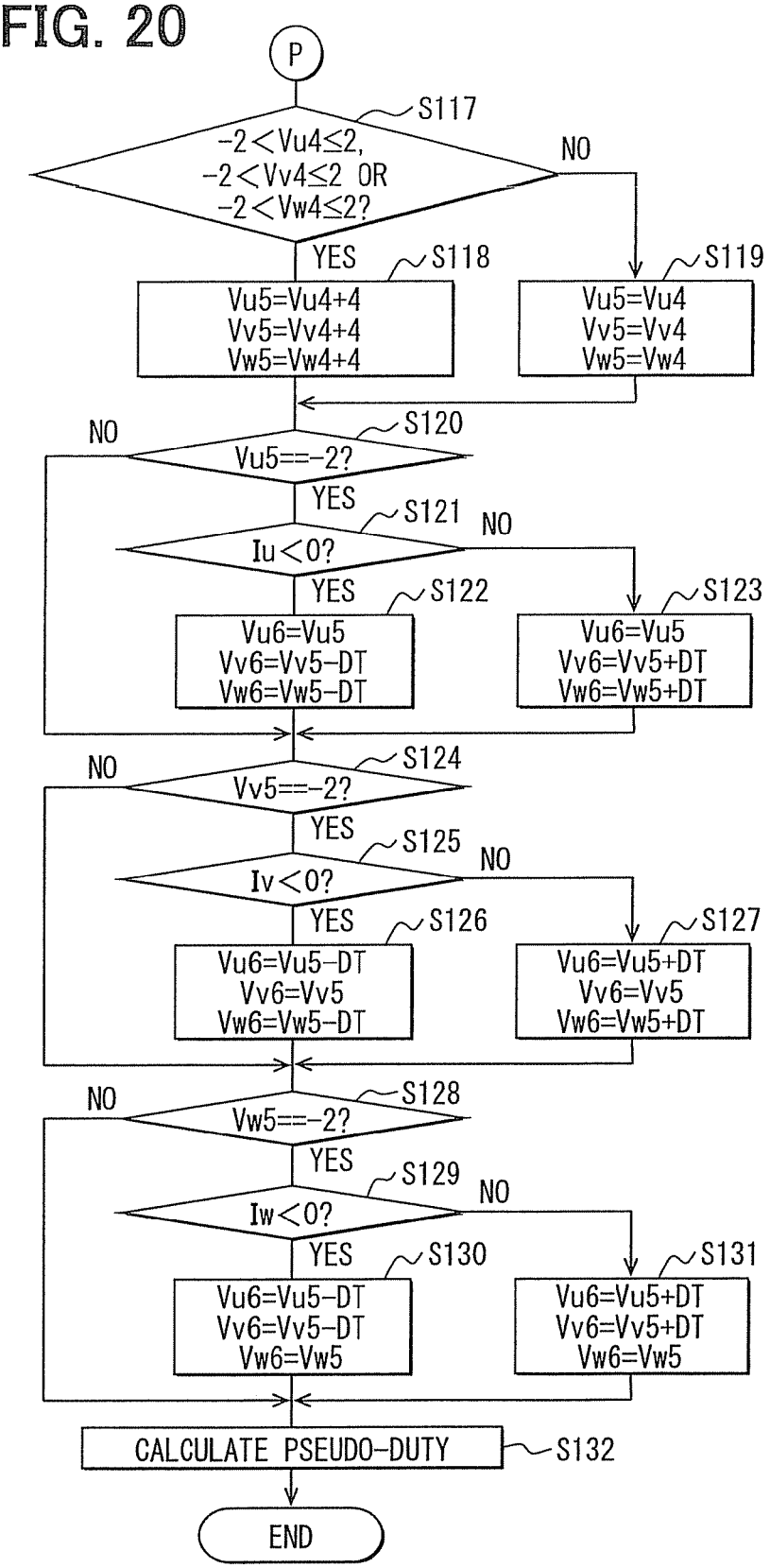
FIG. 20 is a flowchart illustrating the duty converting process according to the third embodiment.

As illustrated in FIG. 20, in S117, it is checked whether −2<Vu4≤2, −2<Vv4≤2, or −2<Vw4≤2. Here, it is checked whether there is a modulated duty command value included in the range equal to or greater than −2 and equal to or less than 2. The range equal to or greater than −2 and equal to or less than 2 is a range corresponding to a dead time from the low limit value of the duty in this embodiment. This range is a range in which the length of the dead time changes in accordance with the magnitude of the duty and is a duty range that cannot be output by some microcomputers. Additionally, since −2% that is the low limit value of the duty can be output by turning all the high SWs 21 to 23 off and turning all the low SWs 24 to 26 on, it is excluded from the duty range that cannot be output. In addition, this range may be regarded as a range in which the command pulse width described with reference to FIGS. 18A and 18B is small. Furthermore, in this step, a phase that is determined to be included in the range equal to or greater than −2 and equal to or less than 2 corresponds to a phase in which the on-time of the high electric potential-side switching device or the low electric potential-side switching device is shorter than a predetermined time. In this embodiment, the phase is a phase in which the on-time of the high electric potential-side switching device is shorter than a predetermined time. In a case that −2<Vu4≤2, −2<Vv4≤2, or −2<Vw4≤2 is satisfied (S117: Yes), the process proceeds to S118. On the other hand, in a case that −2<Vu4≤2, −2<Vv4≤2, or −2<Vw4≤2 is not satisfied (S117: No), the process proceeds to S119.

In S118, the modulated duty command values Vu4, Vv4 and Vw4 of the phases are shifted to calculate shifted duty command values Vu5, Vv5 and Vw5. In this embodiment, the modulated duty command values are shifted by a dead time, and the dead time corresponds to a shifting value. The shifted duty command values Vu5, Vv5 and Vw5 are calculated by using the following Equations (13) to (15).

$$Vu5 = Vu4 + 4 \quad \text{Equation (13)}$$

$$Vv5 = Vv4 + 4 \quad \text{Equation (14)}$$

$$Vw5 = Vw5 + 4 \quad \text{Equation (15)}$$

In S119, the modulated duty command values Vu4, Vv4 and Vv4 are not shifted. Here, for convenience of the description, Vu5, Vv5 and Vw5 are set as in the following Equations (16) to (18).

$$Vu5 = Vu4 \quad \text{Equation (16)}$$

$$Vv5 = Vv4 \quad \text{Equation (17)}$$

$$Vw5 = Vw4 \quad \text{Equation (18)}$$

In S120, it is checked whether Vu5 is −2. In a case that Vu5 is not −2 (S120: No), the process proceeds to S124. In a case that Vu5 is −2 (S120: Yes), the process proceeds to S121. In a case where Vu5 is −2, the U-phase corresponds to a near-limit phase.

In S121, it is checked whether the U-phase current Iu is lower than zero based on the AD value that is detected by the U-phase current detecting section 41. In a case where the U-phase current Iu is less than zero (S121: Yes), that is, in a case where the U-phase current Iu is negative, the process proceeds to S122. On the other hand, in a case where the U-phase current Iu is equal to or higher than zero (S121: No), the process proceeds to S123.

In S122, to which the process proceeds in a case where the U-phase current Iu is negative (S121: Yes), a correction process corresponding to the dead time compensating amount of the U-phase duty is performed. This is because that the dead time at a time when the duty is −2% is 0% as described with reference to FIG. 16A, although a duty of 4% corresponding to a dead time that is compensated in S103 through dead time compensation is subtracted. In addition, as described above, within the predetermined range from the low limit value of the duty and the predetermined range from the high limit value of the duty, the dead time changes in accordance with the duty. Accordingly, to avoid this influence, the process is switched to correction of Vu5 as the low limit value of the duty, and Vv5 and Vw5 are corrected to calculate corrected duty command values Vu6, Vv6 and Vw6. The corrected duty command value Vu6, the corrected duty command value Vv6 and the corrected duty command value Vw6 are calculated by using the following Equations (19) to (21).

$$Vu6 = Vu5 \quad \text{Equation (19)}$$

$$Vv6 = Vv5 - DT \quad \text{Equation (20)}$$

$$Vw6 = Vw5 - DT \quad \text{Equation (21)}$$

By correcting the V-phase duty and the W-phase duty as above, the same effect as that of a case where Vu6 is corrected by adding DT thereto is provided for the inter-line voltage.

In S123, to which the process proceeds in a case where the U-phase current Iu is positive (S121: No), a correction process corresponding to the dead time compensating amount of the U-phase duty is performed. This is because, although a duty of 4% corresponding to the dead time is added through the dead time compensation in S104, the dead time at a time when the duty is −2% is 0% as described with reference to FIG. 16A. In addition, as described above, within the predetermined range from the low limit value of the duty and the predetermined range from the high limit value of the duty, the dead time changes in accordance with the duty. Accordingly, to avoid this influence, the process is switched to correction of Vu5 as the low limit value of the duty, and Vv5 and Vw5 are corrected. The corrected duty command value Vu6, the corrected duty command value Vv6, and the corrected duty command value Vw6 are calculated by using the following Equations (22) to (24).

$$Vu6=Vu5 \quad \text{Equation (22)}$$

$$Vv6=Vv5+DT \quad \text{Equation (23)}$$

$$Vw6=Vw5+DT \quad \text{Equation (24)}$$

By correcting the V-phase duty and the W-phase duty as above, the same effect as that of a case where Vu6 is corrected by subtracting DT therefrom is provided for the inter-line voltage.

In S124, it is checked whether Vv5 is −2. In a case that Vv5 is not −2 (S124: No), the process proceeds to S128. On the other hand, in a case that Vv5 is −2 (S128: Yes), the process proceeds to S125. In a case where Vv5 is −2, the V-phase corresponds to a near-limit phase.

In S125, it is checked whether the V-phase current Iv is lower than zero based on the AD value that is detected by the V-phase current detecting section 42. In a case where the V-phase current Iv is less than zero (S125: Yes), that is, in a case where the V-phase current Iv is negative, the process proceeds to S126. On the other hand, in a case where the V-phase current Iv is equal to or higher than zero (S125: No), that is, the V-phase current Iv is positive, the process proceeds to S127.

In S126, to which the process proceeds in a case where the V-phase current Iv is negative (S125: Yes), a correction process corresponding to the dead time compensating amount of the V-phase duty is performed. This is because, although a duty of 4% corresponding to a dead time compensated in S106 through dead time compensation is subtracted, the dead time at a time when the duty is −2% is 0% as described with reference to FIG. 16A. In addition, as described above, within the predetermined range from the low limit value of the duty and the predetermined range from the high limit value of the duty, the dead time changes in accordance with the duty. Accordingly, to avoid this influence, the process is switched to correction of Vv5 as the low limit value of the duty, and Vu5 and Vw5 are corrected. The corrected duty command value Vu6, the corrected duty command value Vv6, and the corrected duty command value Vw6 are calculated by using the following Equations (25) to (27).

$$Vu6=Vu5-DT \quad \text{Equation (25)}$$

$$Vv6=Vv5 \quad \text{Equation (26)}$$

$$Vw6=Vw5-DT \quad \text{Equation (27)}$$

By correcting the U-phase duty and the W-phase duty as above, the same effect as that of a case where Vv6 is corrected by adding DT thereto is acquired for the inter-line voltage.

In S127, to which the process proceeds in a case where the V-phase current Iv is positive (S124: No), a correction process corresponding to the dead time compensating amount of the V-phase duty is performed. This is because, although a duty of 4% corresponding to the dead time is added through the dead time compensation in S107, the dead time at a time when the duty is −2% is 0% as described with reference to FIG. 16A. In addition, as described above, within the predetermined range from the low limit value of the duty and the predetermined range from the high limit value of the duty, the dead time changes in accordance with the duty. Accordingly, to avoid this influence, the process is switched to correction of Vv5 as the low limit value of the duty, and Vu5 and Vw5 are corrected. The corrected duty command value Vu6, the corrected duty command value Vv6 and the corrected duty command value Vw6 are calculated by using the following Equations (28) to (30).

$$Vu6=Vu5+DT \quad \text{Equation (28)}$$

$$Vv6=Vv5 \quad \text{Equation (29)}$$

$$Vw6=Vw5+DT \quad \text{Equation (30)}$$

By correcting the U-phase duty and the W-phase duty as above, the same effect as that of a case where Vv6 is corrected by subtracting DT therefrom is provided for the inter-line voltage.

In S128, it is checked whether Vw5 is −2. In a case that Vw5 is not −2 (S128: No), this process ends. On the other hand, in a case that Vw5 is −2 (S128: Yes), the process proceeds to S126. In a case where Vw5 is −2, the W phase corresponds to a near-limit phase.

In S129, it is checked whether the W-phase current Iw is lower than zero based on the AD value that is detected by the W-phase current detecting section 43. In a case where the W-phase current Iw is less than zero (S129: Yes), that is, in a case where the W-phase current Iw is negative, the process proceeds to S130. On the other hand, in a case where the W-phase current Iw is equal to or higher than zero (S129: No), that is, the W-phase current Iw is positive, the process proceeds to S131.

In S130, to which the process proceeds in a case where the W-phase current Iw is negative (S129: Yes), a correction process corresponding to the dead time compensating amount of the W-phase duty is performed. This is because, although a duty of 4% corresponding to a dead time compensated in S109 through dead time compensation is subtracted, the dead time at a time when the duty is −2% is 0% as described with reference to FIG. 16A. In addition, as described above, within the predetermined range from the low limit value of the duty and the predetermined range from the high limit value of the duty, the dead time changes in accordance with the duty. Accordingly, to avoid this influence, the process is switched to correction of Vw5 as the low limit, value of the duty, and Vu5 and Vv5 are corrected. The corrected duty command value Vu6, the corrected duty command value Vv6 and the corrected duty command value Vw6 are calculated by using the following Equations (31) to (33).

$$Vu6=Vu5-DT \quad \text{Equation (31)}$$

$$Vv6=Vv5-DT \quad \text{Equation (32)}$$

$$Vw6=Vw5 \quad \text{Equation (33)}$$

By correcting the U-phase duty and the V-phase duty as above, the same effect as that of a case where Vw6 is corrected by adding DT thereto is acquired for the inter-line voltage.

In S131, to which the process proceeds in a case where the W-phase current Iw is positive (S129: No), a correction process corresponding to the dead time compensating amount of the W-phase duty is performed. This is because, although a duty of 4% corresponding to the dead time is added through the dead time compensation in Step S110, the dead time at a time when the duty is −2% is 0% as described with reference to FIG. 16A. In addition, as described above, within the predetermined range from the low limit value of the duty and the predetermined range from the high limit value of the duty, the dead time changes in accordance with the duty. Accordingly, to avoid this influence, the process is switched to correction of Vw5 as the low limit value of the duty, and Vu5 and Vv5 are corrected. The corrected duty command value Vu6, the corrected duty command value Vv6, and the corrected duty command value Vw6 are calculated by using the following Equations (34) to (36).

$$Vu6=Vu5+DT \quad \text{Equation (34)}$$

$$Vv6=Vv5+DT \quad \text{Equation (35)}$$

$$Vw6=Vw5 \quad \text{Equation (36)}$$

By correcting the U-phase duty and the V-phase duty as above, the same effect as that of a case where Vw6 is corrected by subtracting DT therefrom is acquired for the inter-line voltage.

On the other hand, in a case where negative determinations are made in all S120, S124, and S128, it is set that Vu6=Vu5, Vv6=Vu5, and Vw6=Vw5.

In S132, a pseudo-duty calculating process is performed.

Here, the pseudo-duty calculating process will be described with reference to FIG. 21.

To perform control calculation (here, simply referred to as control calculation) that is performed by the three-phase/two-phase conversion section 62 to the correction section 75 shown in FIGS. 9A and 9B, a predetermined time is required. However, there is a case where a duty updating process at a frequency higher than that of the control calculation is desired such as a case where a sound is generated when the duty updating process is performed at the same frequency as that of the control calculation. Thus, in this embodiment, to perform the duty updating process at a frequency higher than that of the control calculation, a pseudo-duty calculating process is performed, in which a pseudo-duty command value is calculated by using a duty calculated at the previous time and a duty calculated at the current time.

Figure 21:
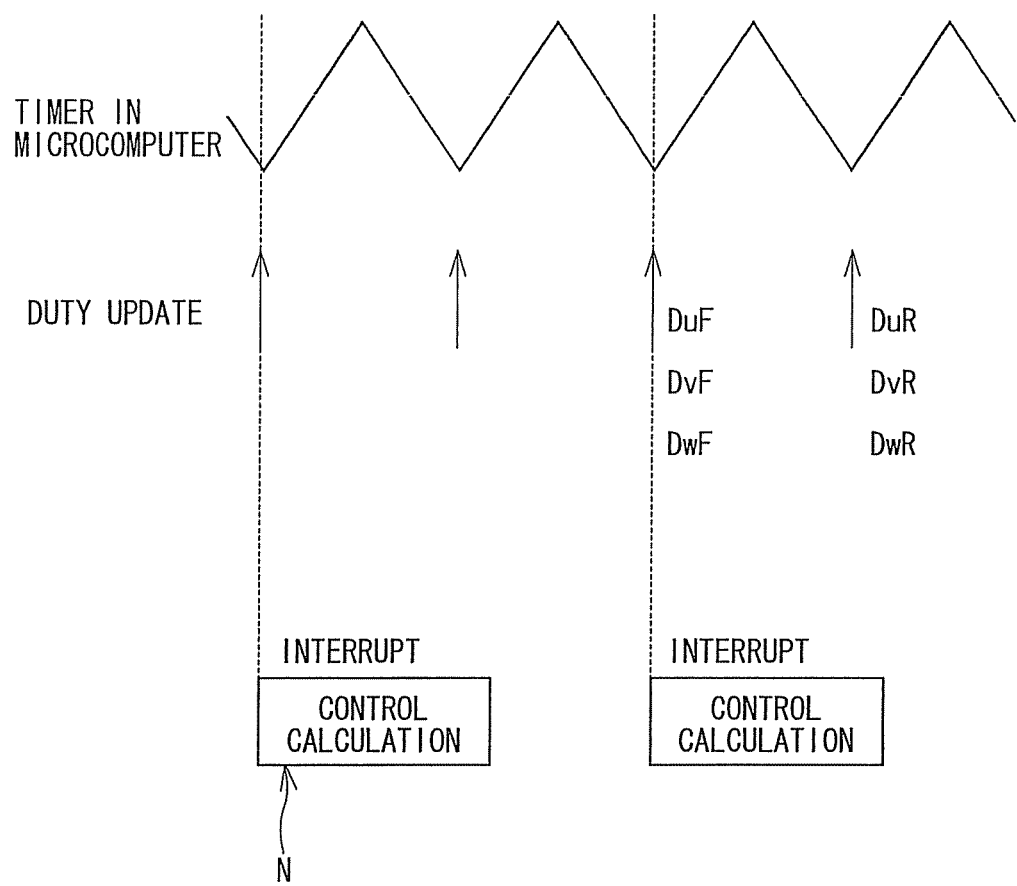
FIG. 21 is a diagram illustrating a pseudo-duty calculating process according to the third embodiment.

It is assumed that a U-phase duty DuR=Du(n), a V-phase duty DvR=Dv(n) and a W-phase duty DwR=Dw(n), which are calculated by a control calculation process denoted by N in FIG. 21. In addition, when a U-phase duty is Du(n−1), a V-phase duty is Dv(n−1) and a W-phase duty is Dw(n−1), which are calculated in a control calculation process performed immediately prior to the control calculation process denoted by N, pseudo-duty command values DuF, DvF and DwF are calculated through linear interpolation as represented in the following Equations (37) to (39).

$$DuF=Du(n-1)+\{Du(n)-Du(n-1)\}/2 \quad \text{Equation (37)}$$

$$DvF=Dv(n-1)+\{Dv(n)-Dv(n-1)\}/2 \quad \text{Equation (38)}$$

$$DwF=Dw(n-1)+\{Dw(n)-Dw(n-1)\}/2 \quad \text{Equation (39)}$$

Then, based on DuF, DvF and DwF, and DuR, DvR and DwR as duties based on the control calculation process denoted by N, as illustrated in FIG. 21, two duty updating processes are performed. Accordingly, the duty updating frequency can be increased without increasing the calculation load. In this embodiment, DuR=Du(n), DvR=Dv(n) and DwR=Dw(n) correspond to first shifted duty command values, and Du(n−1), Dv(n−1) and Dw(n−1) correspond to second shifted duty command values.

When the relationship with the duty converting process is described, the U-phase duties Du(n) and Du(n−1) correspond to Vu6, the V-phase duties Dv(n) and Dv(n−1) correspond to Vv6, and the W-phase duties Dw(n) and Dw(n−1) correspond to Vw6.

When the correspondence relationship among FIGS. 19, 20, 9A and 9B is described, the process of S101 is the process performed by the duty converting section 70, the process of S102 to S110 is the process performed by the dead-time compensating section 72, the process of S111 to S116 is the process performed by the modulation section 73, the process of S117 to S119 is the process performed by the avoidance section 74, the process of S120 to S131 is the process performed by the correction section 75, and the process of S132 is the process performed by the pseudo-duty calculating section 76.

Figure 19:
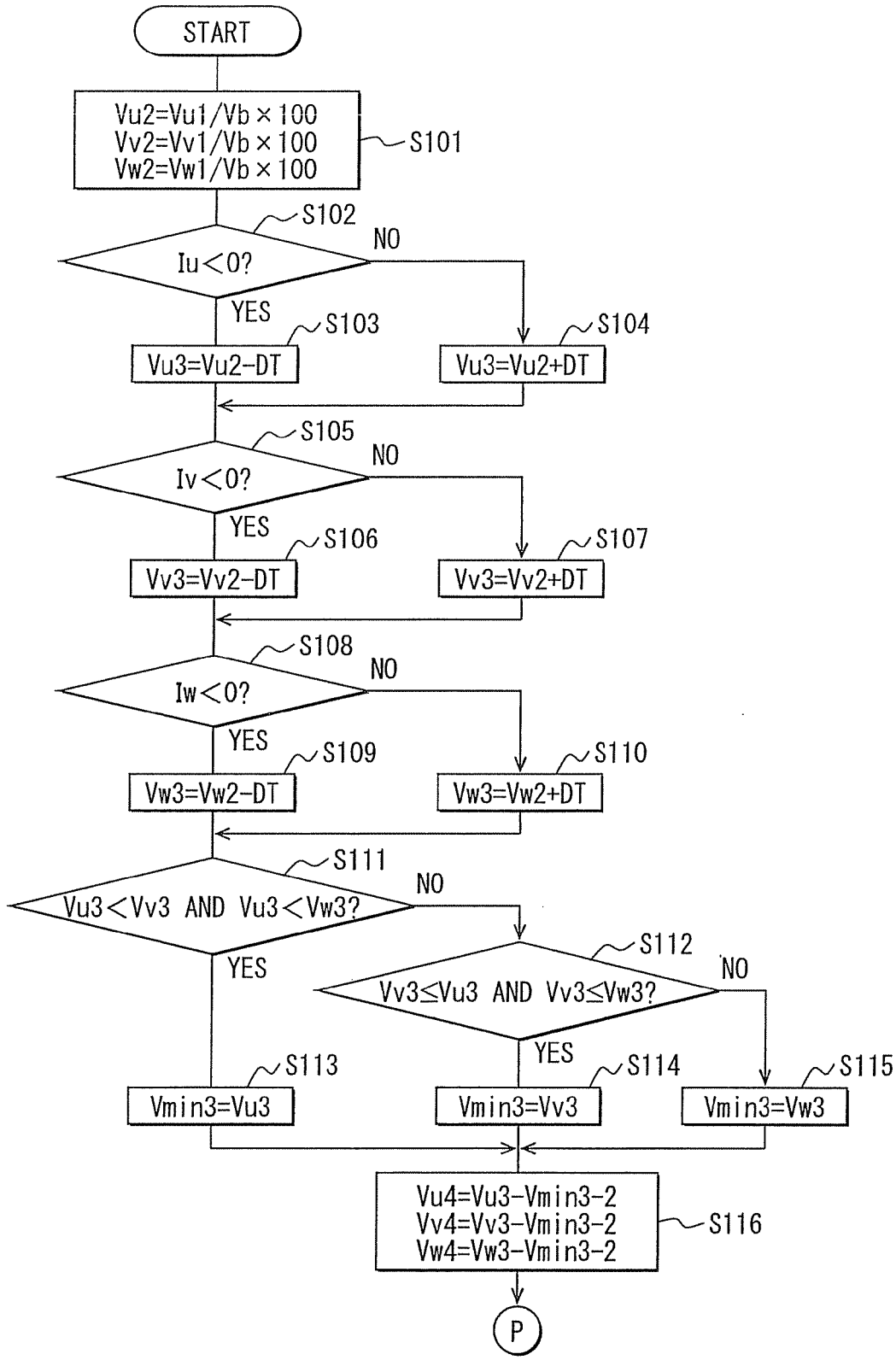
FIG. 19 is a flowchart illustrating a duty converting process according to the third embodiment.

Here, the duty of each phase calculated in FIGS. 19 and 20 will be described with reference to FIGS. 22A to FIG. 23C.

Figure 22A:
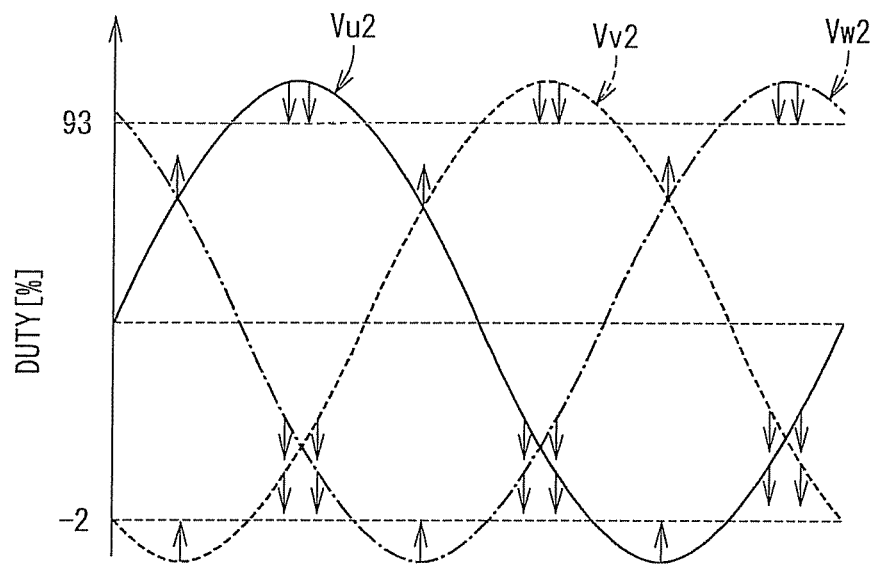
FIGS. 22A and 22B are diagrams illustrating a modulation process according to the third embodiment, with FIG. 22A illustrating a duty before the modulation process and FIG. 22B illustrating a duty after the modulation process.
Figure 22B:
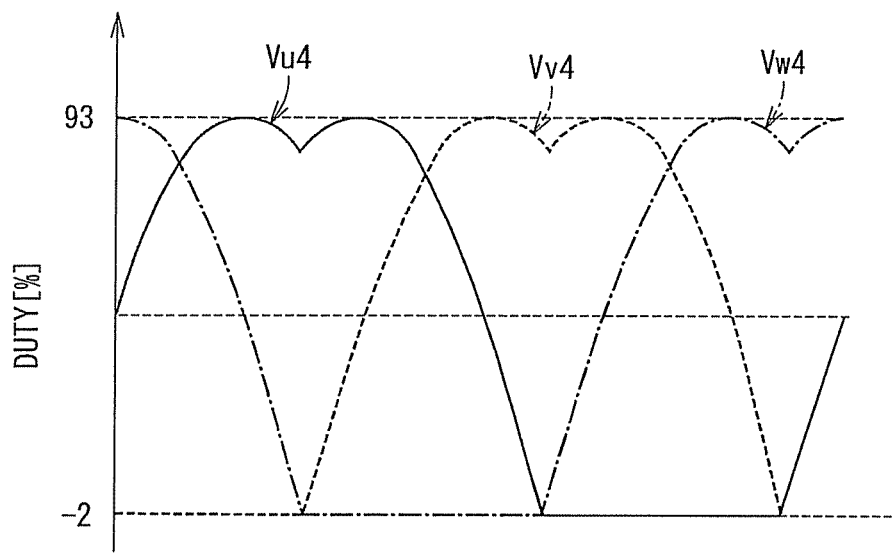

As illustrated in FIG. 22A, the duty conversion values Vu2, Vv2 and Vw2 corresponds to sinusoidal wave signals. After the duty conversion values Vu2, Vv2 and Vw2 are compensated for the dead time, when the low-side two-phase modulation is performed such that a compensated duty command value having the smallest phase is a predetermined low limit value (in this embodiment, −2%) (S116 illustrated in FIG. 19), modulated duty command values Vu4, Vv4 and Vw4 are as illustrated in FIG. 22B.

Figure 23A:
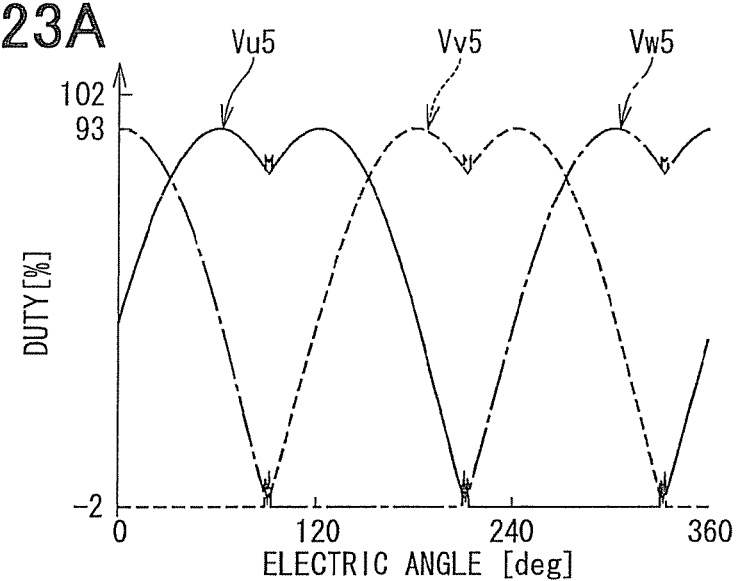
FIGS. 23A to 23C are diagrams illustrating an avoidance process according to the third embodiment, with FIG. 23A illustrating a duty over an electric angle of 360 degrees, FIG. 23B illustrating a U-phase duty near an electric angle of 90 degrees and FIG. 23C illustrating a V-phase duty and a W-phase duty near an electric angle of 90 degrees.
Figure 23B:
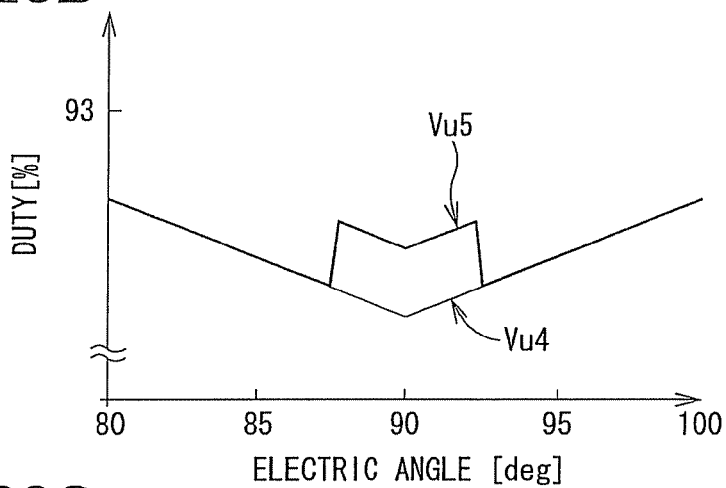
Figure 23C:
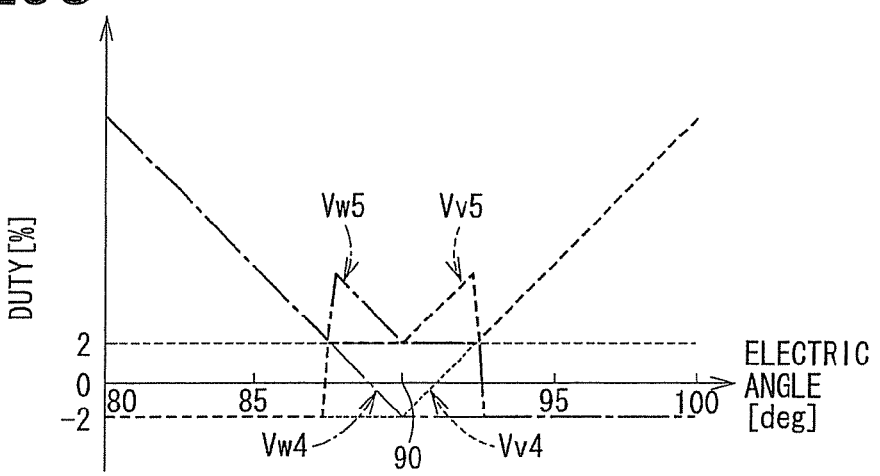

In addition, when the avoidance process of S117 to S119 (FIG. 20) is performed by the avoidance section 74, the result is as illustrated in FIGS. 23A to 23C. FIG. 23A is a diagram illustrating an electric angle range of 0 degrees to 360 degrees. FIGS. 23B and 23C are enlarged diagrams, in which a portion near an electric angle of 90 degrees is enlarged.

As illustrated in FIGS. 23B and 23C, in a range of −2<Vw4≤2, the duties of all the phases are shifted by +4% (S118). Similarly, in a range K2 in which −2<Vv≤2, the duties of all the phases are shifted by +4% (S118). As above, in the range of −2<Vu4≤2, −2<Vv4≤2 or −2<Vw2≤2, the output voltage average value is changed, so that the corresponding duty is avoided. Accordingly, a distortion of the inter-line voltage or a distortion of a current that is due to the influence of the dead time, and vibration or noise accompanied therewith can be suppressed.

As described above, the power conversion device 1 controls the power supplied to the coils 11 to 13 corresponding to the phases of the motor 10 through PWM modulation. The power conversion device 1 includes an inverter unit 20 and a control unit 60. The inverter unit 20 corresponds to the phases of the coils 11 to 13 of the motor 10 and includes high SWs 21 to 23 arranged on the high electric potential side and low SWs 24 to 26 arranged on the low electric potential side. In a case where there is a phase in which the on-time of the high SWs 21 to 23 and the low SWs 24 to 26 is shorter than a predetermined time determined based on the dead time (S117 illustrated in FIG. 20: Yes), the control unit 60 performs control through three phase modulation in which the switching between ON and OFF of the high SWs 21 to 23 and the low SWs 24 to 26 of all the phases is controlled such that the on-time of the high SWs 21 to 23 or the on-time of the low SWs 24 to 26 is equal to or longer than a predetermined time and changes the output voltage average value that is an average value of voltages applied to the phases of the coils 11 to 13 (S118). Accordingly, by combining the two-phase modulation and the three-phase modulation without providing a special circuit, the voltage use rate can be improved. In addition, the distortion of the inter-line voltage or the distortion of the current due to the influence of the dead time and vibration or noise accompanied therewith can be suppressed.

In this embodiment, PWM control can be performed by using the triangular wave comparing method that is based on the duty command values and the triangular wave command value. The duty converting section 70 of the control unit 60 calculates the duty conversion values Vu2, Vv2 and Vw2 of each phase, which have different phases, based on the voltage command values Vu1, Vv1, and Vw1 applied to the coils 11 to 13 (S101 illustrated in FIG. 19) and calculates modulated duty command values Vu4, Vv4 and Vw4 acquired by modulating the duties based on the duty conversion values Vu2, Vv2 and Vw2 of each phase (S116). Accordingly, the voltage use rate can be improved. In addition, in a case where there is a phase in which the on-time of the high SWs 21 to 23 or the low SWs 24 to 26 is shorter than a predetermined time when the high SWs 21 to 23 and the low SWs 24 to 26 are turned on or off based on the modulated duty command values Vu4, Vv4 and Vw4 (S117 illustrated in FIG. 20: Yes), the control unit 60 calculates shifted duty command values Vu5, Vv5 and Vw5 that are acquired by shifting the modulated duty command values Vu4, Vv4 and Vw4 of each phase based on the shifting value set such that the on-time of the SWs 21 to 26 is equal to or longer than a predetermined value and the switching between ON and OFF of the SWs 21 to 26 is controlled based on the duty command values that are calculated based on the shifted duty command values Vu5, Vv5 and Vw5. In this embodiment, in one PWM period, the modulated duty command values Vu4, Vv4 and Vw4 are shifted only in a section in which the on-time of the high SWs 21 to 23 or the low SWs 24 to 26 is shorter than the predetermined time. Accordingly, by shifting the modulated duty command values Vu4, Vv4 and Vw4 based on the shifting value, the switching between ON and OFF of the SWs 21 to 26 can be appropriately controlled, and the voltage use rate can be improved. In addition, the distortion of the inter-line voltage or the distortion of the current due to the influence of the dead time and a vibration or a noise accompanied therewith can be suppressed.

In this embodiment, the low-side two-phase modulation is performed in which a value acquired by subtracting a predetermined low limit value from the duty of the smallest duty phase from the duties of all the phases such that the duty of the smallest duty phase is the predetermined low limit value. Even when a low voltage is applied, the switching loss can be reduced, and the voltage use rate can be improved. In addition, by performing the low-side two-phase modulation, the loss and heat generation of the high SWs 21 to 23 can be reduced.

The duty converting section 70 of the control unit 60 changes the duty conversion values Vu2, Vv2 and Vw2 based on the dead time compensating value DT that is a value based on the dead time to eliminate a change amount of the voltage applied to the coil according to the polarities of the currents conducted in the coils 11 to 13 due to the influence of the dead time to calculate the compensated duty command values Vu3, Vv3 and Vw3 (S103, S104, S106, S107, S109 and S110). In addition, in a case where there is a near-limit phase that has a duty within a predetermined range from the high limit value of the duty or the low limit value of the duty, in this embodiment, in a case where the shifted duty command values Vu5, Vv5 or Vw5 are the low limit value of the duty (S120: Yes, S124: Yes, or S128: Yes), the control unit 60 corrects the shifted duty command values other than the near-limit phase (S122, S123, S126, S127, S130, and S131).

In a case where the duty is close to the high limit value or the low limit value, the degree of the influence of the dead time differs based on the duty. Accordingly, in a case where the duty command values are shifted after dead time compensation, and the shifted duty command values Vu5, Vv5 and Vw5 are close to the high limit value or the low limit value of the duty, it is necessary to perform correction corresponding to the dead time compensating amount based on the duty. However, when a duty of a phase that is close to the high limit value or the low limit value of the duty is corrected, the degree of the influence of the dead time also changes. Thus, instead of the correcting the shifted duty command values of a phase, at which the shifted duty command values Vu5, Vv5 and Vw5 are close to the high limit value or the low limit value of the duty, that is, a phase within a predetermined range from the high limit value or the low limit value of the duty, that is, the near-limit phase, by correcting the shifted duty command values other than the near-limit phase, the influence of change in the degree of the influence of the dead time due to a change in the duty of the near-limit phase is avoided. Similar effect as that of a case where the duty of the near-limit phase is corrected can be acquired. Accordingly, the distortion of the inter-line voltage due to the influence of the dead time can be reduced further.

The duty converting section 70 of the control unit 60 calculates pseudo-duty command values DuF, DvF and DwF through linear interpolation based on the U-phase duty DuR=Du(n), the V-phase duty DvR=Dv(n) and the W-phase duty DwR=Dw(n), and the U-phase duty Du(n−1), the V-phase duty Dv(n−1) and the W-phase duty Dw(n−1) that have been calculated before the U-phase duty Du(n), the V-phase duty Dv(n) and the W-phase duty Dw(n). The duty updating process is performed at a frequency that is equal to or higher than twice the calculation frequency of the duty conversion values by using the DuF, DvF and DwF, and DuR, DvR and DwR. Accordingly, the calculation load can be reduced, compared to a case where the frequency of the duty updating process and the frequency of current feedback control calculation that is based on the duty conversion values are the same. In addition, for example, in a case where sound is generated when the duty updating process is performed at the same frequency as that of the control calculation, the duty can be updated at a desired frequency without increasing the calculation load, thereby the generating of the sound can be suppressed.

In addition, the control unit 60 forms a duty converting section, a modulation section, a shifting section, a dead-time compensating section, a correction section, a pseudo-duty calculating section and an updating section. In addition, S101 illustrated in FIG. 19 corresponds to a process as the function of the duty converting section, S116 corresponds to a process as the function of the modulation section and S118 illustrated in FIG. 20 corresponds to a process as the function of the shifting section. Furthermore, S103, S104, S106, S107, S109 and S110 illustrated in FIG. 19 correspond to a process as the function of the dead-time compensating section. S112, S123, S126, S127, S130 and S131 illustrated in FIG. 20 correspond to a process as the function of the correction section. In addition, S132 corresponds to a process as the function of the pseudo-duty calculating section.

Fourth Embodiment

According to a fourth embodiment, the power conversion device 1 is configured to perform a duty converting process differently from the third embodiment.

Figure 24:
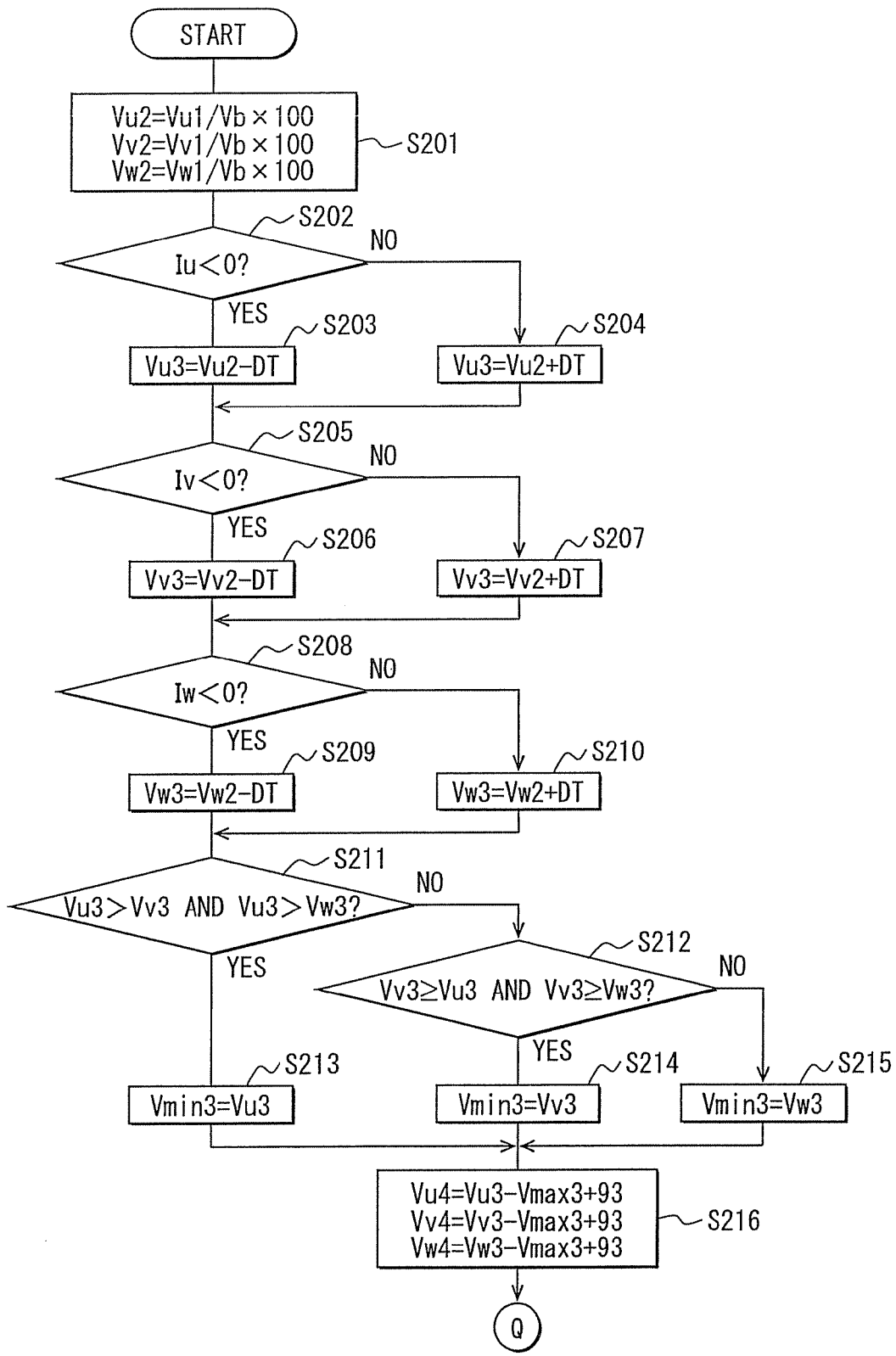
FIG. 24 is a flowchart illustrating a duty converting process according to a fourth embodiment.

The duty converting process according to the fourth embodiment will be described with reference to flowcharts illustrated in FIGS. 24 and 25. The process of S201 to S210 is the same as that of S101 to S110 illustrated in FIG. 19, and the process of S225 to S237 is the same as that of S120 to S132 illustrated in FIG. 20. Thus, the description thereof will not be repeated.

In S211, it is checked whether Vu3>Vv3 and Vu3>Vw3. In a case that Vu3>Vv3 and Vu3>Vw3 (S211: Yes), the process proceeds to S213. On the other hand, in a case that the relationships of Vu3>Vv3 and Vu3>Vw3 are not satisfied (S211: No), the process proceeds to S212.

In Step S212, it is checked whether Vv3≤Vu3 and Vv3≤Vw3. In a case that Vv3≤Vu3 and Vv3≤Vw3 (S212: Yes), the process proceeds to S214. On the other hand, in a case that the relationships of Vv3≤Vu3 and Vv3≤Vw3 are not satisfied (S212: No), the process proceeds to S215.

In S213, the largest compensated duty command value (denoted as "Vmax" in FIG. 24) of three phases is specified as Vu3.

In S214, the largest compensated duty command value of three phases is specified as Vv3.

In S215, the largest compensated duty command value of three phases is specified as Vw3.

In S216, a modulated duty command value is calculated such that the largest compensated duty command value is 93% based on the compensated duty command values. The modulated duty command values Vu4, Vv4 and Vw4 of the phases are calculated by using the following Equations (50) to (52).

$$Vu4=Vu3-Vmax+93 \quad \text{Equation (50)}$$

$$Vv4=Vv3-Vmax+93 \quad \text{Equation (51)}$$

$$Vw4=Vw3-Vmax+93 \quad \text{Equation (52)}$$

Figure 25:
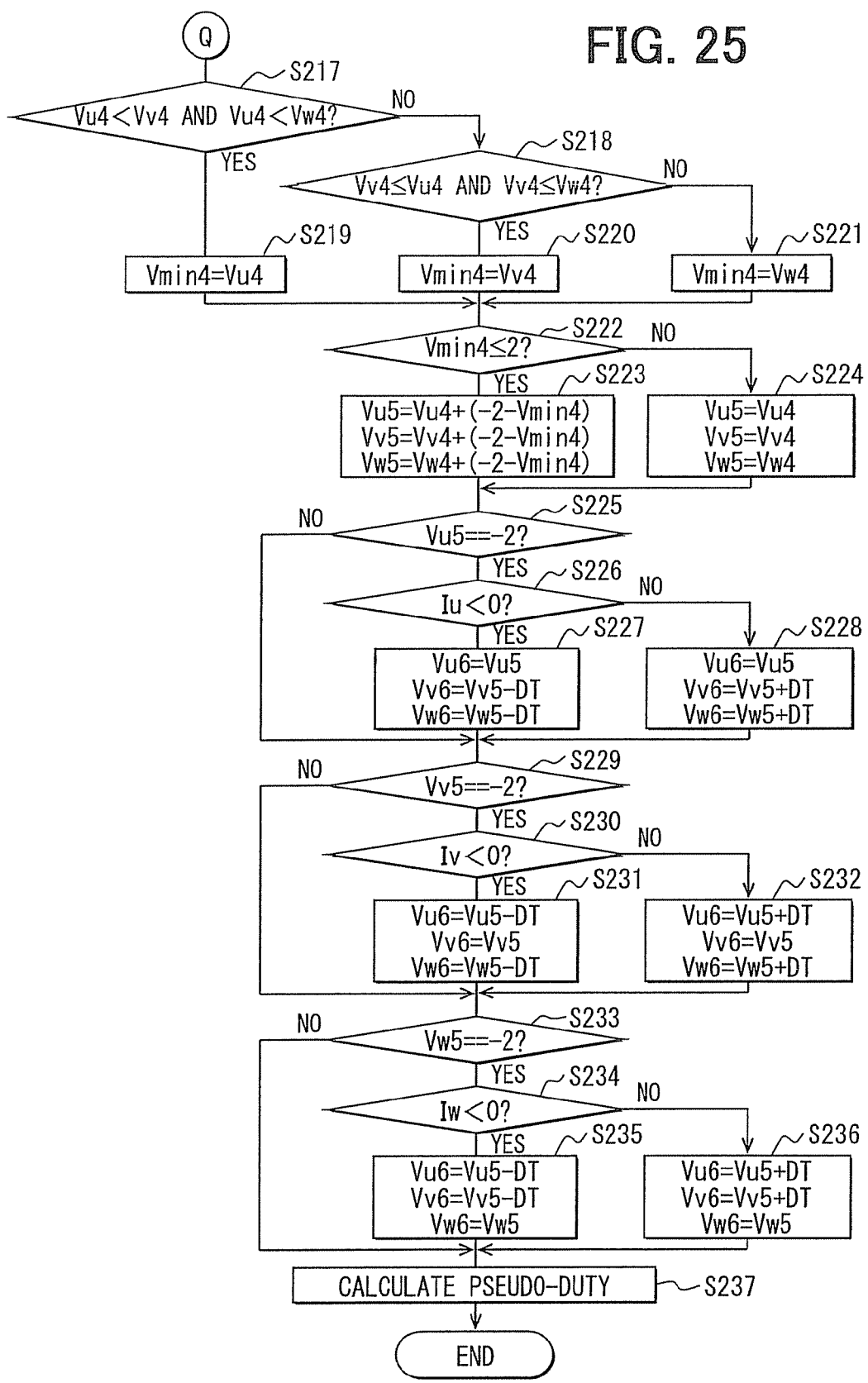
FIG. 25 is a flowchart illustrating a duty converting process according to the fourth embodiment.

As illustrated in FIG. 25, in S217, it is checked whether Vu4<Vv4 and Vu4<Vw4. In a case that Vu4<Vv4 and Vu4<Vw4 (S217: Yes), the process proceeds to S219. On the other hand, in a case that the relationships of Vu4<Vv4 and Vu4<Vw4 are not satisfied (S217: No), the process proceeds to S218.

In S218, it is checked whether Vv4≤Vu4 and Vv4≤Vw4. In a case that Vv4≤Vu4 and Vv4≤Vw4 (S218: Yes), the process proceeds to S220. On the other hand, in a case that the relationships of Vv4≤Vu4 and Vv4≤Vw4 are not satisfied (S218: No), the process proceeds to S221.

In S219, the smallest modulated duty command value (denoted as "Vmin" in FIG. 25) of three phases is specified as Vu4.

In S220, the smallest modulated duty command value of three phases is specified as Vv4.

In S221, the smallest modulated duty command value of three phases is specified as Vw4.

In S222, it is checked whether Vmin that is the smallest modulated duty is equal to or less than 2. In a case where Vmin is determined to be equal to or less than 2 (S222: Yes), the process proceeds to S223. On the other hand, in a case where Vmin is determined not to be equal to or less than 2 (S222: No), the process proceeds to S224.

In S223, by shifting the modulated duty command values Vu4, Vv4 and Vw4 of the phases, shifted duty command values Vu5 and Vv5 and Vw5 are calculated. In this embodiment, the modulated duty command values Vu4, Vv4 and Vw4 of the phases are shifted such that the smallest shifted duty command value is −2%. The shifted duty command values Vu5, Vv5 and Vw5 are calculated by using the following Equations (53) to (55).

$$Vu5=Vu4+(-2+Vmin4) \quad \text{Equation (53)}$$

$$Vv5=Vv4+(-2+Vmin4) \quad \text{Equation (54)}$$

$$Vw5=Vw4+(-2+Vmin4) \quad \text{Equation (55)}$$

In this embodiment, (−2+Vmin4) corresponds to the shifting value.

In S224, the modulated duty command values Vu4, Vv4 and Vw4 of the phases are not shifted. Here, for convenience of the description, Vu5, Vv5 and Vw5 are set by using the following Equations (56) to (58).

$$Vu5=Vu4 \quad \text{Equation (56)}$$

$$Vv5=Vv4 \quad \text{Equation (57)}$$

$$Vw5=Vw4 \quad \text{Equation (58)}$$

When the correspondence relationship among FIGS. 24, 25, 9A and 9B is described, the process of S201 is the process performed by the duty converting section 70, the process of S202 to S210 is the process performed by of the dead-time compensating section 72, the process of S211 to S216 is the process performed by the modulation section 73, the process of S217 to S224 is the process performed by the avoidance section 74, the process of S225 to S236 is the process performed by the correction section 75, and the process of S237 is the process performed by the pseudo-duty calculating section 76. Here, the duty of each phase calculated in FIGS. 24 and 25 will be described with reference to FIGS. 26A to FIG. 27C.

Figure 26A:
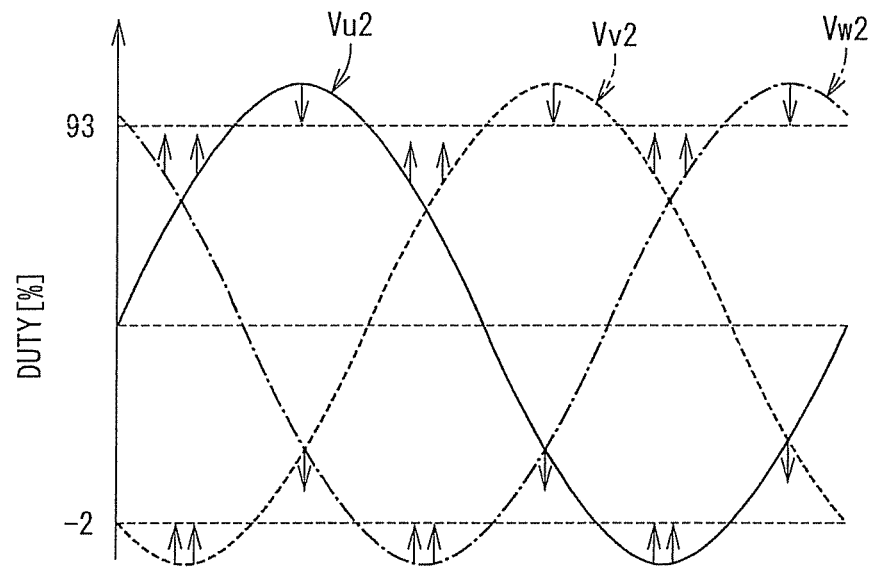
FIGS. 26A and 26B are diagrams illustrating a modulation process according to the fourth embodiment, with FIG. 26A illustrating a duty before the modulation process and FIG. 26B illustrating a duty after the modulation process.
Figure 26B:
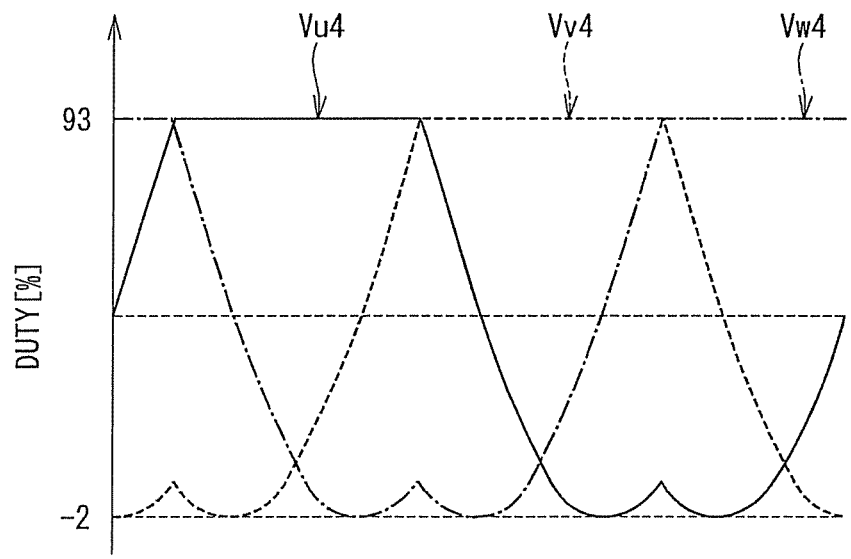

As illustrated in FIG. 26A, the duty conversion values Vu2, Vv2 and Vw2 correspond to sinusoidal wave signals. After the duty conversion values Vu2, Vv2 and Vw2 are compensated for the dead time, when the high-side two-phase modulation is performed such that a compensated duty command value having the largest phase is a predetermined high limit value (for example, 93%) (S216 illustrated in FIG. 24), modulated duty command values Vu4, Vv4 and Vw4 are as illustrated in FIG. 26B.

Figure 27A:
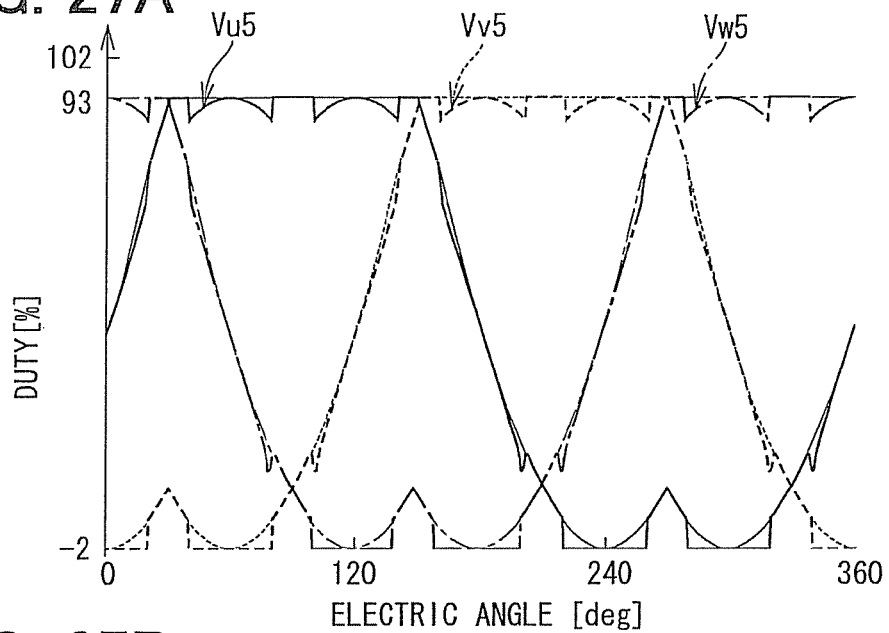
FIGS. 27A to 27C are diagrams illustrating an avoidance process according to the fourth embodiment, with FIG. 27A illustrating a duty over an electric angle of 360 degrees, FIG. 27B illustrating a U-phase duty near an electric angle of 120 degrees and FIG. 27C illustrating a V-phase duty and a W-phase duty near an electric angle of 120 degrees.
Figure 27B:
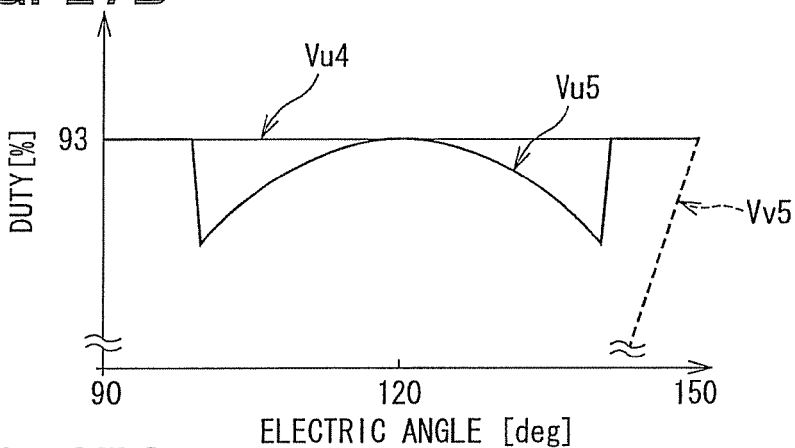
Figure 27C:
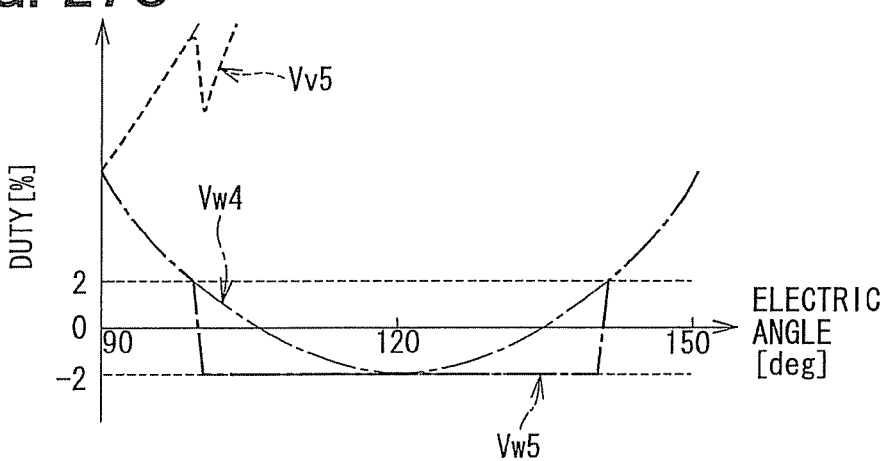

In addition, when the avoidance process of S217 to S224 is performed by the avoidance section 74, the result is as illustrated in FIGS. 27A to 27C. FIG. 27A is a diagram illustrating an electric angle range of 0 degrees to 360 degrees, and FIGS. 27B and 27C are enlarged diagrams in which a portion around an electric angle of 120 degrees is enlarged.

As illustrated in FIGS. 27B and 27C, since the smallest modulated duty command value near an electric angle of 120 degrees is Vw4 (S217: No, S218: No), Vmin4=Vw4 (S221). In addition, in a case where Vw4 that is Vmin4 is equal to or less than 2 (S222: Yes), the duties of all the phases are shifted by (−2−Vmin4) such that Vw4 is −2 (S223). As above, in a range satisfying the condition of Vmin4≤2, the output voltage average value is changed, and a corresponding duty is avoided. Accordingly, a distortion of the inter-line voltage or a distortion of a current that is due to the influence of the dead time and vibration or noise accompanied therewith can be suppressed.

In this embodiment, a value acquired by subtracting a predetermined high limit value from the duty command value of the largest duty phase is subtracted from the duty command values of all the phases such that the duty of the largest duty phase is the predetermined high limit value (in this embodiment, 93%). Even when a low voltage is applied, the switching loss can be reduced, and the voltage use rate can be improved. In addition, by performing the high-side two-phase modulation, the loss and the heat generation of the low SWs 24 to 26 can be reduced.

Furthermore, the same advantages as those of the third embodiment are provided.

In this embodiment, the control unit 60 forms a duty converting section, a modulation section, a shifting section, a dead-time compensating section, a correction section, a pseudo-duty calculating section and an updating section. In addition, S201 illustrated in FIG. 24 corresponds to a process as the function of the duty converting section, S216 corresponds to a process as the function of the modulation section, and S223 illustrated in FIG. 25 corresponds to a process as the function of the shifting section. Furthermore, S203, S204, S206, S207, S209 and S210 illustrated in FIG. 24 correspond to a process as the function of the dead-time compensating section, and S227, S228, S231, S232, S235 and S236 illustrated in FIG. 25 correspond to a process as the function of the correction section. In addition, S237 corresponds to a process as the function of the pseudo-duty calculating section.

The power conversion device 1 according to the fourth embodiment may be modified as exemplified in a fifth to seventh embodiments. As described below, the fifth to seventh embodiments differ from that of the fourth embodiment only in a modulation process.

Fifth Embodiment

Figure 28A:
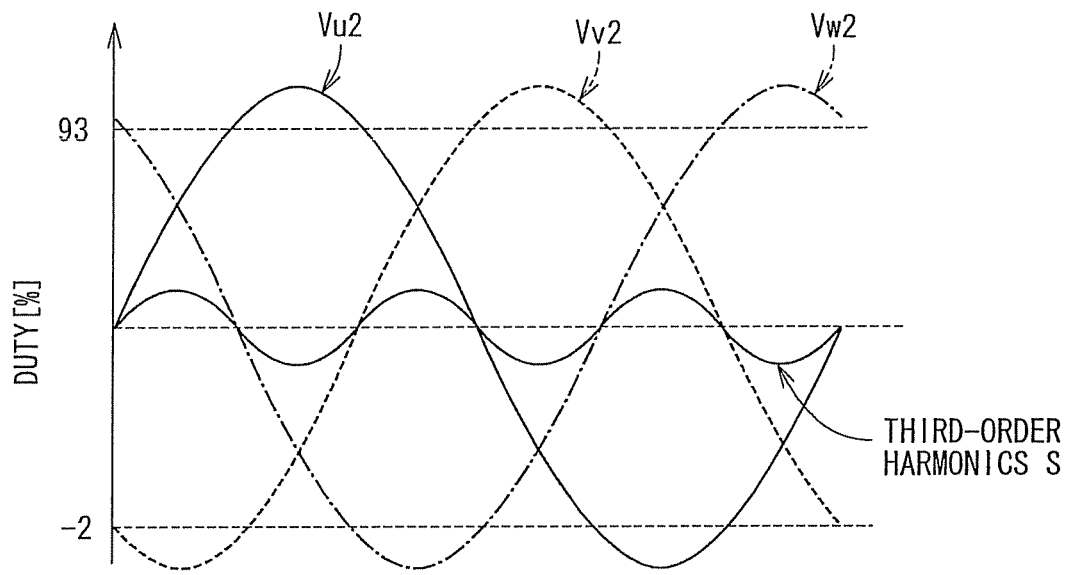
FIGS. 28A and 28B are diagrams illustrating a modulation process according to a fifth embodiment, with FIG. 28A illustrating a duty before the modulation process and FIG. 28B illustrating a duty after the modulation process.
Figure 28B:
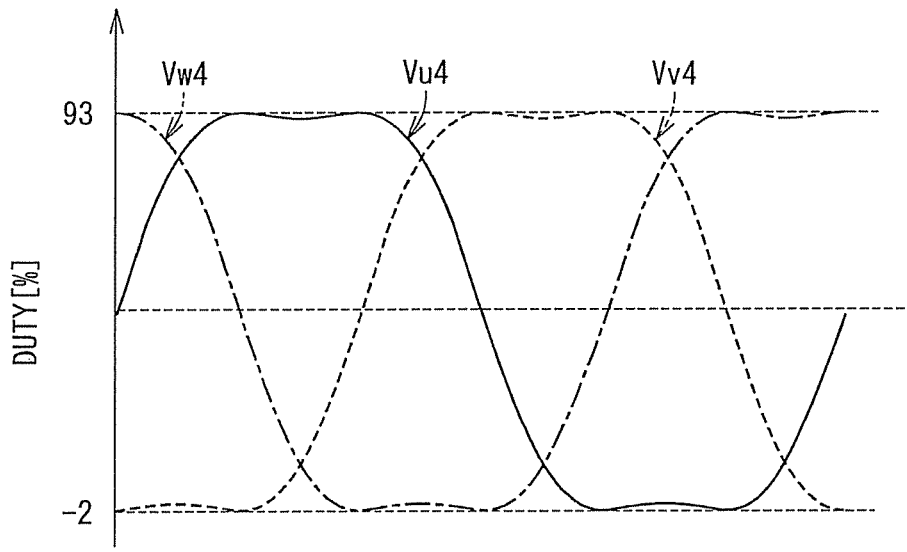

In the fifth embodiment, as illustrated in FIG. 28A, the duty conversion values Vu2, Vv2 and Vw2 correspond to sinusoidal wave signals. After the duty conversion values Vu2, Vv2 and Vw2 are compensated for the dead time, third harmonics denoted by S in the duty of each phase are added thereto. In addition, the center of the amplitude of the added third harmonics S is zero. The modulated duty command values Vu4, Vv4 and Vw4 acquired by adding the third harmonics S to the duties of the phases are as illustrated in FIG. 28B.

Figure 29A:
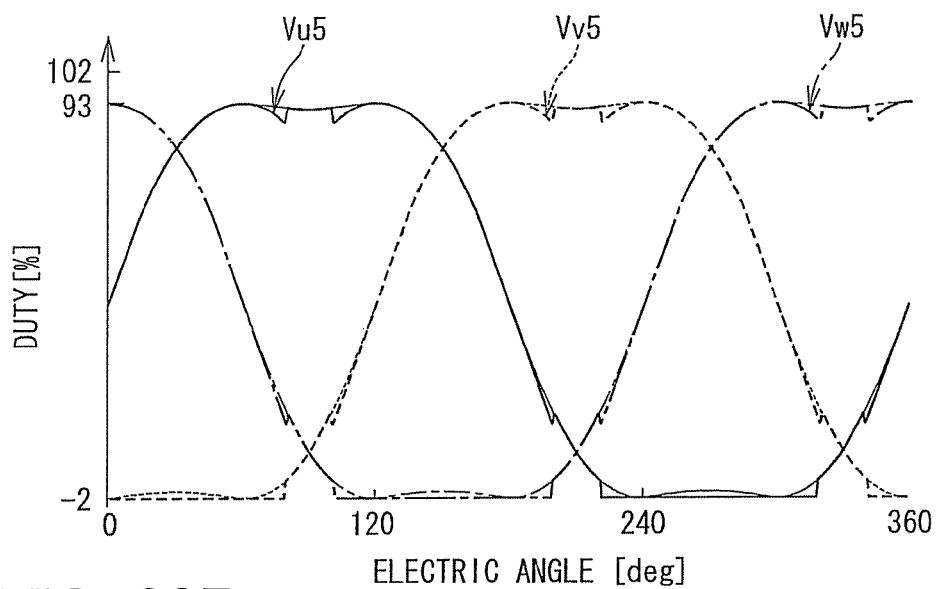
FIGS. 29A to 29C are diagrams illustrating an avoidance process according to the fifth embodiment, with FIG. 29A illustrating a duty over an electric angle of 360 degrees, FIG. 29B illustrating a U-phase duty near an electric angle of 90 degrees and FIG. 29C illustrating a V-phase duty and a W-phase duty near an electric angle of 90 degrees.
Figure 29B:
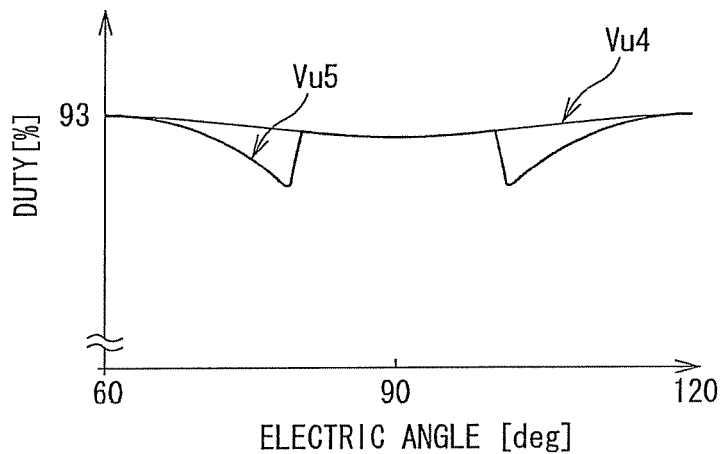
Figure 29C:
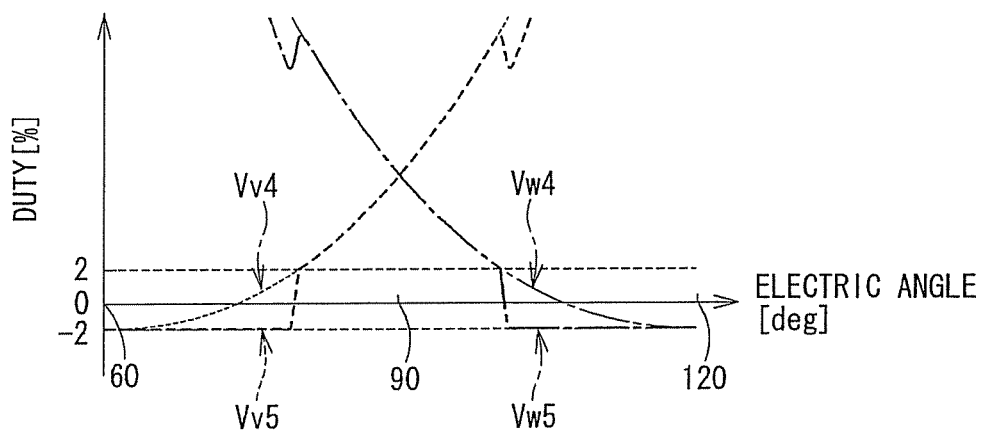

In addition, when the avoidance process of S217 to S224 (FIG. 25) is performed by the avoidance section 74, the result becomes is as illustrated in FIGS. 29A to 29C. FIG. 29A is a diagram illustrating the duty conversion values over an electric angle range of 0 degrees to 360 degrees, and FIGS. 29B and 29C are enlarged diagrams in which only a portion of the duty conversion values near an electric angle of 90 degrees is enlarged.

As illustrated in FIGS. 29B and 29C, since the smallest modulated duty command value near an electric angle of 80 degrees is Vv4 (S217: No, S218: Yes), Vmin4=Vv4 (S220). In addition, in a case where Vv4 that is Vmin4 is equal to or less than 2 (S222: Yes), the duties of all the phases are shifted by (−2−Vmin4) such that Vv4 is −2 (S223).

Similarly, since the smallest modulated duty command value near an electric angle of 110 degrees is Vw4 (S217: No, S218: No), Vmin4=Vw4 (S221). In addition, in a case where Vw4 that is Vmin4 is equal to or less than 2 (S222: Yes), the duties of all the phases are shifted by (−2−Vmin4) such that Vw4 is −2 (S223).

As above, in a range satisfying the condition of Vmin4≤2, the output voltage average value is changed, and a corresponding duty is avoided.

Accordingly, a distortion of the inter-line voltage or a distortion of a current that is due to the influence of the dead time and a vibration or a noise accompanied therewith can be suppressed.

In this embodiment, the third harmonics S are added to the duty command values of all the phases. Accordingly, the voltage use rate can be improved. In addition, the same advantages as those of the third embodiment are acquired.

Sixth Embodiment

In the sixth embodiment, the modulation process and the avoidance process are performed as illustrated in FIGS. 30A to 31C.

Figure 30A:
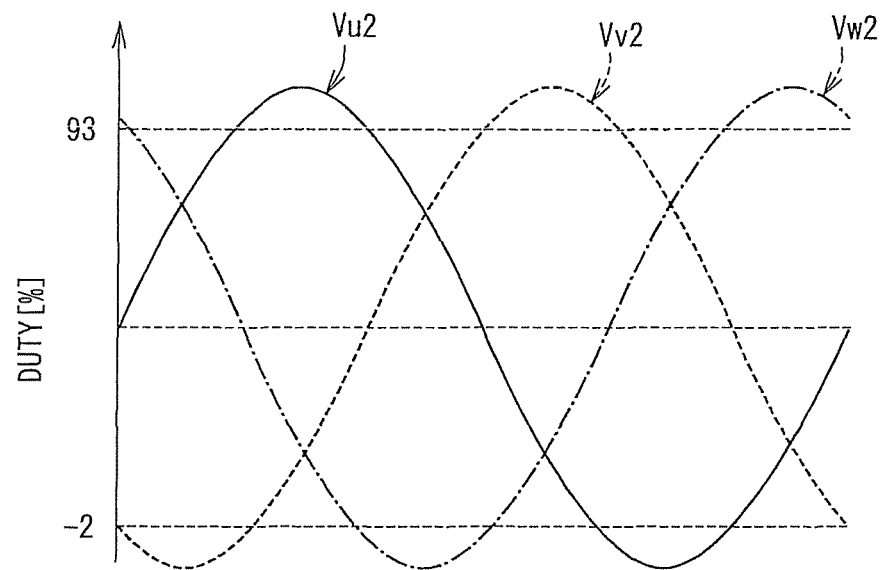
FIGS. 30A and 30B are diagrams illustrating a modulation process according to a sixth embodiment, with FIG. 30A illustrating a duty before the modulation process and FIG. 30B illustrating a duty after the modulation process.

As illustrated in FIG. 30A, the duty conversion values Vu2, Vv2 and Vw2 correspond to sinusoidal wave signals. After the duty conversion values Vu2, Vv2 and Vw2 are compensated for the dead time, an average value of the largest duty and the smallest duty out of the three phases is subtracted from the duties of all the phases. When the maximum duty is Vmax, and the smallest duty is Vmin, the modulated duty command values Vu4, Vv4 and Vw4 are calculated by using Equations (61) to (63).

$$Vu4=Vu3-(Vmax+Vmin)/2 \qquad \text{Equation (61)}$$

$$Vv4=Vv3-(Vmax+Vmin)/2 \qquad \text{Equation (62)}$$

$$Vw4=Vw3-(Vmax+Vmin)/2 \qquad \text{Equation (63)}$$

Figure 30B:
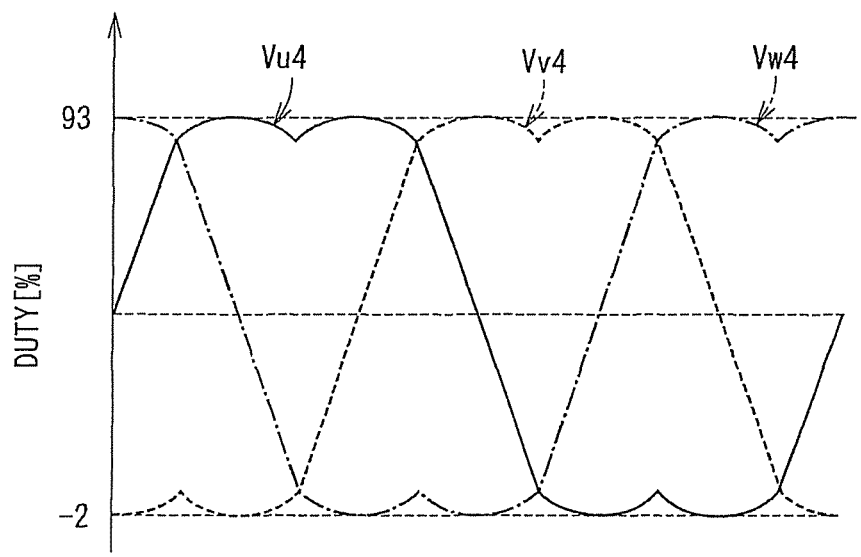

The modulated duty command values Vu4, Vv4 and Vw4 calculated as above are as illustrated in FIG. 30B.

Figure 31A:
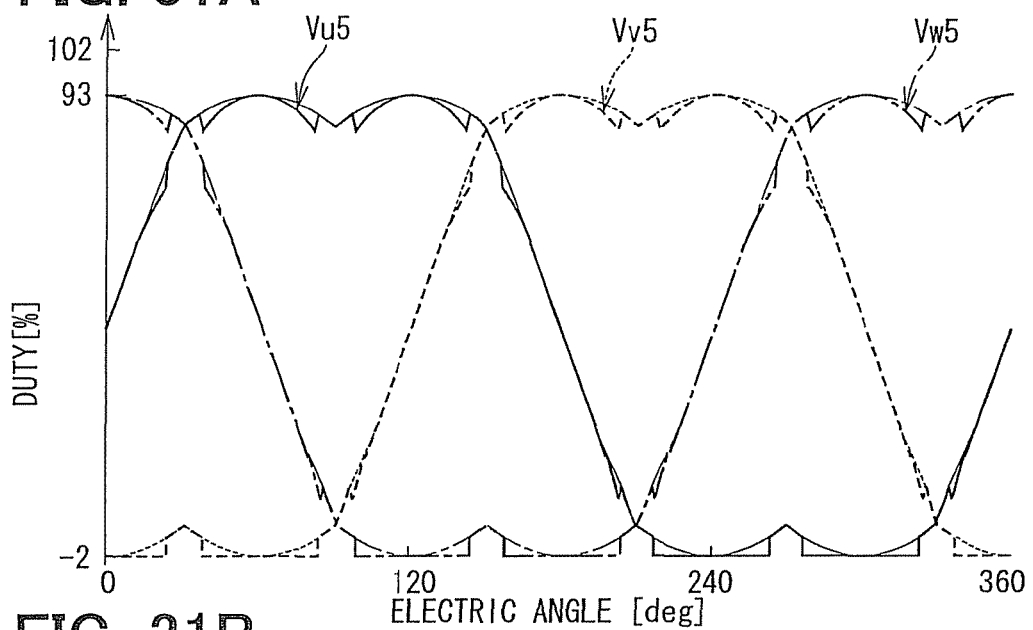
FIGS. 31A to 31C are diagrams illustrating an avoidance process according to the sixth embodiment, with FIG. 31A illustrating a duty over an electric angle of 360 degrees, FIG. 31B illustrating a U-phase duty near an electric angle of 120 degrees and FIG. 31C illustrating a V-phase duty and a W-phase duty near an electric angle of 120 degrees.
Figure 31B:
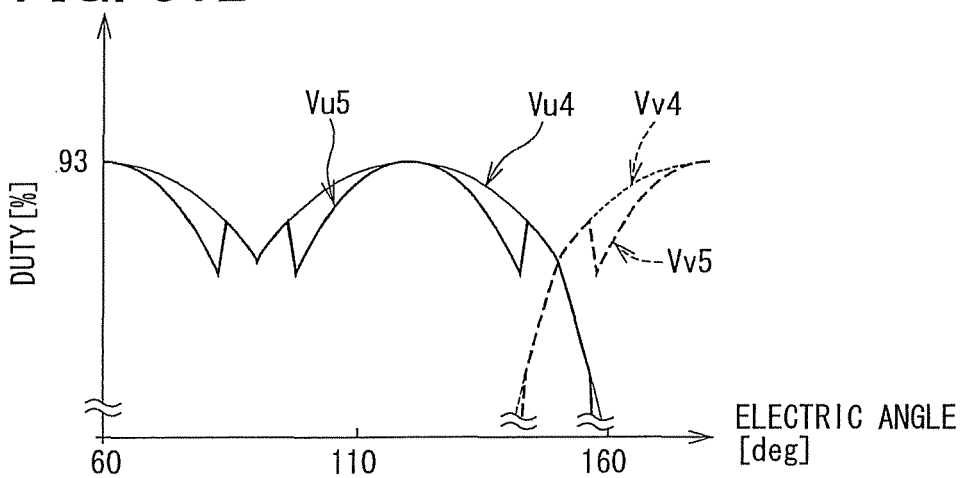
Figure 31C:
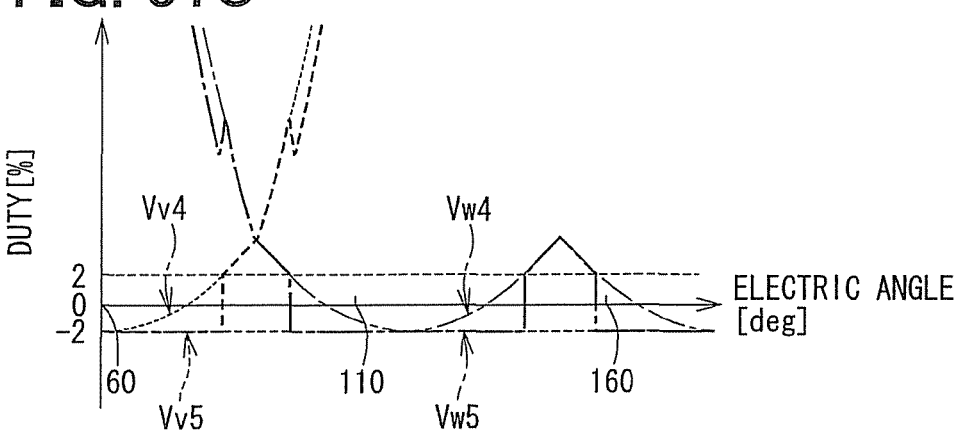

In addition, when the avoidance process of S217 to S224 (FIG. 25) is performed by the avoidance section 74, the result becomes as illustrated in FIGS. 31A to 31C. FIG. 31A is a diagram illustrating duties over an electric angle range of 0 degrees to 360 degrees, and FIGS. 31B and 31C are enlarged diagrams in which only a portions near an electric angle of 120 degrees is enlarged.

As illustrated in FIGS. 31B and 31C, since the smallest modulated duty command value near an electric angle of 60 degrees is Vv4 (S217: No, S218: Yes), Vmin4=Vv4 (S220). In addition, in a case where Vv4 that is Vmin4 is equal to or less than 2 (S222: Yes), the duties of all the phases are shifted by (−2−Vmin4) such that Vv4 is −2.

Similarly, since the smallest modulated duty command value near an electric angle of 120 degrees and near an electric angle of 180 degrees is Vw4 (S217: No, S218: No), Vmin4=Vw4 (S221). In addition, in a case where Vw4 that is Vmin4 is equal to or less than 2 (S222: Yes), the duties of all the phases are shifted by (−2−Vmin4) such that Vw4 is −2 (S223).

As above, in a range satisfying the condition of Vmin4≤2, the output voltage average value is changed, and a corresponding duty is avoided. Accordingly, a distortion of the inter-line voltage or a distortion of a current that is due to the influence of the dead time and vibration or noise accompanied therewith can be suppressed.

In this embodiment, the average value of the duty command value of the largest duty phase and the duty command value of the smallest duty phase is subtracted from the duty command values of all the phases. Accordingly, the voltage use rate can be improved. In addition, the same advantages as those of the third embodiment are provided.

Seventh Embodiment

In the seventh embodiment, the modulation process and the avoidance process are performed as illustrated in FIGS. 32A to 33C.

Figure 32A:
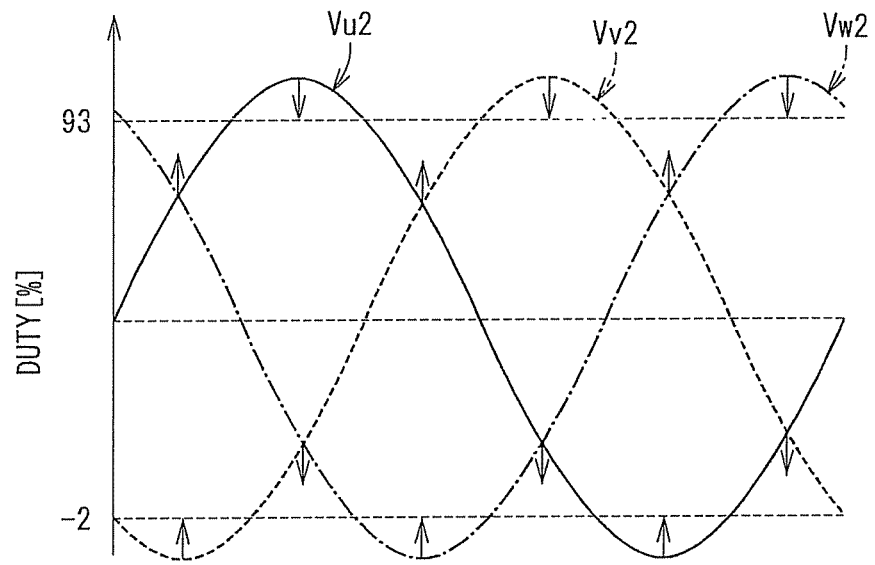
FIGS. 32A and 32B are diagrams illustrating a modulation process according to a seventh embodiment, with FIG. 32A illustrating a duty before the modulation process and FIG. 32B illustrating a duty after the modulation process.
Figure 32B:
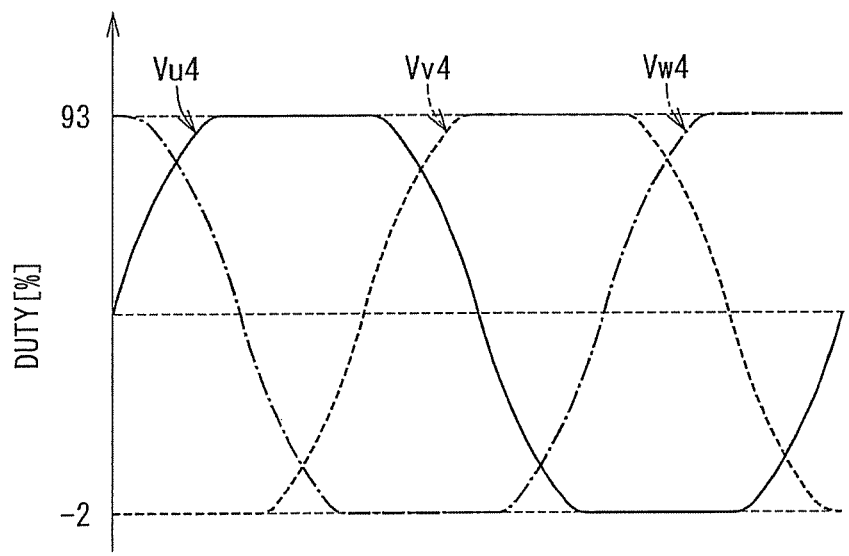

As illustrated in FIG. 32A, the duty conversion values Vu2, Vv2 and Vw2 correspond to sinusoidal wave signals. After the duty conversion values Vu2, Vv2 and Vw2 are compensated for the dead time, a value acquired by subtracting a duty command value less than a predetermined low limit value from the predetermined low limit value or a value acquired by subtracting a predetermined high limit value from a duty command value exceeding the predetermined high limit value is subtracted from all the phases. In this embodiment, the predetermined low limit value is −2%, and the predetermined high limit value is 93%. The modulated duty command values Vu4, Vv4 and Vw4 calculated as above becomes as illustrated in FIG. 32B.

Figure 33A:
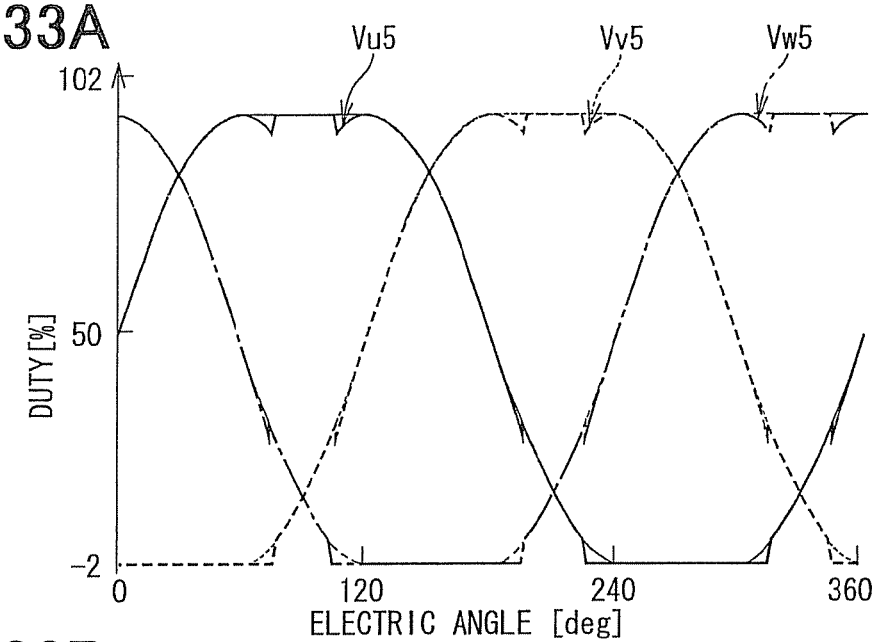
FIGS. 33A to 33C are diagrams illustrating an avoidance process according to the seventh embodiment, with FIG. 33A illustrating a duty over an electric angle of 360 degrees, FIG. 338 illustrating a U-phase duty near an electric angle of 120 degrees and FIG. 33C illustrating a V-phase duty and a W-phase duty near an electric angle of 120 degrees.
Figure 33B:
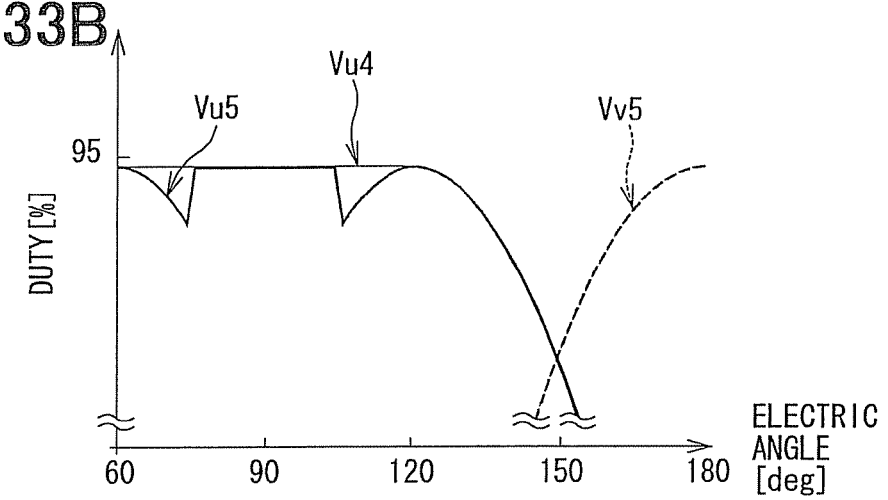
Figure 33C:
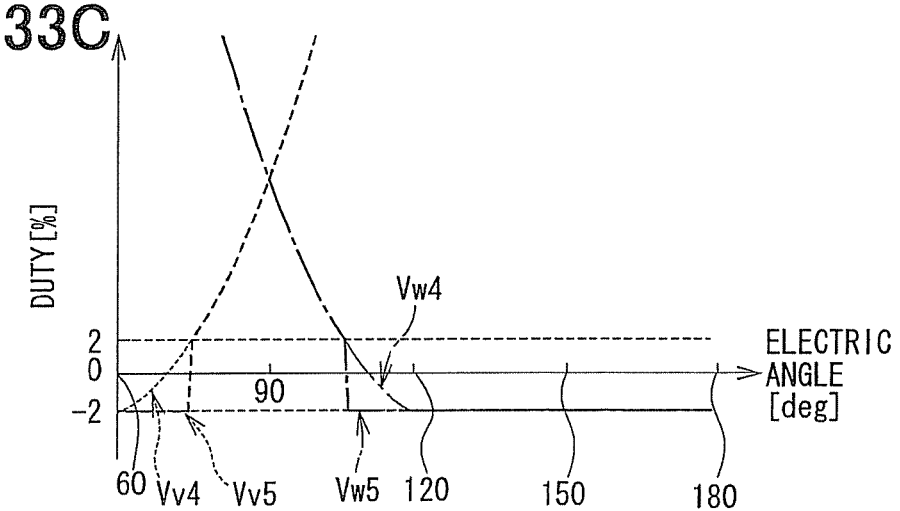

In addition, when the avoidance process of S217 to S224 (FIG. 25) is performed by the avoidance section 74, the result becomes as illustrated in FIGS. 33A to 33C. FIG. 33A is a diagram illustrating the duties over an electric angle range of 0 degrees to 360 degrees, and FIGS. 33B and 33C are enlarged diagrams in which a portion near an electric angle of 120 degrees is enlarged.

As illustrated in FIGS. 33B and 33C, since the smallest modulated duty command value near an electric angle of 60 degrees is Vv4 (S217: No, S218: Yes), Vmin4=Vv4 (S220). In addition, in a case where Vv4 that is Vmin4 is equal to or less than 2 (S222: Yes), the duties of all the phases are shifted by (−2−Vmin4) such that Vv4 is −2.

Similarly, since the smallest modulated duty command value near an electric angle of 120 degrees and near an electric angle of 180 degrees is Vw4 (S217: No, S218: No), Vmin4=Vw4 (S221). In addition, in a case where Vw4 that is Vmin4 is equal to or less than 2 (S222: Yes), the duties of all the phases are shifted by (−2−Vmin4) such that Vw4 is −2 (S223).

As above, in a range satisfying the condition of Vmin4≤2, the output voltage average value is changed, and a corresponding duty is avoided. Accordingly, distortion of the interline voltage or distortion of a current that is due to the influence of the dead time and vibration or noise accompanied therewith can be suppressed.

In this embodiment, a value acquired by subtracting a duty command value less than a predetermined low limit value from the predetermined low limit value or a value acquired by subtracting a predetermined high limit value from a duty command value exceeding the predetermined high limit value is subtracted from the duty command values of all the phases. Accordingly, the voltage use rate can be improved. In addition, the same advantages as those of the third embodiment are acquired.

Other Embodiments (A) Process of Duty Converting Section

In the above-described embodiments, the duty converting process, the dead-time compensating process, the modulation process, the avoidance process, the correction process and the pseudo-duty calculating process are performed in the order illustrated in and described with reference to FIG. 9B. However, as another embodiment, the dead-time compensating process, the correction process and the pseudo-duty calculating process may be omitted, and the order or the processes may be changed.

In the above-described embodiment, when the duty of the smallest duty phase is a predetermined low limit value, instead of correcting the duty near the near-limit phase, duties of phases other than the near-limit phase are corrected. In another embodiment, for example, as described with reference to FIGS. 11A to 16B, it may be formed such that a phase having a duty in the range in which the degree of the influence of the dead time changes in accordance with the duty is set as a near-limit phase, and duties of phases other than the near-limit phase may be corrected instead of correcting the duty of the near-limit phase. In addition, in the above-described embodiments, although the duties of phases other than the near-limit phase are corrected by adding or subtracting the dead time compensating amount DT thereto or therefrom, it is preferable that the correction amount is appropriately set based on the compensation amount of the dead time and the actual dead time of the duty of the near-limit phase.

In addition, in the correction process of the above-described embodiments, the duty command values of phases other than the near-limit phase are corrected based on the compensation amount of the dead time. However, the duty command value of the near-limit phase may be directly corrected.

(B) Current Detecting Unit

Figure 34A:
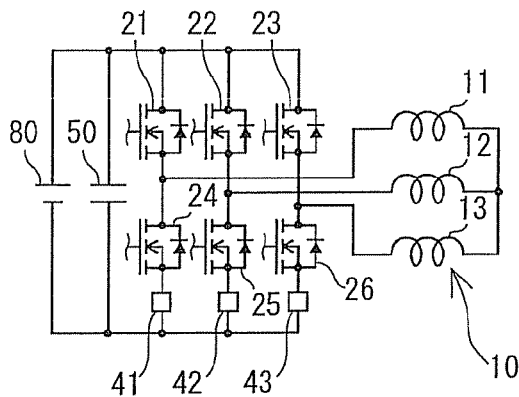
FIGS. 34A to 34F are circuit diagrams illustrating modified examples of the installation position of a current detecting unit.

The current detecting unit 40, specifically the current detection sections 41, 42 and 43, may be installed at positions as illustrated in FIGS. 34B to 34F differently from the position illustrated in FIG. 34A, in which the current detecting unit 40 is disposed on the side of the ground of the low SWs 24 to 26 as described with reference to FIG. 1.

Figure 34B:
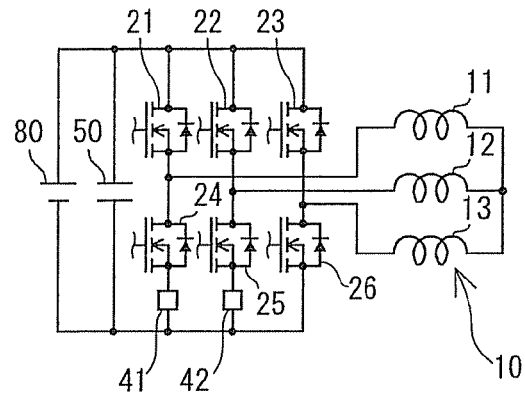

For example, as illustrated in FIG. 34B, the W-phase current detecting section 43 or the like may be omitted in one phase out of all phases. As in this example, even in a case where a current detecting section of one phase out of all phases is omitted, the currents of all the phases can be detected based on a difference from a current of the power source. That is, the current detecting sections may be disposed at two positions in the case of three phases and may be disposed at four positions in the case of five phases. In addition, the current detecting section may be omitted in any phase.

Figure 34C:
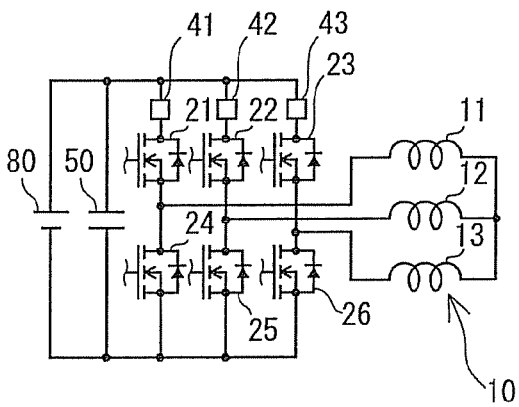
Figure 34D:
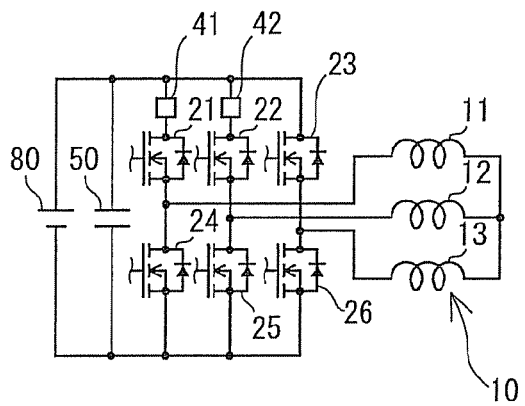

As illustrated in FIG. 34C, the current detecting sections 41 to 43 may be disposed on the side of the power source of the high SWs 21 to 23. In addition, as illustrated in FIG. 34D, the W-phase current detecting section 43 or the like may be omitted in one phase out of all phases. The omission of the current detecting section in one phase out of all phases is similar to that described with reference to FIG. 34B. In addition, in a case where the current detecting sections 41 to 43 are arranged on the side of the power source of the high SWs 21 to 23, and a shunt resistor is used as the current detecting section, to detect the current of each phase, it is necessary to acquire a period in which all the high SWs 21 to 23 are turned on. In addition, a time in which the rigging converges and a holding time in which the switching between ON and OFF of the SWs 21 to 26 is not performed are necessary. Accordingly, in a case where a current is detected by a shunt resistor located on the side of the power source of the high SWs 21 to 23, to acquire the holding time, it is preferable that the predetermined low limit value is raised, for example, to 7%. In addition, the predetermined low limit value or the predetermined high limit value may be appropriately set to desired values.

Figure 34E:
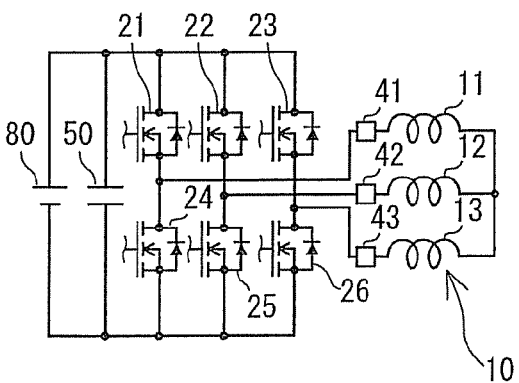
Figure 34F:
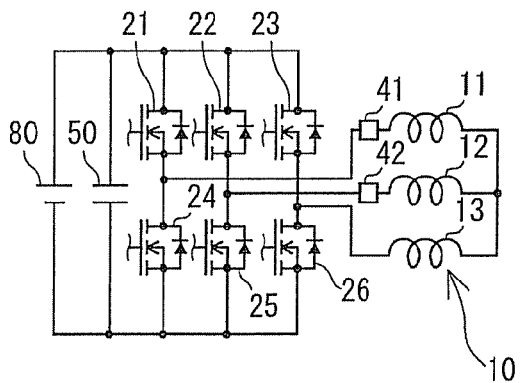

In addition, as illustrated in FIG. 34E, the current detecting sections 41 to 43 may be disposed between the connection points of the high SW 21 and the low SW 24, of the high SW 22 and the low SW 25, and of the high SW 23 and the low SW 26 and corresponding coils 11 to 13, respectively. Furthermore, as illustrated in FIG. 34F, the W-phase current detecting section 43 or the like may be omitted in one phase out of all the phases. The omission of the current detecting section in one phase out of all phases is similar to that described with reference to FIG. 34B.

Furthermore, in the above-described embodiments, any type of current detecting section may be used, as long as it can detect a current by using a shunt resistor included in the current detecting section. Particularly, as illustrated in FIGS. 34E and 34F, in a case where the current detecting sections are disposed between the connection points of the high SWs 21 to 23 and the low SWs 24 to 26 and the coils 11 to 13, instead of the shunt resistor, a hall device may be alternatively used.

(C) Inverter Unit

Figure 35:
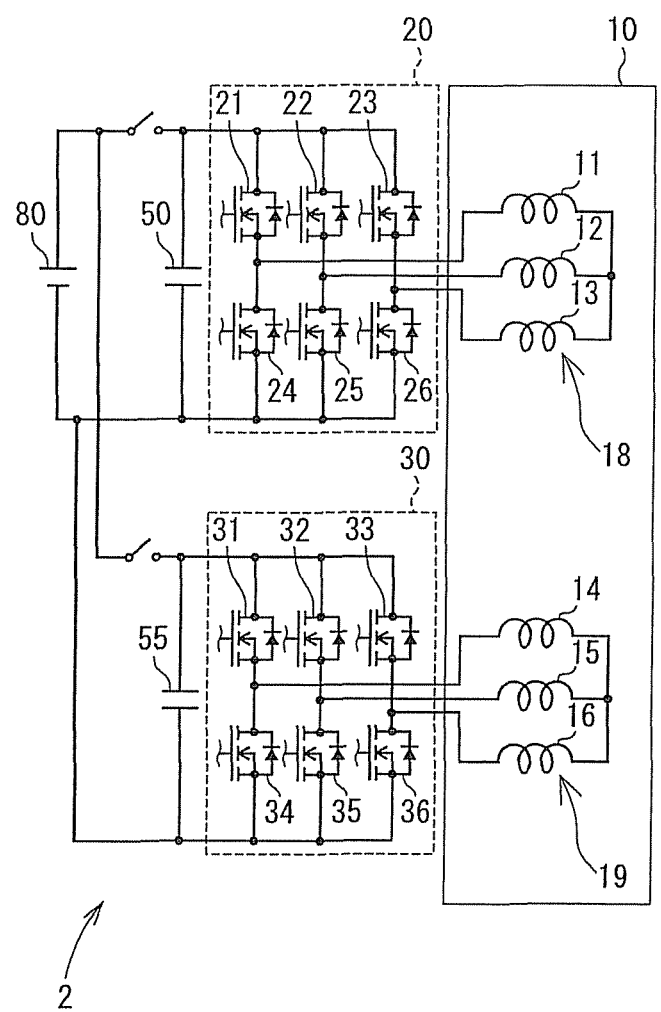
FIG. 35 is a circuit diagram illustrating a modified example, in which a plurality of inverter units is provided.

In the above-described embodiments, the power conversion device 1 is formed by only one inverter unit. However, as another embodiment, a plurality of the inverter units may be arranged. For example, as a power conversion device 2 illustrated in FIG. 35, it may be formed such that an inverter unit 20 formed by the SWs 21 to 26 controls power supplied to one coil set 18 that is formed by the coils 11 to 13, and an inverter unit 30 formed by SWs 31 to 36 controls power supplied to another coil set 19 that is formed by coils 14 to 16. In addition, the SWs 21 to 26 of the inverter unit 20, the inverter unit 30, the SWs 31 to 36, the coil set 18, the coil set 19, the capacitor 50, and the capacitor 55 may be formed to be the same or formed to be different. As in the example illustrated in FIG. 35, in a case where there are two inverter units 20 and 30, different modulation processes may be performed as in a state in which the low-side two-phase modulation is performed for one inverter unit, and the high-side two-phase modulation is performed for the other. Particularly, by performing the low-side two-phase modulation for one and performing the high-side two-phase modulation for the other, ripple currents in the capacitors 50 and 55 can be decreased, which is preferable. In addition, as illustrated in FIG. 35, a coil set corresponding to a plurality of inverter units may be used in one motor or used in different motors.

In the above-described embodiments, the rotary electric machine is a motor. However, the rotary electric machine is not limited thereto and may be a generator. Many other modifications will be possible in the above-described embodiments.

What is claimed is:

1. A power conversion device that controls power supplied to coils corresponding to each phase of a rotary electric machine through pulse width modulation, the power conversion device comprising:

an inverter unit that includes high electric potential-side switching devices arranged on a high electric potential-side and low electric potential-side switching devices arranged on a low electric potential side in correspondence with each phase of the coils of the rotary electric machine, and the inverter unit includes a current detecting section that detects a current flowing in each phase of the coils of the rotatory electric machine;

a control unit that, in a case where there is a phase at which an on-time of the high electric potential-side switching devices or an on-time of the low electric potential-side switching devices is shorter than a predetermined time, which is determined based on a dead time set to prevent the high electric potential-side switching device and the low electric potential-side switching device corresponding to each phase of the coils from turning on simultaneously, changes an output voltage average value that is an average value of voltages applied to each phase of the coils by controlling switching between ON and OFF of the high electric potential-side switching devices and the low electric potential-side switching devices of all the phases such that the on-time becomes equal to or longer than the dead time, wherein the control unit calculates an output voltage of the inverter unit defined by a magnitude, which is calculated in accordance with a current command value, the current detected by the current detecting section, and a phase angle, and changes the output voltage average value in a period, in which there is the phase at which the on-time of the high electric potential-side switching devices or the on-time of the low electric potential-side switching devices is less than the dead time, by switching the pulse width modulation between a two-phase modulation and a three-phase modulation based on the magnitude and the phase angle of the output voltage of the inverter unit.

2. The power conversion device according to claim 1, wherein:

the control unit is configured to perform the pulse width modulation by using a triangular wave comparing method that is based on duty command values and triangular wave command values;

the control unit includes a duty converting section, a modulation section and a shifting section, the duty converting section calculating duty conversion values having different phases for each phase based on voltage command values applied to the coils of each phase, the modulation section calculating modulated duty command values acquired by modulating duties that are based on the duty conversion values of each phase calculated by the duty converting section, and the shifting section calculating shifted duty command values acquired by shifting the modulated duty command values of each phase based on a shifting value that is set such that the on-time is equal to or longer than the predetermined time, in a case where there is a phase at which the on-time of the high electric potential-side switching devices or the low electric potential-side switching devices is shorter than the predetermined time when the high electric potential-side switching devices and the low electric potential-side switching devices are turned on or off based on the modulated duty command values modulated by the modulation section; and the control unit is configured to control the switching between ON and OFF of the high electric potential-side switching devices and the low electric potential-side switching devices based on the duty command values calculated based on the shifted duty command values.

3. The power conversion device according to claim 1, wherein:

the control unit is configured to perform the pulse width modulation by using an instantaneous voltage vector selecting method that is based on a command voltage vector; and the control unit includes a two-phase modulation section and a three-phase modulation section, the two-phase modulation section controlling switching between ON and OFF of the high electric potential-side switching devices and the low electric potential-side switching devices through the two-phase modulation that is controlled by using one of a first zero-voltage vector in which all the high electric potential-side switching devices are turned on or a second zero-voltage vector in which all the low electric potential-side switching devices are turned on as a zero-voltage vector, and the three-phase modulation section controlling switching between ON and OFF of the high electric potential-side switching devices and the low electric potential-side switching devices by switching to the three-phase modulation that is controlled by using the first zero-voltage vector and the second zero-voltage vector such that the on-time in which the high electric potential-side switching devices or the low electric potential-side switching devices are turned on is equal to or longer than the predetermined time, in a case where a basic vector is less than a determination value set based on the dead time when the command vector is decomposed into the basic vector.

4. The power conversion device according to claim 2, wherein:
the control unit further includes a dead-time compensating section and a correction section,
the dead-time compensating section calculating compensated duty command values by changing the duty based on a dead-time compensating value that is a value based on the dead time to eliminate a change amount of voltages applied to the coils in accordance with a polarity of currents conducted in the coils due to an influence of the dead time, and
the correction section correcting the duties of phases other than a near-limit phase, in a case where there is the near-limit phase that is a phase at which the duty is within a predetermined range from an high limit value of the duty or a low limit value of the duty.

5. The power conversion device according to claim 2, wherein:
the modulation section adds third harmonics to the duties of all the phases.

6. The power conversion device according to claim 2, wherein:
the modulation section subtracts an average value of the duty of a largest duty phase and the duty of a smallest duty phase from the duties of all the phases.

7. A power conversion device that controls power supplied to coils corresponding to each phase of a rotary electric machine through pulse width modulation, the power conversion device comprising:
an inverter unit that includes high electric potential-side switching devices arranged on a high electric potential-side and low electric potential-side switching devices arranged on a low electric potential side in correspondence with each phase of the coils of the rotary electric machine; and
a control unit that, in a case where there is a phase at which an on-time of the high electric potential-side switching devices or an on-time of the low electric potential-side switching devices is shorter than a predetermined time, which is determined based on a dead time set to prevent the high electric potential-side switching device and the low electric potential-side switching device corresponding to each phase of the coils from turning on simultaneously, changes an output voltage average value that is an average value of voltages applied to each phase of the coils by controlling switching between ON and OFF of the high electric potential-side switching devices and the low electric potential-side switching devices of all the phases such that the on-time becomes equal to or longer than the predetermined time, wherein
the control unit is configured to perform the pulse width modulation by using a triangular wave comparing method that is based on duty command values and triangular wave command values;
the control unit includes a duty converting section, a modulation section and a shifting section,
the duty converting section calculating duty conversion values having different phases for each phase based on voltage command values applied to the coils of each phase,
the modulation section calculating modulated duty command values acquired by modulating duties that are based on the duty conversion values of each phase calculated by the duty converting section,
the shifting section calculating shifted duty command values acquired by shifting the modulated duty command values of each phase based on a shifting value that is set such that the on-time is equal to or longer than the predetermined time, in a case where there is a phase at which the on-time of the high electric potential-side switching devices or the low electric potential-side switching devices is shorter than the predetermined time when the high electric potential-side switching devices and the low electric potential-side switching devices are turned on or off based on the modulated duty command values modulated by the modulation section,
the control unit is configured to control the switching between ON and OFF of the high electric potential-side switching devices and the low electric potential-side switching devices based on the duty command values calculated based on the shifted duty command values,
the control unit further includes a pseudo-duty calculating section and an updating section,
the pseudo-duty calculating section calculating pseudo-duty command values calculated through linear interpolation based on a first duty command value and a second duty command value that is the duty command value calculated before the first duty calculation value, and
the updating section performing duty updating at a frequency that is equal to or higher than two times of a calculation frequency of the duty conversion values calculated by the duty converting section by using the first duty command value and the pseudo-duty command values.

8. A power conversion device that controls power supplied to coils corresponding to each phase of a rotary electric machine through pulse width modulation, the power conversion device comprising:
an inverter unit that includes high electric potential-side switching devices arranged on a high electric potential-side and low electric potential-side switching devices arranged on a low electric potential side in correspondence with each phase of the coils of the rotary electric machine; and
a control unit that, in a case where there is a phase at which an on-time of the high electric potential-side switching devices or an on-time of the low electric potential-side switching devices is shorter than a predetermined time, which is determined based on a dead time set to prevent the high electric potential-side switching device and the low electric potential-side switching device corresponding to each phase of the coils from turning on simultaneously, changes an output voltage average value that is an average value of voltages applied to each phase of the coils by controlling switching between ON and OFF of the high electric potential-side switching devices and the low electric potential-side switching devices of all the phases such that the on-time becomes equal to or longer than the predetermined time, wherein
the control unit is configured to perform the pulse width modulation by using a triangular wave comparing method that is based on duty command values and triangular wave command values;
the control unit includes a duty converting section, a modulation section and a shifting section,
the duty converting section calculating duty conversion values having different phases for each phase based on voltage command values applied to the coils of each phase,
the modulation section calculating modulated duty command values acquired by modulating duties that are based on the duty conversion values of each phase calculated by the duty converting section, the shifting section calculating shifted duty command values acquired by shifting the modulated duty command values of each phase based on a shifting value that is set such that the on-time is equal to or longer than the predetermined time, in a case where there is a phase at which the on-time of the high electric potential-side switching devices or the low electric potential-side switching devices is shorter than the predetermined time when the high electric potential-side switching devices and the low electric potential-side switching devices are turned on or off based on the modulated duty command values modulated by the modulation section, the control unit is configured to control the switching between ON and OFF of the high electric potential-side switching devices and the low electric potential-side switching devices based on the duty command values calculated based on the shifted duty command values, and the modulation section subtracts a value, which is acquired by subtracting a predetermined low limit value from the duty of a smallest duty phase, from the duties of all the phases such that the duty of the smallest duty phase is the predetermined low limit value.

9. A power conversion device that controls power supplied to coils corresponding to each phase of a rotary electric machine through pulse width modulation, the power conversion device comprising:

an inverter unit that includes high electric potential-side switching devices arranged on a high electric potential-side and low electric potential-side switching devices arranged on a low electric potential side in correspondence with each phase of the coils of the rotary electric machine; and a control unit that, in a case where there is a phase at which an on-time of the high electric potential-side switching devices or an on-time of the low electric potential-side switching devices is shorter than a predetermined time, which is determined based on a dead time set to prevent the high electric potential-side switching device and the low electric potential-side switching device corresponding to each phase of the coils from turning on simultaneously, changes an output voltage average value that is an average value of voltages applied to each phase of the coils by controlling switching between ON and OFF of the high electric potential-side switching devices and the low electric potential-side switching devices of all the phases such that the on-time becomes equal to or longer than the predetermined time, wherein the control unit is configured to perform the pulse width modulation by using a triangular wave comparing method that is based on duty command values and triangular wave command values, the control unit includes a duty converting section, a modulation section and a shifting section, the duty converting section calculating duty conversion values having different phases for each phase based on voltage command values applied to the coils of each phase, the modulation section calculating modulated duty command values acquired by modulating duties that are based on the duty conversion values of each phase calculated by the duty converting section, the shifting section calculating shifted duty command values acquired by shifting the modulated duty command values of each phase based on a shifting value that is set such that the on-time is equal to or longer than the predetermined time, in a case where there is a phase at which the on-time of the high electric potential-side switching devices or the low electric potential-side switching devices is shorter than the predetermined time when the high electric potential-side switching devices and the low electric potential-side switching devices are turned on or off based on the modulated duty command values modulated by the modulation section, the control unit is configured to control the switching between ON and OFF of the high electric potential-side switching devices and the low electric potential-side switching devices based on the duty command values calculated based on the shifted duty command values, and the modulation section subtracts a value, which is acquired by subtracting a predetermined high limit value from the duty of a largest duty phase, from the duties of all the phases such that the duty of the largest duty phase is the predetermined high limit value.

10. A power conversion device that controls power supplied to coils corresponding to each phase of a rotary electric machine through pulse width modulation, the power conversion device comprising:

an inverter unit that includes high electric potential-side switching devices arranged on a high electric potential-side and low electric potential-side switching devices arranged on a low electric potential side in correspondence with each phase of the coils of the rotary electric machine; and a control unit that, in a case where there is a phase at which an on-time of the high electric potential-side switching devices or an on-time of the low electric potential-side switching devices is shorter than a predetermined time, which is determined based on a dead time set to prevent the high electric potential-side switching device and the low electric potential-side switching device corresponding to each phase of the coils from turning on simultaneously, changes an output voltage average value that is an average value of voltages applied to each phase of the coils by controlling switching between ON and OFF of the high electric potential-side switching devices and the low electric potential-side switching devices of all the phases such that the on-time becomes equal to or longer than the predetermined time, wherein the control unit is configured to perform the pulse width modulation by using a triangular wave comparing method that is based on duty command values and triangular wave command values, the control unit includes a duty converting section, a modulation section and a shifting section, the duty converting section calculating duty conversion values having different phases for each phase based on voltage command values applied to the coils of each phase, the modulation section calculating modulated duty command values acquired by modulating duties that are based on the duty conversion values of each phase calculated by the duty converting section, the shifting section calculating shifted duty command values acquired by shifting the modulated duty command values of each phase based on a shifting value that is set such that the on-time is equal to or longer than the predetermined time, in a case where there is a phase at which the on-time of the high electric potential-side switching devices or the low electric potential-side switching devices is shorter than the predetermined time when the high electric potential-side switching devices and the low electric potential-side switching devices are turned on or off based on the modulated duty command values modulated by the modulation section, the control unit is configured to control the switching between ON and OFF of the high electric potential-side switching devices and the low electric potential-side switching devices based on the duty command values calculated based on the shifted duty command values, and the modulation section subtracts a value, which is acquired by subtracting a duty less than a predetermined low limit value from the predetermined low limit value, or a value, which is acquired by subtracting a predetermined high limit value from the duty exceeding the predetermined high limit value, from the duties of all the phases.

11. The power conversion device according to claim 3, wherein:

the three-phase modulation section switches to the three-phase modulation controlled by using the first zero-voltage vector and the second zero-voltage vector, in a case where an odd vector representing a state in which one of the high electric potential-side switching devices is turned on is less than the determination value when the command vector is decomposed into the basic vector, under a condition that the two-phase modulation section controls switching between ON and OFF of the high electric potential-side switching devices and the low electric potential-side switching devices through the two-phase modulation by using the second zero-voltage vector as the zero-voltage vector.

12. A power conversion device that controls power supplied to coils corresponding to each phase of a rotary electric machine through pulse width modulation, the power conversion device comprising:

an inverter unit that includes high electric potential-side switching devices arranged on a high electric potential-side and low electric potential-side switching devices arranged on a low electric potential side in correspondence with each phase of the coils of the rotary electric machine; and a control unit that, in a case where there is a phase at which an on-time of the high electric potential-side switching devices or an on-time of the low electric potential-side switching devices is shorter than a predetermined time, which is determined based on a dead time set to prevent the high electric potential-side switching device and the low electric potential-side switching device corresponding to each phase of the coils from turning on simultaneously, changes an output voltage average value that is an average value of voltages applied to each phase of the coils by controlling switching between ON and OFF of the high electric potential-side switching devices and the low electric potential-side switching devices of all the phases such that the on-time becomes equal to or longer than the predetermined time, wherein the control unit is configured to perform pulse width modulation by using an instantaneous voltage vector selecting method that is based on the command voltage vectors, the control unit includes a two-phase modulation section and a three-phase modulation section, the two-phase modulation section controlling switching between ON and OFF of the high electric potential-side switching devices and the low electric potential-side switching devices through two-phase modulation that is controlled by using one of a first zero-voltage vector in which all the high electric potential-side switching devices are turned on or a second zero-voltage vector in which all the low electric potential-side switching devices are turned on as a zero-voltage vector, the three-phase modulation section controlling switching between ON and OFF of the high electric potential-side switching devices and the low electric potential-side switching devices by switching to three-phase modulation that is controlled by using the first zero-voltage vector and the second zero-voltage vector such that the on-time in which the high electric potential-side switching devices or the low electric potential-side switching devices are turned on is equal to or longer than the predetermined time, in a case where basic vectors are less than a determination value set based on the dead time when the command vector is decomposed into the basic vectors, and the three-phase modulation section switches to the three-phase modulation controlled by using the first zero-voltage vector and the second zero-voltage vector in a case where an even vector representing a state in which one of the low electric potential-side switching devices is turned on is less than the determination value when the command vector is decomposed into the basic vector, under a condition that the two-phase modulation section controls switching between ON and OFF of the high electric potential-side switching devices and the low electric potential-side switching devices through the two-phase modulation by using the first zero-voltage vector as the zero-voltage vector.

13. A power conversion device that controls power supplied to coils corresponding to each phase of a rotary electric machine through pulse width modulation, the power conversion device comprising:

an inverter unit that includes high electric potential-side switching devices arranged on a high electric potential-side and low electric potential-side switching devices arranged on a low electric potential side in correspondence with each phase of the coils of the rotary electric machine; and a control unit that, in a case where there is a phase at which an on-time of the high electric potential-side switching devices or an on-time of the low electric potential-side switching devices is shorter than a predetermined time, which is determined based on a dead time set to prevent the high electric potential-side switching device and the low electric potential-side switching device corresponding to each phase of the coils from turning on simultaneously, changes an output voltage average value that is an average value of voltages applied to each phase of the coils by controlling switching between ON and OFF of the high electric potential-side switching devices and the low electric potential-side switching devices of all the phases such that the on-time becomes equal to or longer than the predetermined time, wherein the control unit is configured to perform the pulse width modulation by using a triangular wave comparing method that is based on duty command values and triangular wave command values, the control unit includes a duty converting section, a modulation section and a shifting section, the duty converting section calculating duty conversion values having different phases for each phase based on voltage command values applied to the coils of each phase, the modulation section calculating modulated duty command values acquired by modulating duties that are based on the duty conversion values of each phase calculated by the duty converting section, the shifting section calculating shifted duty command values acquired by shifting the modulated duty command values of each phase based on a shifting value that is set such that the on-time is equal to or longer than the predetermined time, in a case where there is a phase at which the on-time of the high electric potential-side switching devices or the low electric potential-side switching devices is shorter than the predetermined time when the high electric potential-side switching devices and the low electric potential-side switching devices are turned on or off based on the modulated duty command values modulated by the modulation section, the control unit is configured to control the switching between ON and OFF of the high electric potential-side switching devices and the low electric potential-side switching devices based on the duty command values calculated based on the shifted duty command values, the control unit further includes a dead-time compensating section and a correction section, the dead-time compensating section calculating compensated duty command values by changing the duty based on a dead-time compensating value that is a value based on the dead time to eliminate a change amount of voltages applied to the coils in accordance with a polarity of currents conducted in the coils due to an influence of the dead time, the correction section correcting the duties of phases other than a near-limit phase, in a case where there is the near-limit phase that is a phase at which the duty is within a predetermined range from an high limit value of the duty or a low limit value of the duty, the control unit further includes a pseudo-duty calculating section and an updating section, the pseudo-duty calculating section calculating pseudo-duty command values calculated through linear interpolation based on a first duty command value and a second duty command value that is the duty command value calculated before the first duty calculation value, and the updating section performing duty updating at a frequency that is equal to or higher than two times of a calculation frequency of the duty conversion values calculated by the duty converting section by using the first duty command value and the pseudo-duty command values.

14. The power conversion device according to claim 13, wherein:
the modulation section subtracts a value, which is acquired by subtracting a predetermined low limit value from the duty of a smallest duty phase, from the duties of all the phases such that the duty of the smallest duty phase is the predetermined low limit value.

15. The power conversion device according to claim 13, wherein:
the modulation section subtracts a value, which is acquired by subtracting a predetermined high limit value from the duty of a largest duty phase, from the duties of all the phases such that the duty of the largest duty phase is the predetermined high limit value.

16. The power conversion device according to claim 13, wherein:
the modulation section adds third harmonics to the duties of all the phases.

17. The power conversion device according to claim 13, wherein:
the modulation section subtracts an average value of the duty of a largest duty phase and the duty of a smallest duty phase from the duties of all the phases.

18. The power conversion device according to claim 13, wherein:
the modulation section subtracts a value, which is acquired by subtracting a duty less than a predetermined low limit value from the predetermined low limit value, or a value, which is acquired by subtracting a predetermined high limit value from the duty exceeding the predetermined high limit value, from the duties of all the phases.

19. A power conversion device that controls power supplied to coils corresponding to each phase of a rotary electric machine through pulse width modulation, the power conversion device comprising:
an inverter unit that includes high electric potential-side switching devices arranged on a high electric potential-side and low electric potential-side switching devices arranged on a low electric potential side in correspondence with each phase of the coils of the rotary electric machine, and the inverter unit includes a current detecting section that detects a current flowing in each phase of the coils of the rotary electric machine; and
a control unit that, in a case where there is a phase at which an on-time of the high electric potential-side switching devices or an on-time of the low electric potential-side switching devices is shorter than a dead time, which is determined based on a dead time set to prevent the high electric potential-side switching device and the low electric potential-side switching device corresponding to each phase of the coils from turning on simultaneously, changes an output voltage average value that is an average value of voltages applied to each phase of the coils by controlling switching between ON and OFF of the high electric potential-side switching devices and the low electric potential-side switching devices of all the phases such that the on-time becomes equal to or longer than the dead time,
wherein the control unit changes the output voltage average value in a period, in which there is the phase at which the on-time of the high electric potential-side switching devices or the on-time of the low electric potential-side switching devices is less than the dead time, in accordance with a magnitude and a phase angle of an output voltage of the inverter unit and the current detected by the current detecting section, and
wherein the control unit changes the output voltage average value in a period, in which the on-time becomes shorter than the dead time, in each electric angle range of 360°.

20. A power conversion device that controls power supplied to coils corresponding to each phase of a rotary electric machine through pulse width modulation, the power conversion device comprising:
an inverter unit that includes high electric potential-side switching devices arranged on a high electric potential-side and low electric potential-side switching devices arranged on a low electric potential side in correspondence with each phase of the coils of the rotary electric machine, and the inverter unit includes a current detecting section that detects a current flowing in each phase of the coils of the rotary electric machine;
a switching device control circuit which produces pulse width modulation signal to drive the high electric potential-side switching devices and the low electric potential-side switching devices with a dead time to prevent the high electric potential-side switching devices corresponding to each phase of the coils from turning on simultaneously; and a control unit that changes the output voltage average value in a period when on-time of the high electric potential-side switching devices or the low electric potential-side switching devices become equal to or longer than the dead time, wherein the control unit changes the output voltage average value in a period, in which there is a the phase at which the on-time of the high electric potential side switching devices or the on-time of the low electric potential-side switching devices is less than the dead time, in accordance with a magnitude and a phase angle of the output voltage of the inverter unit, and the current detected by the current detection section.

* * * * *